United States Patent
Tour et al.

(10) Patent No.: US 9,597,656 B2
(45) Date of Patent: *Mar. 21, 2017

(54) POROUS CARBON MATERIALS FOR CO2 SEPARATION IN NATURAL GAS

(71) Applicant: William Marsh Rice University, Houston, TX (US)

(72) Inventors: James M. Tour, Bellaire, TX (US); Desmond E. Schipper, Houston, TX (US); Chih-Chau Hwang, Houston, TX (US); Josiah Tour, Bellaire, TX (US); Almaz S. Jalilov, Houston, TX (US); Gedeng Ruan, Houston, TX (US); Yilun Li, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,248

(22) Filed: Aug. 24, 2015

(65) Prior Publication Data
US 2016/0001260 A1    Jan. 7, 2016

Related U.S. Application Data

(63) Continuation-in-part of application No. 14/458,802, filed on Aug. 13, 2014, and a continuation-in-part of
(Continued)

(51) Int. Cl.
*B01J 20/20*  (2006.01)
*B01D 53/02*  (2006.01)
(Continued)

(52) U.S. Cl.
CPC ............. *B01J 20/20* (2013.01); *B01D 53/02* (2013.01); *B01J 20/2808* (2013.01);
(Continued)

(58) Field of Classification Search
CPC ...... B01D 53/02; B01D 53/04; B01D 53/047; B01D 2257/504; B01D 2257/304;
(Continued)

(56) References Cited

U.S. PATENT DOCUMENTS

| 4,082,694 A | 4/1978 | Wennerberg et al. |
| 4,504,287 A | 3/1985 | Atlani et al. |

(Continued)

FOREIGN PATENT DOCUMENTS

| WO | WO-2012026755 A2 | 3/2012 |
| WO | WO-2012158194 A1 | 11/2012 |

(Continued)

OTHER PUBLICATIONS

Zhang et al., "Enhancement of CO2 adsorption on high surface area activated carbon modified by N2, H2, and ammonia," Chemical Engineering Journal 160 (2010) 571-577.*

(Continued)

*Primary Examiner* — Anthony J Zimmer
(74) *Attorney, Agent, or Firm* — Winstead PC

(57) ABSTRACT

In some embodiments, the present disclosure pertains to materials for use in $CO_2$ capture in high pressure environments. In some embodiments, the materials include a porous carbon material containing a plurality of pores for use in a high pressure environment. Additional embodiments pertain to methods of utilizing the materials of the present disclosure to capture $CO_2$ from various environments. In some embodiments, the materials of the present disclosure selectively capture $CO_2$ over hydrocarbon species in the environment.

15 Claims, 32 Drawing Sheets

Related U.S. Application Data application No. 14/391,791, filed as application No. PCT/US2013/021239 on Jan. 11, 2013, application No. 14/833,248, filed on Aug. 24, 2015, which is a continuation-in-part of application No. 14/315,920, filed on Jun. 26, 2014.

(60) Provisional application No. 62/079,437, filed on Nov. 13, 2014, provisional application No. 62/001,552, filed on May 21, 2014, provisional application No. 61/865,323, filed on Aug. 13, 2013, provisional application No. 61/585,510, filed on Jan. 11, 2012, provisional application No. 61/839,567, filed on Jun. 26, 2013.

(51) Int. Cl.
*B01J 20/28* (2006.01)
*B01J 20/30* (2006.01)
*B01J 20/34* (2006.01)

(52) U.S. Cl.
CPC ... *B01J 20/28011* (2013.01); *B01J 20/28066* (2013.01); *B01J 20/28083* (2013.01); *B01J 20/3078* (2013.01); *B01J 20/3416* (2013.01); *B01J 20/3483* (2013.01); *B01J 20/3491* (2013.01); *B01D 2253/102* (2013.01); *B01D 2257/304* (2013.01); *B01D 2257/504* (2013.01); *B01J 2220/485* (2013.01); *B01J 2220/4825* (2013.01); *B01J 2220/4837* (2013.01); *B01J 2220/4893* (2013.01); *Y02C 10/08* (2013.01); *Y02C 20/20* (2013.01)

(58) Field of Classification Search
CPC . B01D 2253/102; B01J 20/20; B01J 20/3483; B01J 20/3416; B01J 20/3491; B01J 20/2808; B01J 20/3078; B01J 20/28011; B01J 20/28066; B01J 20/28083; B01J 2220/4825; B01J 2220/4837; B01J 2220/4893; B01J 2220/485; Y02C 20/20; Y02C 10/08
See application file for complete search history.

(56) References Cited

U.S. PATENT DOCUMENTS

| | | | |
|---|---|---|---|
| 5,972,834 A | 10/1999 | Ohsaki et al. | |
| 6,547,854 B1 | 4/2003 | Gray et al. | |
| 6,585,948 B1 | 7/2003 | Ryoo et al. | |
| 6,592,764 B1 | 7/2003 | Stucky et al. | |
| 6,908,497 B1 | 6/2005 | Sirwardane | |
| 8,114,372 B2 | 2/2012 | Pak et al. | |
| 8,133,305 B2 | 3/2012 | Lackner et al. | |
| 8,277,767 B2 | 10/2012 | Ariya-Far | |
| 8,636,830 B2 | 1/2014 | Barron et al. | |
| 9,034,085 B2 | 5/2015 | Barron et al. | |
| 2003/0221555 A1 | 12/2003 | Golden et al. | |
| 2004/0045434 A1 | 3/2004 | Golden et al. | |
| 2008/0210901 A1 | 9/2008 | Giannantonio et al. | |
| 2008/0264254 A1 | 10/2008 | Song et al. | |
| 2008/0276804 A1 | 11/2008 | Sayari et al. | |
| 2009/0038632 A1 | 2/2009 | Cashmore et al. | |
| 2009/0169452 A1 | 7/2009 | Constantz et al. | |
| 2010/0029466 A1 | 2/2010 | Woodhouse | |
| 2010/0061904 A1 | 3/2010 | Lund et al. | |
| 2010/0062926 A1 | 3/2010 | Woodhouse et al. | |
| 2010/0139536 A1 | 6/2010 | Woodhouse et al. | |
| 2010/0154636 A1 | 6/2010 | Liu et al. | |
| 2010/0155335 A1 | 6/2010 | Taboada-Serrano et al. | |
| 2010/0212495 A1 | 8/2010 | Gadkaree et al. | |
| 2011/0005390 A1 | 1/2011 | Haugan | |
| 2011/0005392 A1* | 1/2011 | Pirngruber | B01D 53/02 95/103 |
| 2011/0059000 A1 | 3/2011 | Constantz et al. | |
| 2011/0088553 A1 | 4/2011 | Woodhouse et al. | |
| 2011/0150730 A1 | 6/2011 | Baugh et al. | |
| 2011/0172084 A1 | 7/2011 | Jang et al. | |
| 2011/0172412 A1 | 7/2011 | Serre et al. | |
| 2011/0174507 A1 | 7/2011 | Burnham et al. | |
| 2011/0179948 A1 | 7/2011 | Choi et al. | |
| 2011/0230334 A1 | 9/2011 | Goldberg et al. | |
| 2011/0308389 A1 | 12/2011 | Graff et al. | |
| 2012/0024153 A1 | 2/2012 | Barron et al. | |
| 2012/0048111 A1 | 3/2012 | Nakao et al. | |
| 2012/0125196 A1 | 5/2012 | Woodhouse et al. | |
| 2012/0308456 A1 | 12/2012 | Leta et al. | |
| 2014/0076158 A1 | 3/2014 | Tour et al. | |
| 2014/0103255 A1 | 4/2014 | Barron et al. | |
| 2015/0024931 A1 | 1/2015 | Tour et al. | |
| 2015/0056116 A1 | 2/2015 | Tour et al. | |
| 2015/0111018 A1 | 4/2015 | Tour et al. | |
| 2015/0111024 A1 | 4/2015 | Tour et al. | |
| 2015/0258487 A1* | 9/2015 | Hornbostel | F17C 11/005 206/0.7 |

FOREIGN PATENT DOCUMENTS

| | | |
|---|---|---|
| WO | WO-2013106712 A1 | 7/2013 |
| WO | WO-2014210295 A3 | 2/2015 |

OTHER PUBLICATIONS

Alvarez et al., Greater focus needed on methane leakage from natural gas infrastructure. Proc. Natl. Acad. Sci. USA 109, 6435-6440 (2012).

Puxty et al. Carbon dioxide postcombustion capture: a novel screening study of the carbon dioxide absorption performance of 76 amines. Environ. Sci. Technol. 43, 6427-6433 (2009).

Siriwardane et al., Adsorption of CO2 on molecular sieves and activated carbon. Energy Fuels 15, 279-284 (2001).

Li et al., Porous materials with pre-designed single-molecule traps for CO2 selective adsorption. Nat. Commun. 4, 1538-1545 (2013).

Guo et al., Adsorption of carbon dioxide on activated carbon. J. Natural Gas Chem. 15, 223-229 (2006).

D'Alessandro et al., Carbon dioxide capture: Prospects for new materials, Angew. Chem. Int. Ed. 49, 6058-602 (2010).

Y. Wan, "Host Guest" Chemistry in the Synthesis of Ordered Nonsiliceous Mesoporous Materials, Acc. Chem. Res., 2006, 39, 423.

Rivera-Utrilla et al., Activated carbon modifications to enhance its water treatment applications, An overview, J. Hazard. Mater. 2011, 187, 1-23.

Shen et al., Nitrogen-containing porous carbons: synthesis and application, J. Mater. Chem. A 2013, 1, 999.

Hwang et al., In situ Synthesis of Polymer-Modified Mesoporous Carbon CMK-3 Composites for CO2 Sequestration, ACS Appl. Mater. Interfaces 2011, 3, 4782.

Golombok et al., Assessing contaminated gas, Hart's E & P Mag. Jun. 2008: 73-75.

Yong et al., Adsorption of carbon dioxide on chemically modified high surface area carbon-based adsorbents at high temperature. Adsorption 7, 41-50 (2001).

Xie et al., Capture and conversion of CO2 at ambient conditions by a conjugated microporous polymer. Nat. Commun. 4, 1960-1966 (2013).

Xia et al., Preparation of sulfur-doped microporous carbons for the storage of hydrogen and carbon dioxide. Carbon 50, 5543-5553 (2012).

Sankaran et al., The role of heteroatoms in carbon nanotubes for hydrogen storage. Carbon 44, 2816-2821 (2006).

Qajar et al., High pressure hydrogen adsorption apparatus: Design and error analysis. Int. J. Hydrogen Energy 37, 9123-9136 (2012).

Espinal et al., Measurement, standards, and data needs for CO2 capture materials: A critical review. Environ. Sci. Technol. 47, 11960-11975 (2013).

(56) References Cited

OTHER PUBLICATIONS

Wang et al., Increasing selective CO2 adsorption on amine-grafted SBA-15 by increasing silanol density. J. Phys. Chem. 115, 21264-21272 (2011).
I et al., Comparative study of the excess versus absolute adsorption of CO2 on superactivated carbon for the near-critical region. Langmuir 19, 2683-2690 (2003).
Langer et al. Reversible CO2 fixation by iridium(I) complexes containing Me2PhP as ligand. Organometallics 29, 1642-1651 (2010).
Sevilla et al., Highly porous S-doped carbons. Microporous Mesoporous Mater. 158, 318-323 (2012).
Zhang et al., Enhancement of CO2 adsorption and CO2/N2 selectivity on ZIF-8 via postsynthetic modification. AIChE J. 59, 2195-2206 (2013).
Lee et al., Preferential Occupation of CO2 Molecules in Hydroquinone Clathrates Formed from CO2/N2 Gas Mixtures. J. Phys. Chem. C 115, 22647-22651 (2011).
Loring et al., In Situ Molecular Spectroscopic Evidence for CO2 Intercalation into Montmorillonite in Supercritical Carbon Dioxide. Langmuir 28, 7125-7128 (2012).
Comotti et al., Porous dipeptide crystals as selective CO2 adsorbents: experimental isotherms vs. grand canonical Monte Carlo simulations and MAS NMR spectroscopy. CrystEngComm 15, 1503-1507 (2013).
Bowers et al., In Situ 13C and 23Na Magic Angle Spinning NMR Investigation of Supercritical CO2 Incorporation in Smectite-Natural Organic Matter Composites. J. Phys. Chem. C 118, 3564-3573 (2014).
Heuchel et al., "Adsorption of Carbon Dioxide and Methane and Their Mixtures on an Activated Carbon: Simulation and Experiment", Langmuir, 1999,15, 8695-8705.
Fryxell et al., "Design and Synthesis of Selective Mesoporous Anion Traps", Chem. Mater. 1999, 11, 2148-2154.
Yoshitake et al.,"Adsorption of Chromate and Arsenate by Amino-Functionalized MCM-41 and SBA-1" Chem. Mater. 2002,14,4603-4610.
Xu et al., "Preparation and characterization of novel CO2 'molecular basket' adsorbents based on polymer-modified mesoporous molecular sieve MCM-41", Microporous Mesoporous Mater. 2003, 62, 29-45.
Caskey et al., "Dramatic Tuning of Carbon Dioxide Uptake via Metal Substitution in a Coordination Polymer with Cylindrical Pores", J. Am. Chem. Soc. 2008,130, 10870-10871.
McDonald et al., "Enhanced carbon dioxide capture upon incorporation of N,N-dimethylethylenediamine in the metal-organic framework CuBTTri" Chem. Sci. 2011, 2, 2022-2028.
Lee et al., "Synthesis of new nanoporous carbon materials using nanostructured silica materials as templates", J. Mater. Chem. 2004, 14, 478-486.
Ryoo et al., "Ordered Mesoporous Carbons", Adv. Mater. 2001, 13, 677-681.
Kyotani et al., "Control of pore structure in carbon", Carbon 2000, 38, 269-286.
Choi et al., "Ordered nanoporous polymer-carbon composites", Nature Mater. 2003, 2, 473-476.
Zhao et al., "Triblock Copolymer Syntheses of Mesoporous Silica with Periodic 50 to 300 Angstrom Pores", Science 1998, 279, 548-552.
Joo et al., "Ordered nanoporous arrays of carbon supporting high dispersions of platinum nanoparticles", Nature 2001, 412, 169-172.
Mello et al., "Amine-modified MCM-41 mesoporous silica for carbon dioxide capture" Micropor. Mesopor. Mater., 2011, 143, 174-179.
Xu et al., "Novel Polyethylenimine-Modified Mesoporous Molecular Sieve of MCM-41 Type as High-Capacity Adsorbent for CO2 Capture" Energy Fuels, 2002, 16,1463-1469.

Choi et al., "Adsorbent Materials for Carbon Dioxide Capture from Large Anthropogenic Point Sources" ChemSusChem, 2009, 2, 796-854.
Ma et al., "'Molecular Basket' Sorbents for Separation of CO2 and H2S from Various Gas Streams", J. Am. Chem. Soc., 2009, 131,5777-5783.
Dillon et al., "Synthesis, Characterization, and Carbon Dioxide Adsorption of Covalently Attached Polyethyleneimine—Functionalized Single-Wall Carbon Nanotubes", ACS Nano, 2008, 2, 156-164.
Jun et al., "Synthesis of New Nanoporous Carbon with Hexagonally Ordered Mesostructure", J. Am. Chem. Soc., 2000, 122, 10712-10713.
Chang et al., "In-Situ Infrared Study of CO2 Adsorption on SBA-15 Grafted with y-Aminopropyltriethoxysilane", Energy Fuels, 2003, 17,468-473.
National Aeronautics and Space Administration brochure entitled "International Space Station Environmental Control and Life Support System." 2008.
Mishra et al., "Nanomagnetite decorated multiwalled carbon nanotubes: a robust nanomaterial for enhanced carbon dioxide adsorption", Energy and Environmental Sciences, 2011, 4, 889-895.
Huwe et al., "Iron (III) oxide nanoparticles with the pore system of mesoporous carbon CMK-1: intra-pore synthesis and characterization", Microporous and Mesoporous Materials 60 (2003) 151-158.
Iota et al., Quartzlike Carbon Dioxide: An Optically Nonlinear Extended Solid at High Pressures and Temperatures, *Science* 1999, 283, 1510.
Yoo et al., Crystal Structure of Carbon Dioxide at High Pressure: "Superhard" Polymeric Carbon Dioxide, C. Phys. Rev. Lett. 1999, 83, 5527.
Shen et al., Yeast-Based Microporous Carbon Materials for Carbon Dioxide Capture, ChemSusChem, 2012, 5: 1274-1279.
Seredych et al., Role of Microporosity and Nitrogen Functionality on the Surface of Activated Carbon in the Process of Desulfurization of Digester Gas, J. Phys. Chem. C, 2008, 112 (12), pp. 4704-4711.
Herzog et al., Peer Reviewed: What Future for Carbon Capture and Sequestration?, Environ. Sci. Technol. 2001, 35, 148A-153A.
Haszeldine et al., Carbon Capture and Storage: How Green Can Black Be?, Science 2009, 325, 1647-1652.
Aaron et al., Separation of CO2 from Flue Gas: A Review, Separation Science and Technology, 40, 321-348, 2005.
Rochelle et al., Amine Scrubbing for CO2 Capture, Science, 2009, 325, 1652-1654.
Yong et al., Adsorption of carbon dioxide at high temperature—a review, Separation Science and Technology, 2002, 26, 195-205.
Goetman et al., Chemical Synthesis of Mesoporous Carbon Nitrides Using Hard Templates and Their Use as a Metal-Free Catalyst for Friedel-Crafts Reaction of Benzene, Angew. Chem. Int. Ed. 2006, 45, 4467-4471.
Mao et al., Lithium storage in nitrogen-rich mesoporous carbon materials, Energy Environ. Sci. 2012, 5, 7950-7955.
Li et al., Mesoporous nitrogen-rich carbons derived from protein for ultra-high capacity battery anodes and supercapacitors, Energy Environ. Sci. 2013, 6, 871-87.
Wang et al., CO2 capture by solid adsorbents and their applications: current status and new trends , Energy Environ. Sci. 2011, 4, 42-55.
Llewellyn et al., High Uptakes of CO2 and CH4 in Mesoporous Metal-Organic Frameworks MIL-100 and MIL-101, Langmuir 2008, 24, 7245-7250.
Furukawa et al., Ultrahigh porosity in metal-organic frameworks, Science, 2010, 239, 424-428.
Yang et al., Progress in carbon dioxide separation and capture: a review,J. Environ. Sci. 2008, 20, 14-27.
Millward et al., Metal-Organic Frameworks with Exceptionally High Capacity for Storage of Carbon Dioxide at Room Temperature, J. Am. Chem. Soc. 2005, 127, 17998-17999.
Office Action for U.S. Appl. No. 15/001,835, Mailed on Apr. 14, 2016.

\* cited by examiner

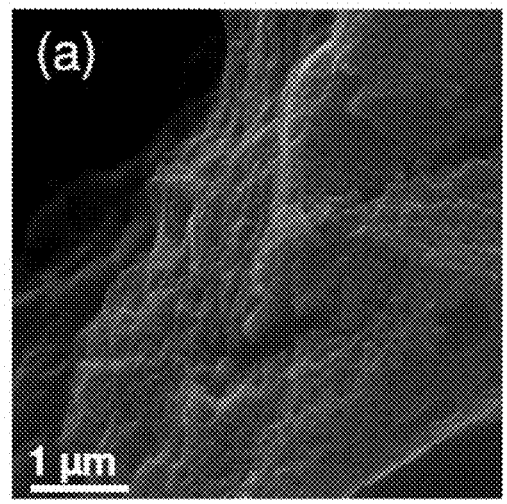 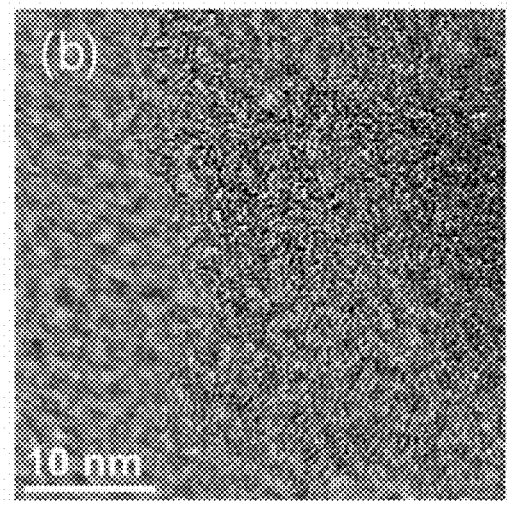
FIG. 14A  FIG. 14B
Figure 14

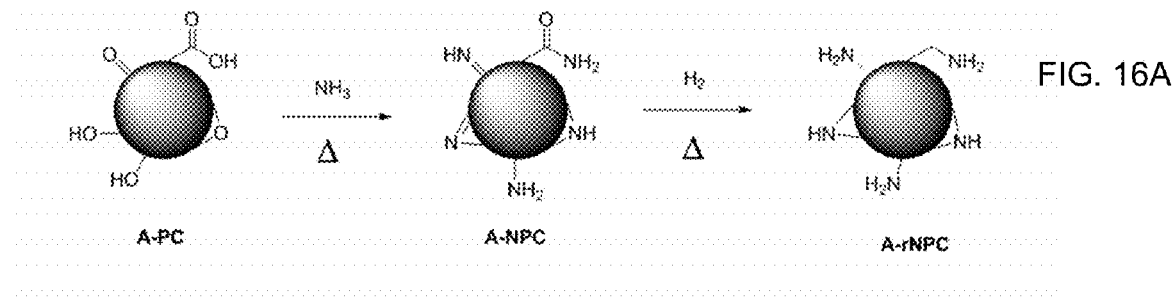
FIG. 16A
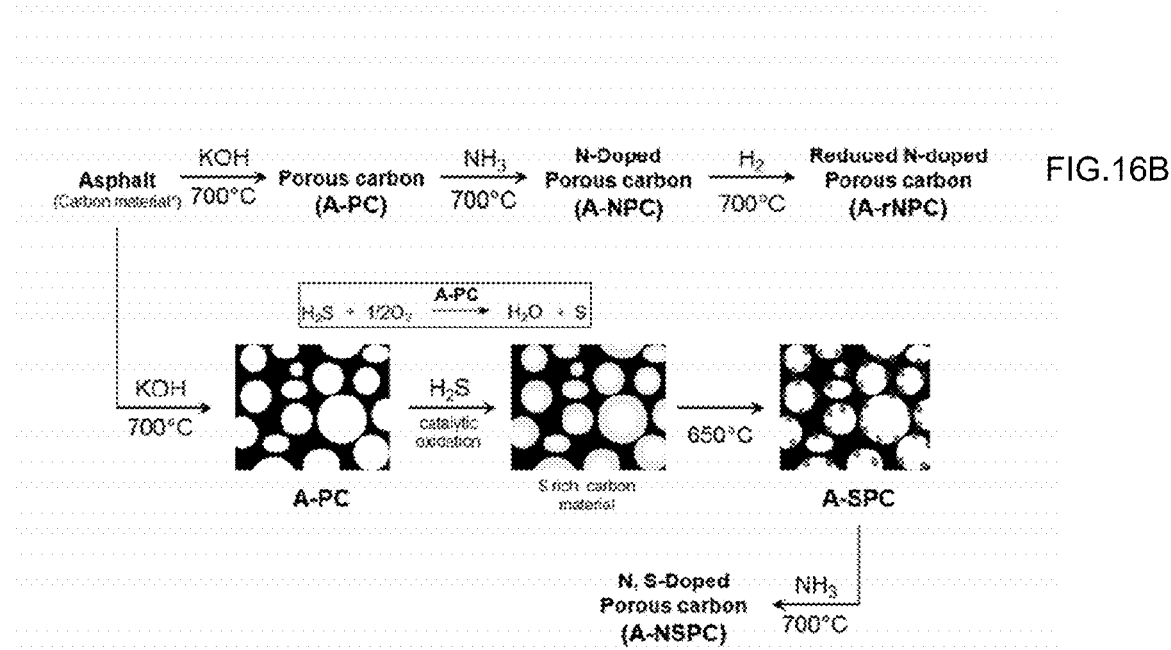
FIG. 16B
Figure 16

Figure 18

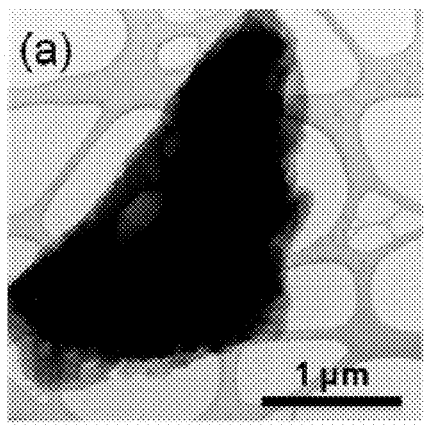
FIG. 21A
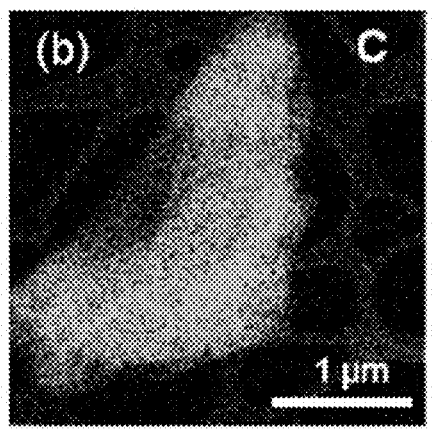
FIG. 21B
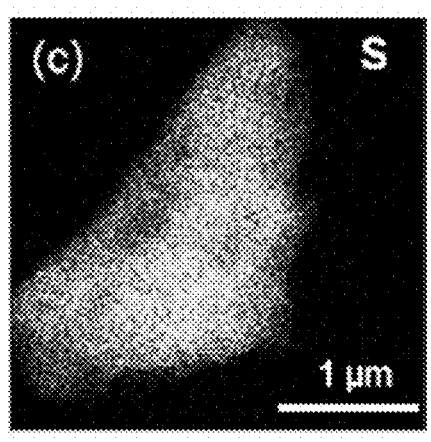
FIG. 21C
Figure 21

FIG. 26A
FIG. 26B
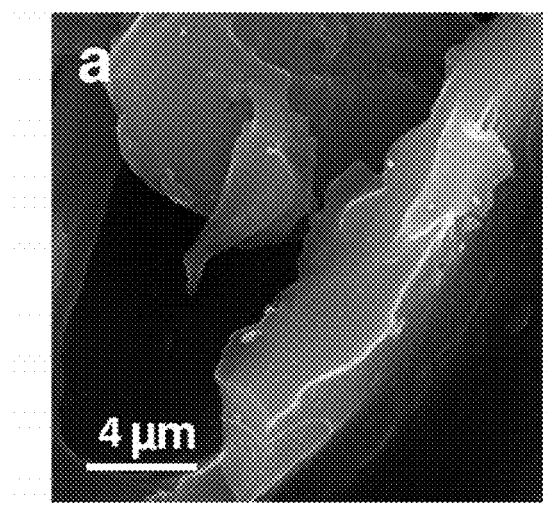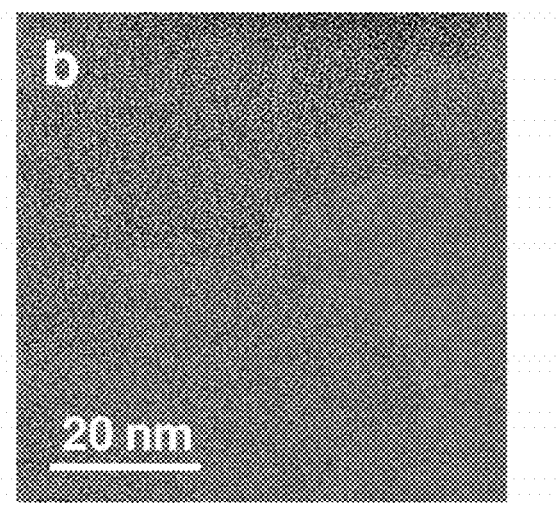
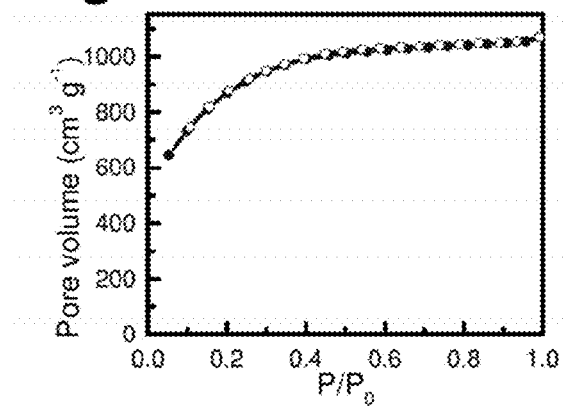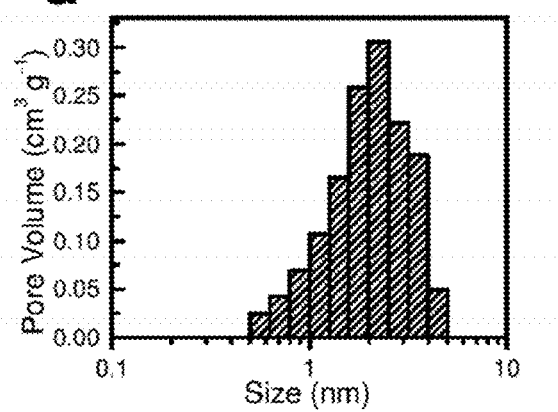
FIG. 26C
FIG. 26D
Figure 26

`US 9,597,656 B2`

POROUS CARBON MATERIALS FOR CO2 SEPARATION IN NATURAL GAS

RELATED APPLICATIONS

This application claims priority to and benefit of U.S. Provisional Patent Application No. 62/079,437, filed on Nov. 13, 2014; is a continuation-in-part of U.S. patent application Ser. No. 14/458,802 filed on Aug. 13, 2014, which claims priority to and benefit of U.S. Provisional Patent Application No. 61/865,323, filed on Aug. 13, 2013 and U.S. Provisional Patent Application No. 62/001,552, filed on May 21, 2014; is a continuation-in-part of U.S. patent application Ser. No. 14/315,920, filed on Jun. 26, 2014, which claims priority to and the benefit of U.S. Provisional Patent Application No. 61/839,567, filed on Jun. 26, 2013; and is a continuation-in-part of U.S. patent application Ser. No. 14/371,791, filed on Jul. 11, 2014, which is a U.S. national stage application of PCT/US2013/021239, filed on Jan. 11, 2013, and which claims priority to and benefit of U.S. Provisional Patent Application No. 61/585,510, filed on Jan. 11, 2012. The entirety of each of the aforementioned applications is incorporated herein by reference.

BACKGROUND

Current methods and materials for capturing $CO_2$ and $H_2S$ from an environment suffer from numerous limitations, including low selectivity, limited sorption capacity, high sorbent costs, and stringent reaction conditions. The present disclosure addresses these limitations.

SUMMARY

In some embodiments, the present disclosure pertains to methods of capturing a gas from an environment. In some embodiments, the methods include a step of associating the environment with a porous carbon material. In some embodiments, the associating results in sorption of gas components to the porous carbon material. In some embodiments, the sorbed gas components include at least one of $CO_2$, $H_2S$, and combinations thereof.

In some embodiments, the environment in which gas capture occurs is a pressurized environment. In some embodiments, the environment includes, without limitation, industrial gas streams, natural gas streams, natural gas wells, industrial gas wells, oil and gas fields, and combinations thereof.

In some embodiments, the sorbed gas components include $CO_2$. In some embodiments, the sorption of the $CO_2$ to the porous carbon material occurs selectively over hydrocarbons in the environment. In some embodiments, the $CO_2$ is converted to poly ($CO_2$) or a matrix of $CO_2$ (e.g., a matrix of ordered $CO_2$) within the pores of the porous carbon materials. In some embodiments, the porous carbon material has a $CO_2$ sorption capacity of about 50 wt % to about 200 wt % of the porous carbon material weight when measured in absolute uptake values.

In some embodiments, the sorbed gas components include $H_2S$. In some embodiments, the $H_2S$ is converted within the pores of the porous carbon materials to at least one of elemental sulfur (S), sulfur dioxide ($SO_2$), sulfuric acid ($H_2SO_4$), and combinations thereof. In some embodiments, the formed elemental sulfur becomes impregnated with the porous carbon material. In some embodiments, captured $H_2S$ remains intact within the porous carbon material. In some embodiments, the porous carbon material has a $H_2S$ sorption capacity of about 50 wt % to about 300 wt % of the porous carbon material weight.

In some embodiments, the sorbed gas components include $CO_2$ and $H_2S$. In some embodiments, the sorption of $H_2S$ and $CO_2$ to the porous carbon material occurs at the same time. In some embodiments, the sorption of $CO_2$ to the porous carbon material occurs before the sorption of $H_2S$ to the porous carbon material. In some embodiments, the sorption of $H_2S$ to the porous carbon material occurs before the sorption of $CO_2$ to the porous carbon material.

In some embodiments, the methods of the present disclosure also include a step of releasing captured gas components from the porous carbon material. In some embodiments, the releasing occurs by decreasing the pressure of the environment or heating the environment. In some embodiments, the releasing of sorbed $CO_2$ occurs by decreasing the pressure of the environment or placing the porous carbon material in a second environment that has a lower pressure than the environment where $CO_2$ capture occurred. In some embodiments, the releasing of sorbed $H_2S$ occurs by heating the porous carbon material. In some embodiments, the releasing of the $CO_2$ occurs before the releasing of the $H_2S$.

In some embodiments, the methods of the present disclosure also include a step of disposing the released gas. In some embodiments, the methods of the present disclosure also include a step of reusing the porous carbon material after the releasing to capture additional gas components from an environment.

In some embodiments, the porous carbon material utilized for gas capture includes a plurality of pores. In some embodiments, the porous carbon material includes, without limitation, protein-derived porous carbon materials, carbohydrate-derived porous carbon materials, cotton-derived porous carbon materials, fat-derived porous carbon materials, waste-derived porous carbon materials, asphalt-derived porous carbon materials, coal-derived porous carbon materials, coke-derived porous carbon materials, asphaltene-derived porous carbon materials, oil product-derived porous carbon materials, bitumen-derived porous carbon materials, tar-derived porous carbon materials, pitch-derived porous carbon materials, anthracite-derived porous carbon materials, melamine-derived porous carbon materials, biochar-derived porous carbon, wood-derived porous carbon and combinations thereof.

In some embodiments, the porous carbon material includes asphalt-derived porous carbon materials. In some embodiments, the porous carbon material is carbonized. In some embodiments, the porous carbon material is reduced. In some embodiments, the porous carbon material is vulcanized. In some embodiments, the porous carbon material includes a plurality of nucleophilic moieties. In some embodiments, the nucleophilic moieties include, without limitation, oxygen-containing moieties, sulfur-containing moieties, metal-containing moieties, metal oxide-containing moieties, metal sulfide-containing moieties, nitrogen-containing moieties, phosphorous-containing moieties, and combinations thereof.

In some embodiments, the porous carbon materials may be derived from at least one of biochars, hydrochars, charcoals, coal, activated carbon, and combinations thereof. These sources may be favorable when other sources (such as asphalt) are prohibitively expensive for a particular application. The cost of synthetic polymers may be seen as high compared with industrial waste or agriculture waste. Furthermore, in order to reach higher $CO_2$ uptake capacity, A-PC has to be N-doped by $NH_3$ followed by $H_2$ reduction at 700° C., which may not be favored by all industries. In some embodiments, the porous carbon materials of the present disclosure are biochar-derived porous carbon materials (B-PC). In some embodiments, the porous carbon materials of the present disclosure are biochar-derived and nitrogen-containing porous carbon materials (B-NPC). In some embodiments, the biochar source is a carbon-rich material produced by pyrolysis of waste organic feedstock that has been used as a sustainable means to sequester atmospheric carbon, improve soil fertility, waste management and to reduce $CO_2$ emissions. In some embodiments, the porous carbon materials of the present disclosure have a 1.50 g of $CO_2$ uptake capacity per gram of sorbent, which is ~5 times higher than that in Zeolite 5A and 3 times higher than that in ZIF-8 measured under the pressure of 30 bar at 23° C. In some embodiments, the porous carbon materials of the present disclosure (e.g., B-PC and B-NPC) can be spontaneously regenerated when the pressure returns to ambient pressure with the same $CO_2$ uptake performance—a pressure swing capture process. In some embodiments, the porous carbon materials of the present disclosure (e.g., B-PC and B-NPC) can also be used as metal-free catalysts as well as sorbents for low-temperature oxidation of $H_2S$ to elemental sulfur. In some embodiments, the biochars of the present disclosure (e.g., sulfur-rich B-PC and sulfur-rich B-NPC) can be potentially used as cathode materials in lithium-sulfur batteries.

In some embodiments, the porous carbon materials have surface areas ranging from about 2,500 $m^2/g$ to about 4,500 $m^2/g$. Surface areas greater than about 3,000 $m^2/g$ may imply that the sorbent stacks into multilayers within the pore structures and along the surfaces. In some embodiments, the plurality of pores in the porous carbon material comprises diameters ranging from about 1 nm to about 10 nm, and volumes ranging from about 1 $cm^3/g$ to about 3 $cm^3/g$. In some embodiments, the porous carbon material has a density ranging from about 0.3 $g/cm^3$ to about 4 $g/cm^3$.

Additional embodiments of the present disclosure pertain to the porous carbon materials used for gas capture or gas separation or combinations thereof. Further embodiments of the present disclosure pertain to methods of making the porous carbon materials of the present disclosure.

DESCRIPTION OF THE FIGURES

FIG. 5A shows volumetric and gravimetric uptake of $CO_2$ on SPC at different temperatures and pressures. Data designated with (*) were recorded volumetrically. Data designated with (§) were performed volumetrically. Data designated with (+) were measured gravimetrically at NIST. All gravimetric measurements were corrected for buoyancy. FIGS. 5B-D show three consecutive $CO_2$ sorption-desorption cycles on the SPC over a pressure range from 0 to 30 bar at 30° C. All solid circles indicate $CO_2$ sorption, while the open circles designate the desorption process. FIG. 5E show volumetric SPC $CO_2$ sorption isotherms at 23° C. and 50° C. over a pressure range from 0 to 1 bar.

FIG. 6A is adapted from Chem. Sci. 5, 32-51 (2014). The dashed line indicates the Gibbs dividing surface. It divides the free volume into two regions in which gas molecules are either in an adsorbed or bulk state. FIG. 6B shows a depiction of total uptake, which can be used as an approximation for absolute uptake for microporous materials with negligible external surface areas.

FIGS. 8E-F show proposed mechanisms that illustrate the poly ($CO_2$) formation in SPC or NPC, respectively, in a higher pressure $CO_2$ environment. With the assistance of the nucleophile, such as S or N, the $CO_2$ polymerization reaction is initiated under pressure, and the polymer is further likely stabilized by the van der Waals interactions with the carbon surfaces in the pores.

FIG. 11A shows data relating to volumetric $CO_2$ uptake performance at 30° C. of SPC, NPC, R-NPC and the following traditional sorbents: activated carbon, ZIF-8, and zeolite 5A. Aluminum foil was used as a reference to ensure no $CO_2$ condensation was occurring in the system at this temperature and pressure. Volumetric $CO_2$ and $CH_4$ uptake tests at 23° C. on SPC (FIG. 11B), activated carbon (FIG. 11C) and ZIF-8 sorbents (FIG. 11D) are also shown.

FIG. 12A shows MS data that was taken while the system was being pressurized with a premixed gas of $CO_2$ in natural gas during the uptake process. FIG. 12B shows MS data that was recorded while the premixed gas-filled SPC was desorbing from 30 bar. The mixed gas was purchased from Applied Gas Inc.

FIG. 14 shows scanning electron microscopy (SEM) (FIG. 14A) and transmission electron microscopy (TEM) (FIG. 14B) images of A-PCs.

FIG. 16 shows schematic illustrations of the preparation of asphalt-derived porous carbon materials (A-PCs). FIG. 16A shows a scheme of a method of preparing nitrogen-doped A-PCs (A-NPCs) and reduced A-NPCs (A-rNPC). FIG. 16B shows more detailed schemes of methods of preparing A-rNPCs, sulfur-doped APCs (A-SPC), and nitrogen-doped and sulfur doped APCs (A-NSPCs).

FIG. 21 shows the results of TEM EDS elemental mapping of A-rNPCs after $H_2S$ uptake under air treatment. FIG. 21A shows a TEM image of A-rNPC after $H_2S$ uptake. FIG. 21B shows carbon element mapping of A-rNPCs after $H_2S$ uptake. FIG. 21C shows sulfur elemental mapping of A-rNPCs after $H_2S$ uptake.

FIG. 26 shows an SEM image of B-NPC (FIG. 26A), a TEM image of B-NPC (FIG. 26B), a BET isotherm curve of B-NPC, indicating B-NPC is a microporous material with a surface area of 2988 $m^2$/g (FIG. 26C), and a DFT size distribution of B-NPC, showing that the pore size is from 0.5-5 nm (FIG. 26D).

DETAILED DESCRIPTION

Figure 1:
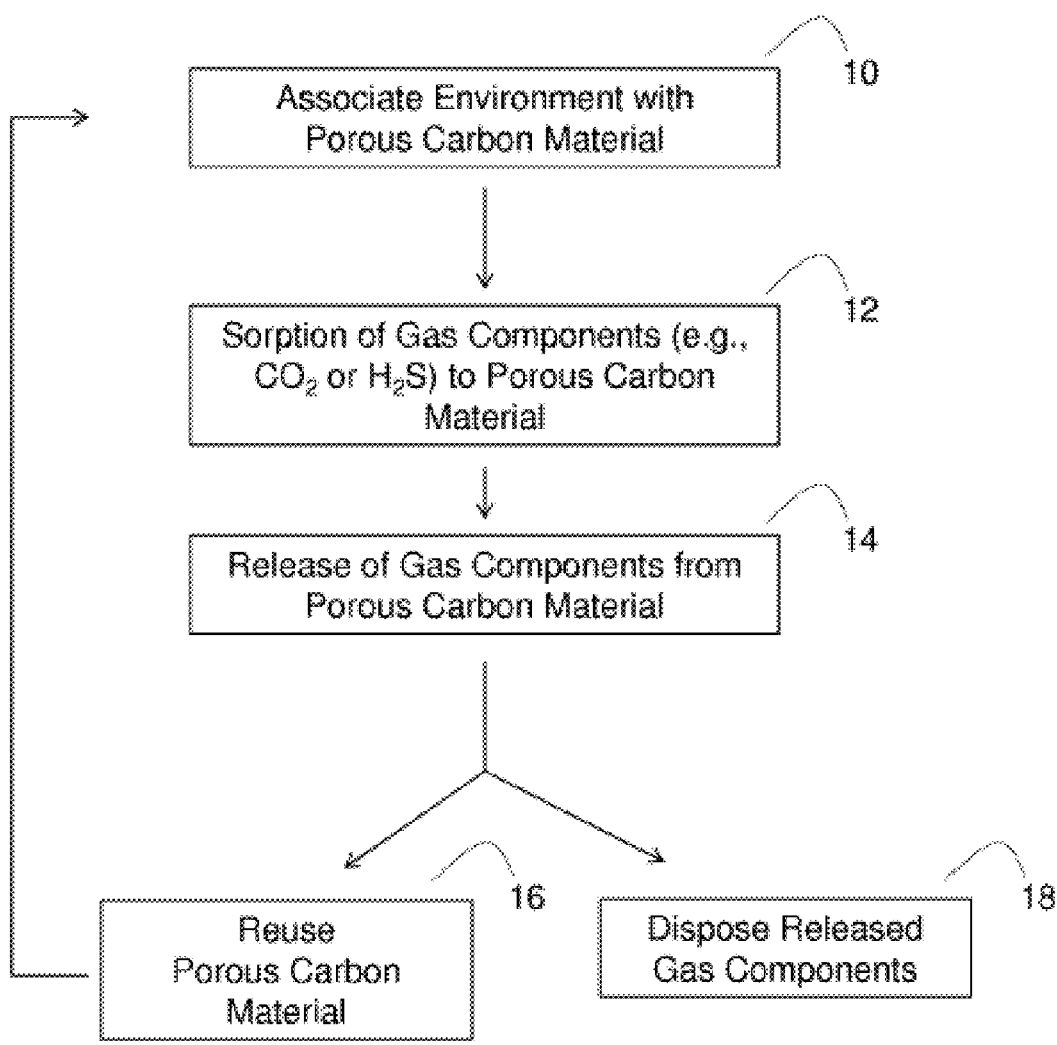
FIG. 1 shows a scheme of a method of utilizing porous carbon materials to capture gas (e.g., carbon dioxide ($CO_2$) or hydrogen sulfide ($H_2S$)) from an environment (FIG. 1).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" respectively encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Environmental and health concerns have been linked to carbon dioxide ($CO_2$) and hydrogen sulfide ($H_2S$) emission sources, such as industrial power plants, refineries and natural gas wells. Therefore, efficient $CO_2$ and $H_2S$ capture from flue gases or other high pressure natural gas wells has been a primary approach in mitigating environmental and health risks. For instance, aqueous amine solvents and membrane technologies have been utilized for $CO_2$ capture. In addition, solid sorbents such as activated carbon, zeolites and metal organic frameworks have been utilized as alternative materials for capturing $CO_2$.

However, many of the aforementioned technologies suffer from numerous limitations. For instance, many $CO_2$ and $H_2S$ capture technologies that utilize aqueous amine solutions are highly energy inefficient due to the high energy requirements for regeneration (e.g., 120° C.-140° C.).

Furthermore, aqueous amines are prone to foaming and are corrosive in nature; often components and piping require stainless steel for construction. They also form non-regenerative, degradative compounds in the system that need to be periodically removed. Moreover, with adsorber columns, regenerative columns, flash tanks, reboilers, and water treatment systems, amine systems have a large equipment footprint and are typically not modular in design, making these acid gas removal systems costly and unsuitable for many gas capture applications, such as offshore use.

Solid $CO_2$ sorbents have shown many advantages over conventional separation technologies that utilize aqueous amine solvents. For instance, solid $CO_2$ sorbents have been shown to capture $CO_2$ under high pressure. Moreover, many solid $CO_2$ sorbents have lower regeneration energy requirements, higher $CO_2$ uptake capacities, selectivity over hydrocarbons, and ease of handling. Moreover, solid $CO_2$ sorbents have shown lower heat capacities, faster kinetics of sorption and desorption, and high mechanical strength. In addition, solid $CO_2$ sorbents have been utilized to capture and release $CO_2$ without significant pressure and temperature swings.

However, a limitation of many solid $CO_2$ sorbents is the cost of production. Many solid $CO_2$ sorbents are also unable to compress and separate $CO_2$ from the sorbents in an efficient manner. Moreover, the $H_2S$ sorption capacities of many solid $CO_2$ sorbents have not been ascertained. Therefore, a need exists for the development of more effective and affordable $CO_2$ and $H_2S$ sorbents. A need also exists for more effective methods of utilizing such sorbents to capture $CO_2$ and $H_2S$ from various environments.

In some embodiments such as illustrated in FIG. 1, the present disclosure pertains to methods of capturing a gas from an environment. In some embodiments, the method includes associating the environment with a porous carbon material (step 10) to result in sorption of gas components (e.g., $CO_2$, $H_2S$, and combinations thereof) to the porous carbon material (step 12). In some embodiments, the methods of the present disclosure also include a step of releasing the gas components from the porous carbon material (step 14). In some embodiments, the methods of the present disclosure also include a step of reusing the porous carbon material after the release of the gas components (step 16). In some embodiments, the methods of the present disclosure also include a step of disposing the released gas components (step 18). In some embodiments, the porous carbon material includes asphalt derived porous carbon materials.

As set forth in more detail herein, the gas capture methods and porous carbon materials of the present disclosure have numerous embodiments. For instance, various methods may be utilized to associate various types of porous carbon materials with various environments to result in the capture of various gas components from the environment. Moreover, the captured gas components may be released from the porous carbon materials in various manners.

Environments

The methods of the present disclosure may be utilized to capture gas from various environments. In some embodiments, the environment includes, without limitation, industrial gas streams, natural gas streams, natural gas wells, industrial gas wells, oil and gas fields, and combinations thereof. In some embodiments, the environment is a subsurface oil and gas field. In more specific embodiments, the methods of the present disclosure may be utilized to capture gas from an environment that contains natural gas, such as an oil well.

In some embodiments, the environment is a pressurized environment. For instance, in some embodiments, the environment has a total pressure higher than atmospheric pressure.

In some embodiments, the environment has a total pressure of about 0.1 bar to about 500 bar. In some embodiments, the environment has a total pressure of about 2.5 bar to about 100 bar. In some embodiments, the environment has a total pressure of about 5 bar to about 100 bar. In some embodiments, the environment has a total pressure of about 25 bar to about 30 bar. In some embodiments, the environment has a total pressure of about 100 bar to about 200 bar. In some embodiments, the environment has a total pressure of about 200 bar to about 300 bar.

Gas Components

The methods of the present disclosure may be utilized to capture various gas components from an environment. For instance, in some embodiments, the captured gas component includes, without limitation, $CO_2$, $H_2S$, and combinations thereof. In some embodiments, the captured gas component includes $CO_2$. In some embodiments, the captured gas component includes $H_2S$. In some embodiments, the captured gas component includes $CO_2$ and $H_2S$.

Association of Porous Carbon Materials with an Environment

Various methods may be utilized to associate porous carbon materials of the present disclosure with an environment. In some embodiments, the association occurs by incubating the porous carbon materials with the environment (e.g., a pressurized environment). In some embodiments, the association of porous carbon materials with an environment occurs by flowing the environment through a structure that contains the porous carbon materials. In some embodiments, the structure may be a column or a sheet that contains immobilized porous carbon materials. In some embodiments, the structure may be a floating bed that contains porous carbon materials.

In some embodiments, the porous carbon materials are suspended in a solvent while being associated with an environment. In some embodiments, the solvent may include water or alcohol. In some embodiments, the porous carbon materials are associated with an environment in pelletized form. In some embodiments, the pelletization can be used to assist flow of the gas component through the porous carbon materials.

In some embodiments, the associating occurs by placing the porous carbon material at or near the environment. In some embodiments, such placement occurs by various methods that include, without limitation, adhesion, immobilization, clamping, and embedding. Additional methods by which to associate porous carbon materials with an environment can also be envisioned.

Gas Sorption to Porous Carbon Materials

The sorption of gas components (e.g., $CO_2$, $H_2S$, and combinations thereof) to porous carbon materials of the present disclosure can occur at various environmental pressures. For instance, in some embodiments, the sorption of gas components to porous carbon materials occurs above atmospheric pressure. In some embodiments, the sorption of gas components to porous carbon materials occurs at total pressures ranging from about 0.1 bar to about 500 bar. In some embodiments, the sorption of gas components to porous carbon materials occurs at total pressures ranging from about 5 bar to about 500 bar. In some embodiments, the sorption of gas components to porous carbon materials occurs at total pressures ranging from about 5 bar to about 100 bar. In some embodiments, the sorption of gas components to porous carbon materials occurs at total pressures ranging from about 25 bar to about 30 bar. In some embodiments, the sorption of gas components to porous carbon materials occurs at total pressures ranging from about 100 bar to about 500 bar. In some embodiments, the sorption of gas components to porous carbon materials occurs at total pressures ranging from about 100 bar to about 300 bar. In some embodiments, the sorption of gas components to porous carbon materials occurs at total pressures ranging from about 100 bar to about 200 bar. In some embodiments, the sorption of gas components to porous carbon materials occurs at between atmospheric pressure and about 100 bar of total or partial pressure.

The sorption of gas components to porous carbon materials can also occur at various temperatures. For instance, in some embodiments, the sorption of gas components to porous carbon materials occurs at temperatures that range from about 0° C. (e.g., a sea floor temperature where a wellhead may reside) to about 100° C. (e.g., a temperature where machinery may reside). In some embodiments, the sorption of gas components to porous carbon materials occurs at ambient temperature (e.g., temperatures ranging from about 20-25° C., such as 23° C.). In some embodiments, the sorption of gas components to porous carbon materials occurs below ambient temperature. In some embodiments, the sorption of gas components to porous carbon materials occurs above ambient temperature. In some embodiments, the sorption of gas components to porous carbon materials occurs without the heating of the porous carbon materials. In some embodiments, the sorption of gas components to porous carbon materials occurs without the heating of the porous carbon materials or the environment.

Without being bound by theory, it is envisioned that the sorption of gas components to porous carbon materials occurs by various molecular interactions between gas components (e.g., $CO_2$ or $H_2S$) and the porous carbon materials. For instance, in some embodiments, the sorption of gas components to porous carbon materials occurs by at least one of absorption, adsorption, ionic interactions, physisorption, chemisorption, covalent bonding, non-covalent bonding, hydrogen bonding, van der Waals interactions, acid-base interactions, and combinations of such mechanisms. In some embodiments, the sorption includes an absorption interaction between gas components (e.g., $CO_2$ or $H_2S$) in an environment and the porous carbon materials. In some embodiments, the sorption includes an ionic interaction between the gas components in an environment and the porous carbon materials. In some embodiments, the sorption includes an adsorption interaction between the gas components in an environment and the porous carbon materials. In some embodiments, the sorption includes a physisorption interaction between the gas components in an environment and the porous carbon materials. In some embodiments, the sorption includes a chemisorption interaction between the gas components in an environment and the porous carbon materials. In some embodiments, the sorption includes a covalent bonding interaction between the gas components in an environment and the porous carbon materials. In some embodiments, the sorption includes a non-covalent bonding interaction between the gas components in an environment and the porous carbon materials. In some embodiments, the sorption includes a hydrogen bonding interaction between the gas components in an environment and the porous carbon materials. In some embodiments, the sorption includes a van der Waals interaction between the gas components in an environment and the porous carbon materials. In some embodiments, the sorption includes an acid-base interaction between the gas components in an environment and the porous carbon materials. In some embodiments, the sorption of gas components to porous carbon materials occurs by adsorption and absorption.

$CO_2$ Sorption

In some embodiments, the sorption of gas components to porous carbon materials includes the sorption of $CO_2$ to the porous carbon materials. In some embodiments, the sorption of $CO_2$ to porous carbon materials occurs at a partial $CO_2$ pressure of about 0.1 bar to about 100 bar. In some embodiments, the sorption of $CO_2$ to porous carbon materials occurs at a partial $CO_2$ pressure of about 5 bar to about 30 bar. In some embodiments, the sorption of $CO_2$ to porous carbon materials occurs at a partial $CO_2$ pressure of about 30 bar.

Without being bound by theory, it is envisioned that $CO_2$ sorption may be facilitated by various chemical reactions. For instance, in some embodiments, the sorbed $CO_2$ is converted to poly ($CO_2$) within the pores of the porous carbon materials. In some embodiments, the poly ($CO_2$) comprises the following formula: $-(O-C(=O))_n-$, where n is equal to or greater than 2. In some embodiments, n is between 2 to 10,000. In some embodiments, the formed poly($CO_2$) may be further stabilized by van der Waals interactions with the carbon surfaces in the pores of the carbon materials. In some embodiments, the formed poly ($CO_2$) may be in solid form. In some embodiments, the poly($CO_2$) matrix can be formed in a layered structure where there is a stacked layering of the $CO_2$ where the $CO_2$ molecules have restricted tumbling and rotations due to an ordered stacked arrangement on the surface.

In some embodiments, the sorbed $CO_2$ may be converted to a matrix of $CO_2$ within the pores of the porous carbon materials. In some embodiments, the matrix of $CO_2$ may be in the form of a matrix of ordered $CO_2$.

In some embodiments, the sorption of $CO_2$ to the porous carbon materials occurs selectively. For instance, in some embodiments, the sorption of $CO_2$ to the porous carbon materials occurs selectively over hydrocarbons in the environment (e.g., ethane, propane, butane, pentane, methane, and combinations thereof). In further embodiments, the molecular ratio of sorbed $CO_2$ to sorbed hydrocarbons in the porous carbon materials is greater than about 2. In additional embodiments, the molecular ratio of sorbed $CO_2$ to sorbed hydrocarbons in the porous carbon materials ranges from about 2 to about 10. In additional embodiments, the molecular ratio of sorbed $CO_2$ to sorbed hydrocarbons in the porous carbon materials is about 8.

In more specific embodiments, the sorption of $CO_2$ to porous carbon materials occurs selectively over the $CH_4$ in the environment. In further embodiments, the molecular ratio of sorbed $CO_2$ to sorbed $CH_4$ ($nCO_2/nCH_4$) in the porous carbon materials is greater than about 2. In additional embodiments, $nCO_2/nCH_4$ in the porous carbon materials ranges from about 2 to about 20. In some embodiments, $nCO_2/nCH_4$ in the porous carbon materials ranges from about 2 to about 10. In more specific embodiments, $nCO_2/nCH_4$ in the porous carbon materials is about 20 at 30 bar.

In some embodiments, sorption of $CO_2$ to porous carbon materials occurs selectively through poly($CO_2$) formation within the pores of the porous carbon materials. Without being bound by theory, it is envisioned that poly($CO_2$) formation within the pores of the porous carbon materials can displace other gas components associated with the porous carbon materials, including any physisorbed gas components and hydrocarbons (e.g., methane, propane, and butane). Without being bound by further theory, it is also envisioned that the displacement of other gas components from the porous carbon materials creates a continual $CO_2$ selectivity that far exceeds various $CO_2$ selectively ranges, including the $CO_2$ selectivity ranges noted above.

In some embodiments, the covalent or stacked dipolar nature of poly($CO_2$) within the pores of the porous carbon materials can be 100 times stronger than that of other physisorbed entities, including physisorbed gas components within the pores of the porous carbon materials. Therefore, such strong covalent bonds or dipolar bonds can contribute to the displacement of the physisorbed gas components (e.g., methane, propane and butane). The dipolar bonds are arranged such that the oxygen of one $CO_2$ is donating into a lone pair electron density in the carbon atom of a neighboring $CO_2$. This pattern can repeat itself in a 1-dimensional, 2-dimensional to 3-dimensional arrangement.

$H_2S$ Sorption

In some embodiments, the sorption of gas components to porous carbon materials includes the sorption of $H_2S$ to the porous carbon materials. In some embodiments, the sorption of $H_2S$ to porous carbon materials occurs at a partial $H_2S$ pressure of about 0.1 bar to about 100 bar. In some embodiments, the sorption of $H_2S$ to porous carbon materials occurs at a partial $H_2S$ pressure of about 5 bar to about 30 bar. In some embodiments, the sorption of $H_2S$ to porous carbon materials occurs at a partial $H_2S$ pressure of about 30 bar.

Without being bound by theory, it is envisioned that $H_2S$ sorption may be facilitated by various chemical reactions. For instance, in some embodiments, sorbed $H_2S$ may be converted within the pores of the porous carbon materials to at least one of elemental sulfur (S), sulfur dioxide ($SO_2$), sulfuric acid ($H_2SO_4$), hydridosulfide ($HS^-$), sulfide ($S^{2-}$) and combinations thereof. In some embodiments, the aforementioned conversion can be facilitated by the presence of oxygen. For instance, in some embodiments, the introduction of small amounts of oxygen into a system containing porous carbon materials can facilitate the conversion of $H_2S$ to elemental sulfur. In some embodiments, the oxygen can be introduced either continuously or periodically. In some embodiments, the oxygen can be introduced from air.

In some embodiments, the captured $H_2S$ is converted by catalytic oxidation to elemental sulfur at ambient temperature. Thereafter, further oxidation to $SO_2$ and $H_2SO_4$ occurs at higher temperatures.

Figure 2:
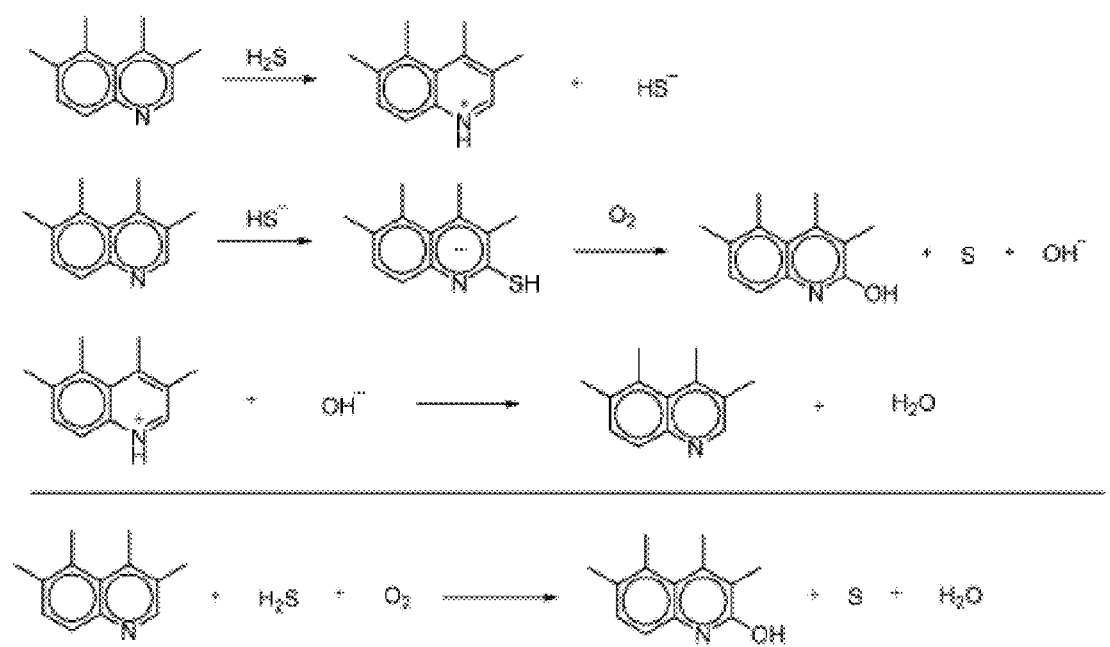
FIG. 2 shows schemes of $CO_2$ capture from materials relating to the formation of chemisorbed oxygen species on porous carbon materials as a result of their reaction with $H_2S$ and $O_2$. The porous carbon material was first reacted with $H_2S$ and air, and then thermalized with or without ammonia, and finally used for reversible $CO_2$ capture.

In some embodiments, nitrogen groups of porous carbon materials may facilitate the conversion of $H_2S$ to elemental sulfur. For instance, in some embodiments illustrated in the schemes in FIG. 2, nitrogen functional groups on porous carbon materials may facilitate the dissociation of $H_2S$ to $HS^-$. In some embodiments, the nitrogen functional groups may also facilitate the formation of chemisorbed oxygen species (Seredych, M.; Bandosz, T. J. J. Phys. Chem. C 2008, 112, 4704-4711).

In some embodiments, the porous carbon material becomes impregnated with the sulfur derived from captured $H_2S$ to form sulfur-impregnated porous carbon materials. In some embodiments, the formation of sulfur-impregnated porous carbon materials may be facilitated by heating. In some embodiments, the heating occurs at temperatures higher than $H_2S$ capture temperatures. In some embodiments, the heating occurs in the absence of oxygen. In some embodiments, the sulfur impregnated porous carbon material can be used to efficiently capture $CO_2$ by the aforementioned methods.

In some embodiments, the sorption of $H_2S$ to porous carbon materials occurs in intact form. In some embodiments, the sorption of $H_2S$ to porous carbon materials in intact form occurs in the absence of oxygen.

$CO_2$ and $H_2S$ Sorption

In some embodiments, the sorption of gas components to porous carbon materials includes the sorption of both $H_2S$ and $CO_2$ to the porous carbon materials. In some embodiments, the sorption of $H_2S$ and $CO_2$ to the porous carbon material occurs at the same time.

In some embodiments, the sorption of $CO_2$ to the porous carbon material occurs before the sorption of $H_2S$ to the porous carbon material. For instance, in some embodiments, a gas containing $CO_2$ and $H_2S$ flows through a structure that contains porous carbon materials (e.g., trapping cartridges). $CO_2$ is first captured from the gas as the gas flows through the structure. Thereafter, $H_2S$ is captured from the gas as the gas continues to flow through the structure.

In some embodiments, the sorption of $H_2S$ to the porous carbon material occurs before the sorption of $CO_2$ to the porous carbon material. For instance, in some embodiments, a gas containing $CO_2$ and $H_2S$ flows through a structure that contains porous carbon materials (e.g., trapping cartridges). $H_2S$ is first captured from the gas as the gas flows through the structure. Thereafter, $CO_2$ is captured from the gas as the gas continues to flow through the structure.

In some embodiments, the porous carbon materials that capture $H_2S$ from the gas include nitrogen-containing porous carbon materials, as described in more detail herein. In some embodiments, the porous carbon materials that capture $CO_2$ from the gas include sulfur-containing porous carbon materials that are also described in more detail herein.

Release of Captured Gas

In some embodiments, the methods of the present disclosure also include a step of releasing captured gas components from porous carbon materials. Various methods may be utilized to release captured gas components from porous carbon materials. For instance, in some embodiments, the releasing occurs by decreasing the pressure of the environment. In some embodiments, the pressure of the environment is reduced to atmospheric pressure or below atmospheric pressure. In some embodiments, the releasing occurs by placing the porous carbon material in a second environment that has a lower pressure than the environment where gas capture occurred. In some embodiments, the second environment may be at or below atmospheric pressure. In some embodiments, the releasing occurs spontaneously as the environmental pressure decreases. This is often referred to as pressure swing sorption or a pressure swing separation process.

The release of captured gas components from porous carbon materials can occur at various pressures. For instance, in some embodiments, the release occurs at or below atmospheric pressure. In some embodiments, the release occurs at total pressures ranging from about 0 bar to about 100 bar. In some embodiments, the release occurs at total pressures ranging from about 0.1 bar to about 50 bar. In some embodiments, the release occurs at total pressures ranging from about 0.1 bar to about 30 bar. In some embodiments, the release occurs at total pressures ranging from about 0.1 bar to about 10 bar. In some embodiments, the release occurs at total pressures ranging from about 0.1 bar to about atmospheric pressure.

The release of captured gas components from porous carbon materials can also occur at various temperatures. In some embodiments, the releasing occurs at ambient temperature. In some embodiments, the releasing occurs at the same temperature at which gas sorption occurred. In some embodiments, the releasing occurs without heating the porous carbon materials. In some embodiments, the releasing occurs without heating the porous carbon materials or the environment. Therefore, in some embodiments, a temperature swing is not required to release captured gas components from porous carbon materials.

In some embodiments, the releasing occurs at temperatures ranging from about 30° C. to about 200° C. In some embodiments, the releasing is facilitated by also lowering the pressure.

In some embodiments, the releasing occurs by heating the porous carbon materials. In some embodiments, the releasing is enhanced by the addition of heat to the porous carbon material or to the environment. For instance, in some embodiments, the releasing occurs by heating the porous carbon materials to temperatures between about 50° C. to about 200° C. In some embodiments, the releasing occurs by heating the porous carbon materials to temperatures between about 75° C. to about 125° C. In some embodiments, the releasing occurs by heating the porous carbon materials to temperatures ranging from about 50° C. to about 100° C. In some embodiments, the releasing occurs by heating the porous carbon materials to a temperature of about 90° C.

In some embodiments, heat for release of gas components from porous carbon materials can be supplied from various sources. For instance, in some embodiments, the heat for the release of gas components from a porous carbon material-containing vessel can be provided by an adjacent vessel whose heat is being generated during a gas sorption step.

In some embodiments, the release of captured gas components from an environment includes the release of captured $CO_2$ from porous carbon materials. Without being bound by theory, it is envisioned that the release of captured $CO_2$ from porous carbon materials can occur by various mechanisms. For instance, in some embodiments, the release of captured $CO_2$ can occur through a depolymerization of the formed poly($CO_2$) within the pores of the porous carbon materials. In some embodiments, the depolymerization can be facilitated by a decrease in environmental pressure. In some embodiments, the releasing of the $CO_2$ occurs by decreasing the pressure of the environment or placing the porous carbon material in a second environment that has a lower pressure than the environment where $CO_2$ capture occurred.

In some embodiments, the release of captured gas components from an environment includes the release of captured $H_2S$ from porous carbon materials. In some embodiments, the captured $H_2S$ is released in intact form.

In some embodiments, $H_2S$ is released from porous carbon materials by heating the porous carbon materials. In some embodiments, $H_2S$ is released from porous carbon materials by heating the porous carbon materials to temperatures that range from about 50° C. to about 200° C. In some embodiments, $H_2S$ is released from the porous carbon materials by heating the porous carbon materials to temperatures between about 75° C. to about 125° C. In some embodiments, $H_2S$ is released from the porous carbon materials by heating the porous carbon materials to temperatures between about 50° C. to about 100° C. In some embodiments, $H_2S$ is released from the porous carbon materials by heating the porous carbon materials to a temperature of about 90° C.

In some embodiments, the release of captured $H_2S$ can occur through conversion of $H_2S$ to at least one of elemental sulfur (S), sulfur dioxide ($SO_2$), sulfuric acid ($H_2SO_4$), hydridosulfide ($HS^-$), sulfide ($S^{2-}$) and combinations thereof. In some embodiments, elemental sulfur is retained on the porous carbon material to form sulfur-impregnated porous carbon materials. In some embodiments, the sulfur-containing porous carbon material can be discarded through incineration or burial. In some embodiments, the sulfur-impregnated porous carbon material can be used for the reversible capture of $CO_2$. In some embodiments, the sulfur-impregnated porous carbon material can be heated to high temperature of 400-900° C. to make a sulfur-impregnated porous carbon used for the reversible capture of $CO_2$.

In some embodiments, the release of captured gas components can occur in a sequential manner. For instance, in some embodiments where the sorbed gas components include both $CO_2$ and $H_2S$, the releasing of the $CO_2$ occurs by decreasing the pressure of the environment or placing the porous carbon material in a second environment that has a lower pressure than the environment where $CO_2$ capture occurred. In some embodiments, the releasing of the $H_2S$ occurs by heating the porous carbon material (e.g., at temperatures ranging from about 50° C. to about 100° C.). In some embodiments, the releasing of the $CO_2$ occurs before the releasing of the $H_2S$. In some embodiments, the releasing of the $H_2S$ occurs before the releasing of the $CO_2$. In some embodiments, the releasing of $H_2S$ occurs in an environment that lacks oxygen.

Disposal of the Released Gas

In some embodiments, the methods of the present disclosure also include a step of disposing the released gas components. For instance, in some embodiments, the released gas components can be off-loaded into a container. In some embodiments, the released gas components can be pumped downhole for long-term storage. In some embodiments, the released gas components can be vented to the atmosphere. In some embodiments, the released gas components include, without limitation, $CO_2$, $H_2S$, $SO_2$, and combinations thereof.

Reuse of the Porous Carbon Material

In some embodiments, the methods of the present disclosure also include a step of reusing the porous carbon materials after gas component release to capture more gas components from an environment. In some embodiments, the porous carbon materials of the present disclosure may be reused over 100 times without substantially affecting their gas sorption capacities. In some embodiments, the porous carbon materials of the present disclosure may be reused over 1000 times without substantially affecting their gas sorption capacities. In some embodiments, the porous carbon materials of the present disclosure may be reused over 10,000 times without substantially affecting their gas sorption capacities.

In some embodiments, the porous carbon materials of the present disclosure may retain 100 wt % of their $CO_2$ or $H_2S$ sorption capacities after being used multiple times (e.g., 100 times, 1,000 times or 10,000 times). In some embodiments, the porous carbon materials of the present disclosure may retain at least 98 wt % of their $CO_2$ or $H_2S$ sorption capacities after being used multiple times (e.g., 100 times, 1,000 times or 10,000 times). In some embodiments, the porous carbon materials of the present disclosure may retain at least 95 wt % of their $CO_2$ or $H_2S$ sorption capacities after being used multiple times (e.g., 100 times, 1,000 times or 10,000 times). In some embodiments, the porous carbon materials of the present disclosure may retain at least 90 wt % of their $CO_2$ or $H_2S$ sorption capacities after being used multiple times (e.g., 100 times, 1,000 times or 10,000 times). In some embodiments, the porous carbon materials of the present disclosure may retain at least 80 wt % of their $CO_2$ or $H_2S$ sorption capacities after being used multiple times (e.g., 100 times, 1,000 times or 10,000 times).

Porous Carbon Materials

Various porous carbon materials may be utilized to capture gas from an environment. In some embodiments, the present disclosure pertains to the porous carbon materials that are utilized to capture gas from an environment.

Carbon Sources

The porous carbon materials of the present disclosure may be derived from various carbon sources. For instance, in some embodiments, the porous carbon material includes, without limitation, protein-derived porous carbon materials, carbohydrate-derived porous carbon materials, cotton-derived porous carbon materials, fat-derived porous carbon materials, waste-derived porous carbon materials, asphalt-derived porous carbon materials, coal-derived porous carbon materials, coke-derived porous carbon materials, asphaltene-derived porous carbon materials, oil product-derived porous carbon materials, bitumen-derived porous carbon materials, tar-derived porous carbon materials, pitch-derived porous carbon materials, anthracite-derived porous carbon materials, melamine-derived porous carbon materials, biochar-derived porous carbon, wood-derived porous carbon and combinations thereof.

In some embodiments, the porous carbon materials of the present disclosure include asphalt-derived porous carbon materials. In some embodiments, the porous carbon materials of the present disclosure include coal-derived porous carbon materials. In some embodiments, the coal source includes, without limitation, bituminous coal, anthracitic coal, brown coal, and combinations thereof.

In some embodiments, the porous carbon materials of the present disclosure include protein-derived porous carbon materials. In some embodiments, the protein source includes, without limitation, whey protein, rice protein, animal protein, plant protein, and combinations thereof.

In some embodiments, the porous carbon materials of the present disclosure include oil product-derived porous carbon materials. In some embodiments, the oil products include, without limitation, petroleum oil, plant oil, and combinations thereof.

In some embodiments, the porous carbon materials of the present disclosure include waste derived porous carbon materials. In some embodiments, the waste can include, without limitation, human waste, animal waste, waste derived from municipality sources, and combinations thereof.

The porous carbon materials of the present disclosure may also be in various states. For instance, in some embodiments, the porous carbon material is carbonized. In some embodiments, the porous carbon material is reduced. In some embodiments, the porous carbon material is vulcanized.

Nucleophilic Moieties

In some embodiments, the porous carbon materials of the present disclosure include a plurality of nucleophilic moieties. In some embodiments, the porous carbon materials of the present disclosure may contain various arrangements of nucleophilic moieties. In some embodiments, the nucleophilic moieties are part of the porous carbon material. In some embodiments, the nucleophilic moieties are embedded within the porous carbon materials. In some embodiments, the nucleophilic moieties are homogenously distributed throughout the porous carbon material framework. In some embodiments, the nucleophilic moieties are embedded within the plurality of the pores of the porous carbon materials.

In some embodiments, the nucleophilic moieties include, without limitation, primary nucleophiles, secondary nucleophiles, tertiary nucleophiles and combinations thereof. In some embodiments, the nucleophilic moieties include, without limitation, oxygen-containing moieties, sulfur-containing moieties, metal-containing moieties, metal oxide-containing moieties, metal sulfide-containing moieties, nitrogen-containing moieties, phosphorous-containing moieties, and combinations thereof.

In more specific embodiments, the nucleophilic moieties include phosphorous-containing moieties. In some embodiments, the phosphorous containing moieties include, without limitation, phosphines, phosphites, phosphine oxides, and combinations thereof.

In some embodiments, the nucleophilic moieties include nitrogen-containing moieties. In some embodiments, the nitrogen-containing moieties include, without limitation, primary amines, secondary amines, tertiary amines, nitrogen oxides, pyridinic nitrogens, pyrrolic nitrogens, graphitic nitrogens, and combinations thereof. In more specific embodiments, the nitrogen containing moieties include nitrogen oxides, such as N-oxides.

In some embodiments, the nitrogen-containing moieties include from about 1 wt % to about 15 wt % by weight of the porous carbon material. In some embodiments, the nitrogen-containing moieties include from about 2 wt % to about 11 wt % by weight of the porous carbon material. In some embodiments, the nitrogen-containing moieties include from about 5 wt % to about 9 wt % by weight of the porous carbon material. In some embodiments, the nitrogen-containing moieties include from about 8 wt % to about 11 wt % by weight of the porous carbon material. In some embodiments, the nitrogen-containing moieties include about 9 wt % by weight of the porous carbon material.

In some embodiments, the nucleophilic moieties include sulfur-containing moieties. In some embodiments, the sulfur-containing moieties include, without limitation, primary sulfurs, secondary sulfurs, sulfur oxides, and combinations thereof.

In some embodiments, the nucleophilic moieties include nitrogen-containing moieties and sulfur-containing moieties. In some embodiments, the nitrogen-containing moieties and sulfur-containing moieties induce $CO_2$ capture by poly($CO_2$) formation. In some embodiments, the nitrogen-containing moieties induce $H_2S$ capture by facilitating oxidation of $H_2S$.

Surface Areas

The porous carbon materials of the present disclosure may have various surface areas. For instance, in some embodiments, the porous carbon materials of the present disclosure have surface areas that range from about 1,000 $m^2$/g to about 4,500 $m^2$/g. In some embodiments, the porous carbon materials of the present disclosure have surface areas that range from about 2,500 $m^2$/g to about 4,500 $m^2$/g. In some embodiments, the porous carbon materials of the present disclosure have surface areas that range from about 2,500 $m^2$/g to about 4,200 $m^2$/g. In more specific embodiments, the porous carbon materials of the present disclosure have surface areas that include at least one of 2,200 $m^2\ g^{-1}$, 2,300 $m^2$/g, 2,600 $m^2$/g, 2,800 $m^2$/g, 2,900 $m^2\ g^{-1}$ or 4,200 $m^2\ g^{-1}$.

Porosities

In some embodiments, the porous carbon materials of the present disclosure include a plurality of pores. In addition, the porous carbon materials of the present disclosure may have various porosities. For instance, in some embodiments, the pores in the porous carbon materials include diameters between about 1 nanometer to about 5 micrometers. In some embodiments, the pores include macropores with diameters of at least about 50 nm. In some embodiments, the pores include macropores with diameters between about 50 nanometers to about 3 micrometers. In some embodiments, the pores include macropores with diameters between about 500 nanometers to about 2 micrometers. In some embodiments, the pores include mesopores with diameters of less than 50 nm and larger than about 2 nm. In some embodiments, the pores include micropores with diameters of less than about 2 nm.

In some embodiments, the pores include diameters that range from about 1 nm to about 10 nm. In some embodiments, the pores include diameters that range from about 1 nm to about 3 nm. In some embodiments, the pores include diameters that range from about 5 nm to about 100 nm. In some embodiments, the pores include diameters that are about 3 nm or less. In some embodiments, the majority of the pores in the porous carbon material include diameters that are about 3 nm or less.

In some embodiments, the porous carbon materials have a uniform distribution of pore sizes. In some embodiments, the uniform pore sizes are about 1.3 nm in diameter.

The pores of the porous carbon materials of the present disclosure may also have various volumes. For instance, in some embodiments, the pores in the porous carbon materials have volumes ranging from about 1 cm$^3$/g to about 10 cm$^3$/g. In some embodiments, the pores in the porous carbon materials have volumes ranging from about 1 cm$^3$/g to about 3 cm$^3$/g. In some embodiments, the pores in the porous carbon materials have volumes ranging from about 1 cm$^3$/g to about 1.5 cm$^3$/g. In more specific embodiments, the plurality of pores in the porous carbon materials have volumes of about 1.1 cm$^3$/g, about 1.2 cm$^3$/g, or about 1.4 cm$^3$/g.

Densities

The porous carbon materials of the present disclosure may also have various densities. For instance, in some embodiments, the porous carbon materials of the present disclosure have densities that range from about 0.3 g/cm$^3$ to about 10 g/cm$^3$. In some embodiments, the porous carbon materials of the present disclosure have densities that range from about 0.3 g/cm$^3$ to about 4 g/cm$^3$. In some embodiments, the porous carbon materials of the present disclosure have densities that range from about 1 g/cm$^3$ to about 3 g/cm$^3$. In some embodiments, the porous carbon materials of the present disclosure have densities that range from about 1 g/cm$^3$ to about 2.5 g/cm$^3$. In some embodiments, the porous carbon materials of the present disclosure have densities that range from about 2 g/cm$^3$ to about 3 g/cm$^3$. In more specific embodiments, the porous carbon materials of the present disclosure have densities of 1.8 g/cm$^3$, 2 g/cm$^3$, or 2.2 g/cm$^3$.

$CO_2$ Sorption Capacities

The porous carbon materials of the present disclosure may also have various sorption capacities. For instance, in some embodiments, the porous carbon materials of the present disclosure have a $CO_2$ sorption capacity (also referred to as $CO_2$ uptake) that ranges from about 10 wt % to about 150 wt % of the porous carbon material weight. In some embodiments, the porous carbon materials of the present disclosure have a $CO_2$ sorption capacity of about 50 wt % to about 150 wt % of the porous carbon material weight. In some embodiments, the porous carbon materials of the present disclosure have a $CO_2$ sorption capacity of about 50 wt % to about 100 wt % of the porous carbon material weight. In some embodiments, the porous carbon materials of the present disclosure have a $CO_2$ sorption capacity of about 50 wt % to about 200 wt % of the porous carbon material weight. In some embodiments, the porous carbon materials of the present disclosure have a $CO_2$ sorption capacity of about 100 wt % to about 150 wt % of the porous carbon material weight. In more specific embodiments, the porous carbon materials of the present disclosure have a $CO_2$ sorption capacity of about 120 wt % to about 130 wt % of the porous carbon material weight.

In further embodiments, the porous carbon materials of the present disclosure have a $CO_2$ sorption capacity of about 0.5 g to about 2 g of $CO_2$ per 1 g of porous carbon material. In some embodiments, the porous carbon materials of the present disclosure have a $CO_2$ sorption capacity of about 1 g to about 2 g of $CO_2$ per 1 g of porous carbon material. In some embodiments, the porous carbon materials of the present disclosure have a $CO_2$ sorption capacity of about 1.2 g to about 1.3 g of $CO_2$ per 1 g of porous carbon material.

In further embodiments, the porous carbon materials of the present disclosure have a $CO_2$ sorption capacity of about 0.6 g to about 2.0 g of $CO_2$ per 1 g of porous carbon material. In some embodiments, the porous carbon materials of the present disclosure have a $CO_2$ sorption capacity of about 1 g to about 1.2 g of $CO_2$ per 1 g of porous carbon material. In some embodiments, the porous carbon materials of the present disclosure have a $CO_2$ sorption capacity of about 1.2 g of $CO_2$ per 1 g of porous carbon material. In some embodiments, the porous carbon materials of the present disclosure have a $CO_2$ sorption capacity of about 0.92 g of $CO_2$ per 1 g of porous carbon material. In some embodiments, the porous carbon materials of the present disclosure have a $CO_2$ sorption capacity of about 0.92 g of $CO_2$ per 1 g of porous carbon material at a $CO_2$ pressure or partial pressure of about 30 bar.

$H_2S$ Sorption Capacities

The porous carbon materials of the present disclosure may also have various $H_2S$ sorption capacities. For instance, in some embodiments, the porous carbon materials of the present disclosure have a $H_2S$ sorption capacity that ranges from about 10 wt % to about 300 wt % of the porous carbon material weight. In some embodiments, the porous carbon materials of the present disclosure have a $H_2S$ sorption capacity of about 50 wt % to about 300 wt % of the porous carbon material weight. In some embodiments, the porous carbon materials of the present disclosure have a $H_2S$ sorption capacity of about 50 wt % to about 250 wt % of the porous carbon material weight. In some embodiments, the porous carbon materials of the present disclosure have a $H_2S$ sorption capacity of about 100 wt % to about 250 wt % of the porous carbon material weight. In more specific embodiments, the porous carbon materials of the present disclosure have a $H_2S$ sorption capacity of about 100 wt % to about 150 wt % of the porous carbon material weight. In some embodiments, Applicant has been able to achieve uptake of 205 wt % $H_2S$ sorption capacity using the asphalt doped porous carbon materials of the present disclosure.

In further embodiments, the porous carbon materials of the present disclosure have a $H_2S$ sorption capacity of about 0.5 g to about 3 g of sulfur from $H_2S$ per 1 g of porous carbon material. In some embodiments, the porous carbon materials of the present disclosure have a $H_2S$ sorption capacity of about 0.5 g to about 2.5 g of sulfur from $H_2S$ per 1 g of porous carbon material. In some embodiments, the porous carbon materials of the present disclosure have a $H_2S$ sorption capacity of about 1 g to about 2.5 g of sulfur from $H_2S$ per 1 g of porous carbon material. In some embodiments, the porous carbon materials of the present disclosure have a $H_2S$ sorption capacity of about 1 g to about 1.5 g of sulfur from $H_2S$ per 1 g of porous carbon material.

Physical States

The porous carbon materials of the present disclosure may be in various states. For instance, in some embodiments, the porous carbon materials of the present disclosure may be in a solid state. In some embodiments, the porous carbon materials of the present disclosure may be in a gaseous state. In some embodiments, the porous carbon materials of the present disclosure may be in a liquid state.

Methods of Forming Porous Carbon Materials

In some embodiments, the present disclosure pertains to methods of forming the porous carbon materials of the present disclosure. In some embodiments, methods include carbonizing a carbon source to form porous carbon materials and may also include a step of doping the carbon source. In some embodiments, the methods of the present disclosure also include a step of vulcanizing the carbon source. In some embodiments, the methods of the present disclosure also include a step of reducing the formed porous carbon material. In some embodiments, by pre-treating the carbon source prior to carbonization, no further treatment of the porous carbon is necessary.

As set forth in more detail herein, various methods may be utilized to carbonize various types of carbon sources. In addition, various methods may be utilized to dope and vulcanize the carbon sources. Likewise, various methods may be utilized to reduce the formed porous carbon materials.

Carbon Sources

Various carbon sources may be utilized to form porous carbon materials. Suitable carbon sources were described previously. In some embodiments, the carbon sources include, without limitation, protein, carbohydrates, cotton, fat, waste, asphalt, coal, coke, asphaltene, oil products, bitumen, tar, pitch, anthracite, melamine, and combinations thereof.

In some embodiments, the carbon source includes asphalt. In some embodiments, the carbon source includes coal. In some embodiments, the coal source includes, without limitation, bituminous coal, anthracitic coal, brown coal, and combinations thereof. In some embodiments, the carbon source includes protein. In some embodiments, the protein source includes, without limitation, whey protein, rice protein, animal protein, plant protein, and combinations thereof.

In some embodiments, the carbon source includes oil products. In some embodiments, the oil products include, without limitation, petroleum oil, plant oil, and combinations thereof.

Carbonizing

In the present disclosure, carbonization generally refers to processes or treatments that convert a carbon source (e.g., a non-porous carbon source) to a porous carbon material. Various methods and conditions may be utilized to carbonize carbon sources.

For instance, in some embodiments, the carbonizing occurs in the absence of a solvent. In some embodiments, the carbonizing occurs in the presence of a solvent.

In some embodiments, the carbonizing occurs by exposing the carbon source to a carbonizing agent. In some embodiments, the carbonizing agent includes metal hydroxides or metal oxides. In some embodiments, the carbonizing agent includes, without limitation, potassium hydroxide (KOH), sodium hydroxide (NaOH), lithium hydroxide (LiOH), cesium hydroxide (CsOH), magnesium hydroxide ($Mg(OH)_2$), calcium hydroxide ($Ca(OH)_2$), and combinations thereof. In some embodiments, the carbonizing agent includes potassium hydroxide (KOH). In some embodiments, the carbonizing agent can be a metal oxide. In some embodiments, the metal oxide includes, without limitation, calcium oxide (CaO), magnesium oxide (MgO), and combinations thereof. In some embodiments, the weight ratio of the carbon source to the carbonizing agent varies from about 1:1 to about 1:5. In some embodiments, the weight ratio of the carbon source to the carbonizing agent is about 1:4.

In some embodiments, the carbonizing occurs by grinding the carbon source in the presence of a carbonizing agent. In some embodiments, the grinding occurs in a mortar. In some embodiments, the grinding includes ball milling. In some embodiments, the grinding results in the formation of a homogenous solid powder.

In some embodiments, the carbon source and the carbonizing agent can be mixed in a solvent. In some embodiments, the solvent is evaporated after mixing. In some embodiments, the evaporation is followed by the carbonization of the carbon source at elevated temperature. In some embodiments, the carbon source is the solvent, and the carbonizing agent is added prior to carbonization at elevated temperatures.

Figure 31:
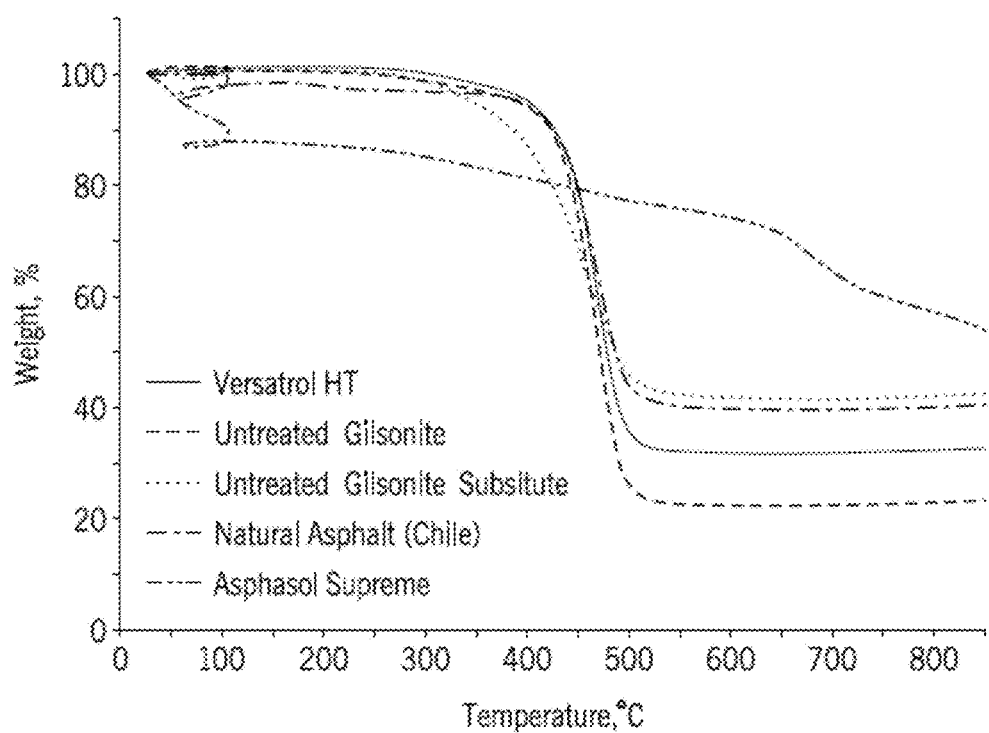
FIG. 31 shows TGA curves of asphalts from different sources and the removal of volatile oils between 400° C. and 500° C.

In some embodiments, the carbonizing occurs by heating the carbon source at temperatures ranging from about 200° C. to about 1000° C. In some embodiments, the heating occurs at temperatures greater than 500° C. In some embodiments, the heating occurs at temperatures of about 500° C. to about 1000° C. In some embodiments, the heating occurs at temperatures of about 600° C. to about 900° C. In some embodiments, the carbon source is pre-treated at a temperature between 300° C. to 400° C. to remove volatile oils from the carbon source. For instance, FIG. 31 shows the successful removal of volatile oils by pre-treatment, as measured using TGA.

In some embodiments, it is also possible to separate these oils from the carbon source at lower temperatures using a reduced pressure atmosphere. After the removal of volatiles, the carbon source can subsequently be homogenized with potassium hydroxide and then heated to temperatures greater than 600° C. For example, by pre-treating asphalt at 400° C. prior to carbonizing with KOH, the resultant porous carbon has very high $CO_2$ uptake, matching or exceeding the performance of A-NPC and A-rNPC. Furthermore, pre-treated asphalt-derived porous carbons show an increase in $CO_2$ selectivity. No additives are required to achieve the aforementioned increased $CO_2$ uptake and selectivity.

In some embodiments, the carbonizing occurs in an inert atmosphere. In some embodiments, the inert atmosphere includes a steady flow of an inert gas, such as argon.

Doping

In some embodiments, the methods of the present disclosure also include a step of doping a carbon source with a dopant. In some embodiments, the dopant includes, without limitation, nitrogen-containing dopants, sulfur-containing dopants, heteroatom-containing dopants, oxygen-containing dopants, sulfur-containing dopants, metal-containing dopants, metal oxide-containing dopants, metal sulfide-containing dopants, phosphorous-containing dopants, and combinations thereof.

In some embodiments, the dopant includes nitrogen-containing dopants. In some embodiments, the nitrogen-containing dopants include, without limitation, primary amines, secondary amines, tertiary amines, nitrogen oxides, pyridinic nitrogens, pyrrolic nitrogens, graphitic nitrogens, and combinations thereof. In some embodiments, the nitrogen-containing dopant includes $NH_3$.

In some embodiments, the dopant includes sulfur-containing dopants. In some embodiments, the sulfur-containing dopants include, without limitation, primary sulfurs, secondary sulfurs, sulfur oxides, and combinations thereof. In some embodiments, the sulfur-containing dopants include $H_2S$.

In some embodiments, the dopants include monomers, such as nitrogen-containing monomers. In some embodiments, the monomers are subsequently polymerized.

Doping can occur at various temperatures. For instance, in some embodiments, the doping occurs at temperatures ranging from about 200° C. to about 800° C. In some embodiments, the doping occurs at temperatures ranging from about 600° C. to about 700° C. In some embodiments, the doping occurs at about 650° C. to about 700° C.

Various amounts of dopants may be utilized. For instance, in some embodiments, the weight ratio of the dopant to the carbon source varies from about 0.2:1 to about 1:1. In some embodiments, the weight ratio of the dopant to the carbon source is about 1:1.

Vulcanization

In some embodiments, the methods of the present disclosure also include a step of vulcanizing the carbon source. In some embodiments, the vulcanizing includes exposing the carbon source to a vulcanizing agent. In some embodiments, the vulcanizing agent includes, without limitation, sulfur-based agents, peroxides, urethane cross-linkers, metallic oxides, acetoxysilane, and combinations thereof. In some embodiments, the vulcanizing agent includes, without limitation, tetramethyldithiuram, 2,2'-dithiobis(benzothiazole), and combinations thereof.

Various amounts of vulcanizing agents may be utilized. For instance, in some embodiments, the weight ratio of the vulcanization agent to the carbon source varies from about 5 wt % to about 200 wt % relative to the carbon source.

Reduction

In some embodiments, the methods of the present disclosure include a step of reducing the formed porous carbon material. In some embodiments, the reducing occurs by exposing the formed porous carbon material to a reducing agent. In some embodiments, the reducing agent includes, without limitation, $H_2$, $NaBH_4$, hydrazine, and combinations thereof. In some embodiments, the reducing agent includes $H_2$.

The methods of the present disclosure may be utilized to make bulk quantities of porous carbon materials. For instance, in some embodiments, the methods of the present disclosure can be utilized to make porous carbon materials in quantities greater than about 1 g. In some embodiments, the methods of the present disclosure can be utilized to make porous carbon materials in quantities greater than about 1 kg. In some embodiments, the methods of the present disclosure can be utilized to make porous carbon materials in quantities greater than about 1000 kg.

In some embodiments, the porous carbon materials of the present disclosure are produced from a high fixed carbon content precursor that includes, without limitation, biochar, hydrochar, coal, lignite, biomass, organic substances containing heteroatoms such as nitrogen or sulfur, and combinations thereof. In some embodiments, the precursor is heated at temperatures greater than 600° C. In some embodiments, $CO_2$ selectivity and $CO_2$ capacity of the porous carbon material is enhanced by functionalization of the porous carbon material surface during such heating. In some embodiments, the precursor is activated at a temperature between about 650° C. and about 1000° C. in the presence of an amount of activating agent in order to create and maintain micropores within the porous carbon material.

Advantages

The gas capture methods and the porous carbon materials of the present disclosure provide numerous advantages over prior gas sorbents. For instance, the porous carbon materials of the present disclosure provide significantly higher $CO_2$ and $H_2S$ sorption capacities than prior sorbents. Moreover, due to the availability and affordability of the starting materials, the porous carbon materials of the present disclosure can be made in a facile and economical manner in bulk quantities. Furthermore, unlike traditional gas sorbents, the porous carbon materials of the present disclosure can selectively capture and release $CO_2$ and $H_2S$ at ambient temperature without requiring a temperature swing. As such, the porous carbon materials of the present disclosure can avoid substantial thermal degradation and be used effectively over successive cycles without losing their original $CO_2$ and $H_2S$ sorption capacities.

Accordingly, the gas capture methods and the porous carbon materials of the present disclosure can find numerous applications. For instance, in some embodiments, the gas capture methods and the porous carbon materials of the present disclosure can be utilized for the capture of $CO_2$ and $H_2S$ from subsurface oil and gas fields. In more specific embodiments, the process may take advantage of differential pressures commonly found in natural gas collection and processing streams as a driving force during $CO_2$ and $H_2S$ capture. For instance, in some embodiments, the methods of the present disclosure may utilize a natural gas-well pressure (e.g., a natural gas well pressure of 200 to 300 bar) as a driving force during $CO_2$ and $H_2S$ capture. Thereafter, by lowering the pressure back to ambient conditions after $CO_2$ and $H_2S$ uptake, the captured gas can be off-loaded or pumped back downhole into the structures that had held it for geological timeframes. Moreover, the gas capture methods and the porous carbon materials of the present disclosure can allow for the capture and reinjection of $CO_2$ and $H_2S$ at the natural gas sites, thereby leading to greatly reduced $CO_2$ and $H_2S$ emissions from natural gas streams.

In some embodiments, the methods of the present disclosure can be utilized for the selective release of captured $CO_2$ and $H_2S$. For instance, in some embodiments where a porous carbon material has captured both $CO_2$ and $H_2S$, the lowering of environmental pressure can result in the release of $CO_2$ from the porous carbon material and the retainment of the captured $H_2S$ from the porous carbon material. Thereafter, the captured $H_2S$ may be released from the porous carbon material by heating the porous carbon material (e.g., at temperatures between about 50° C. to about 100° C.). In additional embodiments where a porous carbon material has captured both $CO_2$ and $H_2S$, the heating of the porous carbon material (e.g., at temperatures between about 50° C. to about 100° C.) can result in the release of the captured $H_2S$ and the retainment of the captured $CO_2$. Thereafter, the lowering of environmental pressure can result in the release of $CO_2$ from the porous carbon.

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Capture of $CO_2$ by Sulfur- and Nitrogen-Containing Porous Carbons

In this Example, nucleophilic porous carbons are synthesized from simple and inexpensive carbon-sulfur and carbon-nitrogen precursors. Infrared, Raman and 13C nuclear magnetic resonance signatures substantiate $CO_2$ fixation by polymerization in the carbon channels to form poly($CO_2$) under much lower pressures than previously required. This growing chemisorbed sulfur- or nitrogen-atom-initiated poly($CO_2$) chain further displaces physisorbed hydrocarbon, providing a continuous $CO_2$ selectivity. Once returned to ambient conditions, the poly($CO_2$) spontaneously depolymerizes, leading to a sorbent that can be easily regenerated without the thermal energy input that is required for traditional sorbents.

More specifically, Applicants show in this Example that the new carbon materials can be used to separate $CO_2$ from various environments (e.g., natural gas), where 0.82 g of $CO_2$ per g of sorbent (82 wt %) can be captured at 30 bar. A mechanism is described where $CO_2$ is polymerized in the channels of the porous carbon materials, as initiated by the sulfur or nitrogen atoms that are part of the carbon framework. Moreover, no temperature swing is needed. The reaction proceeds at ambient temperature. Without being bound by theory, it is envisioned that heat transfer between cylinders during the exothermic sorption and endothermic desorption can provide the requisite thermodynamic exchanges.

In some instances, the process can use the natural gas-well pressure of 200 to 300 bar as a driving force during the polymerization. By lowering the pressure back to ambient conditions after $CO_2$ uptake, the poly($CO_2$) is then depolymerized, where it can be off-loaded or pumped back downhole into the structures that had held it for geological timeframes.

Example 1.1 Synthesis and Characterization of Porous Carbons

Sulfur- and nitrogen-containing porous carbons (SPC and NPC, respectively) were prepared by treating bulk precursor polymers with potassium hydroxide (KOH) at 600° C., as described previously (*Carbon* 44, 2816-2821 (2006); *Carbon* 50, 5543-5553 (2012)).

Figures 3, 3A, 3B, 3C, 3D:
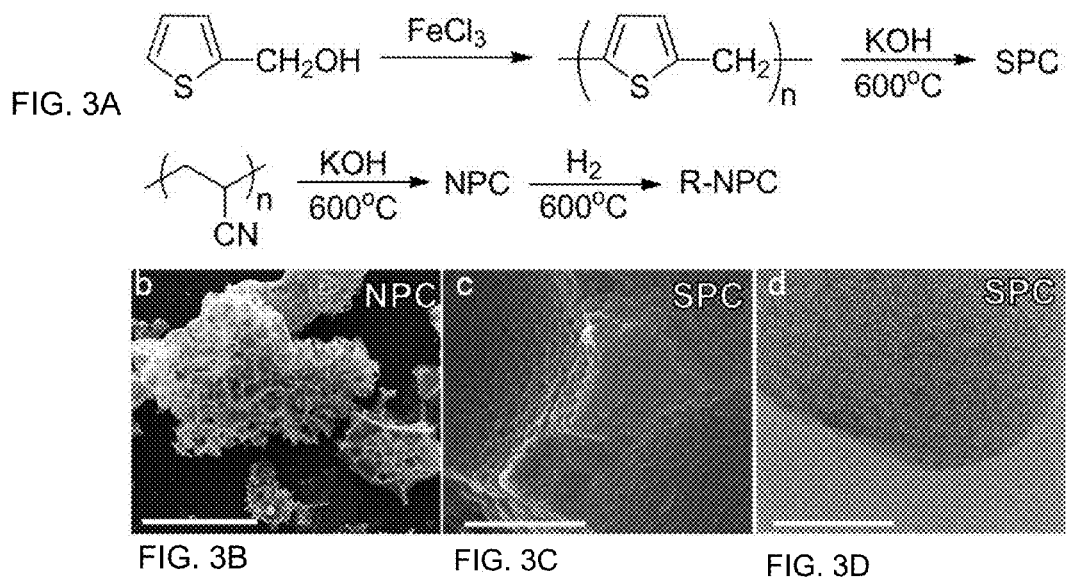
FIG. 3 shows synthetic schemes and micrographic images of various porous carbon materials.
FIG. 3A provides a scheme for the synthesis of sulfur-containing porous carbon (SPC) or nitrogen containing porous carbon (NPC) by treating poly[(2-hydroxymethyl)thiophene] or poly(acrylonitrile) with KOH at 600° C. and then washing with dilute HCl and water until the extracts are neutral. The NPC is further reduced using 10% $H_2$ at 600° C. to form reduced NPC (R-NPC). The synthetic details are described in Example 1.
FIG. 3B shows a scanning electron microscopy (SEM) image of NPCs at a scale bar of 100 μm.
FIG. 3C shows an SEM image of SPCs at a scale bar of 500 nm.
FIG. 3D shows a transmission electron microscopy (TEM) image of the SPCs in FIG. 3B at a scale bar of 25 nm.
Figure 4:
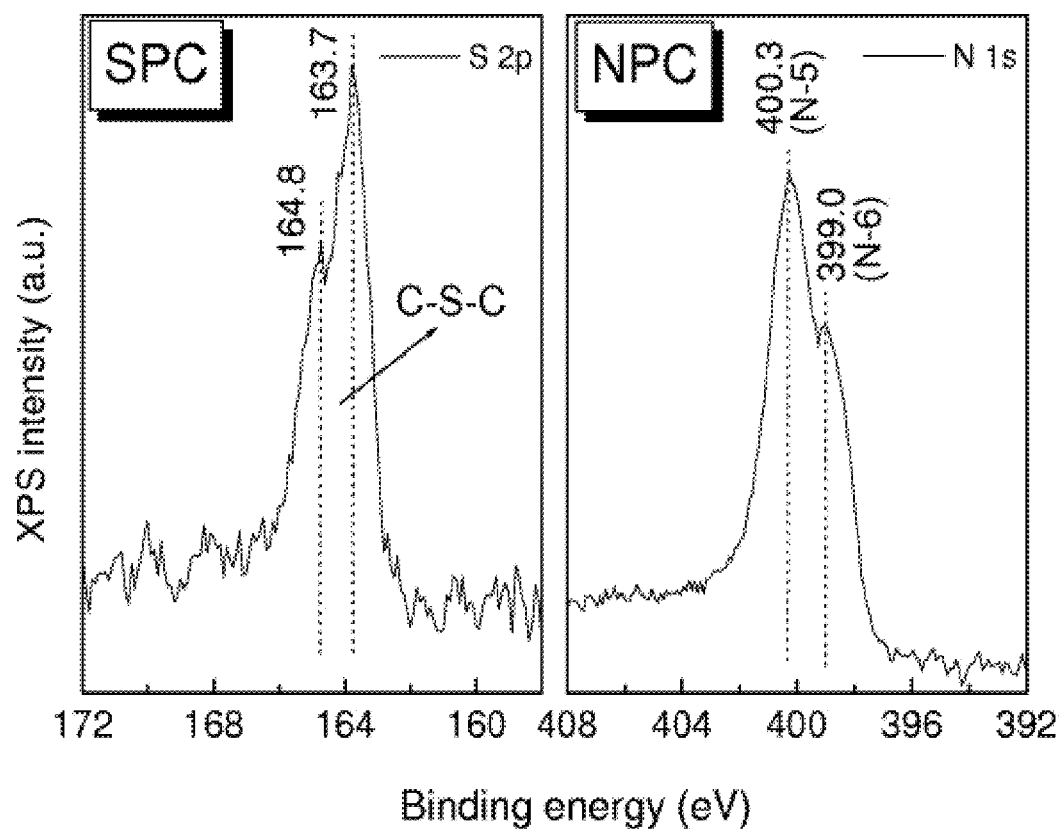
FIG. 4 shows x-ray photoelectron spectroscopy (XPS) of SPCs (left panel) and NPCs (right panel). The XPS indicates 13.3 atomic % of S in the SPC precursor and 22.4 atomic % of N in the NPC precursor. The resulting SPC and NPC then had 8.1 atomic % of S content and 6.2 atomic % of N content, respectively. The S2p and N1, XPS peaks were taken from the SPC and NPC. The S2p core splits into two main peaks of 163.7 (2p312) and 164.8 eV (2p112), which correspond to thiophenic sulfur atoms incorporated into the porous carbon framework via the formation of C—S—C bond. The N1 reflects two different chemical environments: pyridinic nitrogen (N-6) and pyrrolic nitrogen (N-5) atoms.

As shown in FIG. 3A, the resulting products were solid porous carbon materials with homogeneously distributed sulfur or nitrogen atoms incorporated into the carbon framework. They exhibited pores and channel structures as well as high surface areas of 2500 and 1490 $m^2/g$ ($N_2$, Brunauer-Emmett-Teller) for the SPC and the NPC, respectively, with pore volumes of 1.01 cm 3 $g^{-1}$ and 1.40 $cm^3$ g, respectively. The scanning electron microscopy (SEM) and transmission electron microscopy (TEM) images are shown in FIGS. 3B-D, and the X-ray photoelectron spectroscopy (XPS) analyses are shown in FIG. 4.

Example 1.2 $CO_2$ Uptake Measurements

For $CO_2$ uptake measurements, samples were analyzed using volumetric analysis instruments. The measurements were further confirmed with gravimetric measurements.

Figure 5:
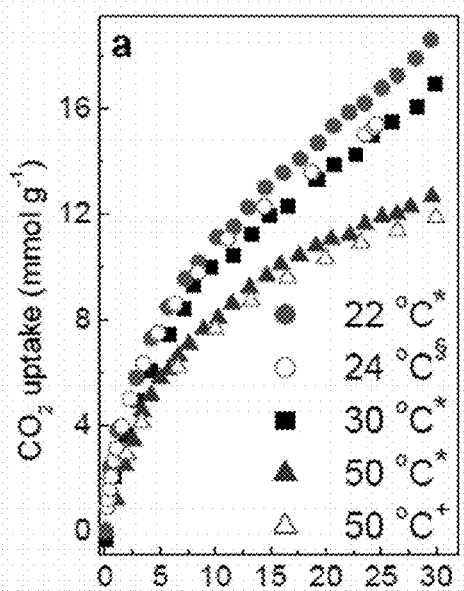
FIG. 5 shows data relating to $CO_2$ uptake measurements for SPCs.
Figure 5:
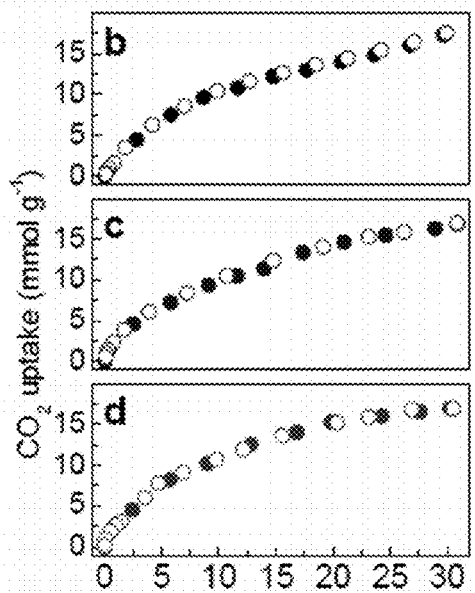
Figure 5:
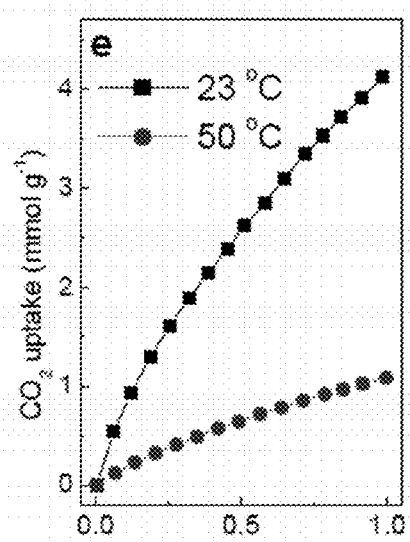

FIG. 5 shows the pressure-dependent $CO_2$ excess uptake for the SPC sorbent at different temperatures peaking at 18.6 mmol $CO_2$ $g^{-1}$ of sorbent (82 wt %) when at 22° C. and 30 bar. The sorption results measured by volumetric and gravimetric analyses were comparable, as were those measurements on the two volumetric instruments.

Applicants chose 30 bar as the upper pressure limit in experiments because a 300 bar well-head pressure at 10 mol % $CO_2$ concentration would have a $CO_2$ partial pressure of 30 bar. FIGS. 5B-D show three consecutive $CO_2$ sorption-desorption cycles on SPC over a pressure range from 0 to 30 bar, which indicates that the SPC could be regenerated using a pressure swing process while retaining its original $CO_2$ sorption capacity.

In the case of microporous materials with negligible external surface area, total uptake is often used as an approximation for absolute uptake, and the two values here are within 10% of each other. For example, the absolute $CO_2$ uptake of the SPC was 20.1 and 13.9 mmol/g under 30 bar at 22° and 50° C., respectively. See FIGS. 6-7 and Example 1.8.

Similarly, although absolute adsorption isotherms can be used to determine the heat of sorption, excess adsorption isotherms are more often used to calculate the heat of $CO_2$ sorption ($QCO_2$) before the critical point of the gas. Thus, the excess $CO_2$ sorption isotherms measured at two different temperatures, 23° C. and 50° C. (FIG. 5E), were input into the Clausius-Clapeyron equation. At lower surface coverage (≤1 bar), which could be expected to be more indicative of the sorbate-sorbent interaction, the SPC exhibits a heat of $CO_2$ sorption of 57.8 kJ/$mol^{-1}$. Likewise, the maximum $QCO_2$ values for nucleophile-free porous materials, such as activated carbon, Zeolite 5A and zeolitic imidazolate framework (ZIF-8, a class of the MOF) were measured to be 28.4, and 31.2, 25.6 kJ/mol, respectively, at low surface coverage (see Example 1.9). Based on this data, the SPC possesses the highest $CO_2$ sorption enthalpy among these complementary sorbents measured at low surface coverage.

In order to better assess the sorption mechanism during the $CO_2$ uptake, attenuated total reflectance infrared spectroscopy (ATR-IR) was used to characterize the properties of the sorbents before and after the $CO_2$ uptake. A sample vial with ~100 mg of the SPC was loaded into a 0.8 L stainless steel autoclave equipped with a pressure gauge and valves. Before the autoclave was sealed, the chamber was flushed with $CO_2$ (99.99%) to remove residual air, and the system was pressurized to 10 bar (line pressure limitation). The sorbent was therefore isobarically exposed to $CO_2$ in the closed system at 23° C. After 15 min, the system was vented to nitrogen at ambient pressure and the sorbent vial was immediately removed from the chamber and the sorbent underwent ATR-IR and Raman analyses in air.

Figure 8:
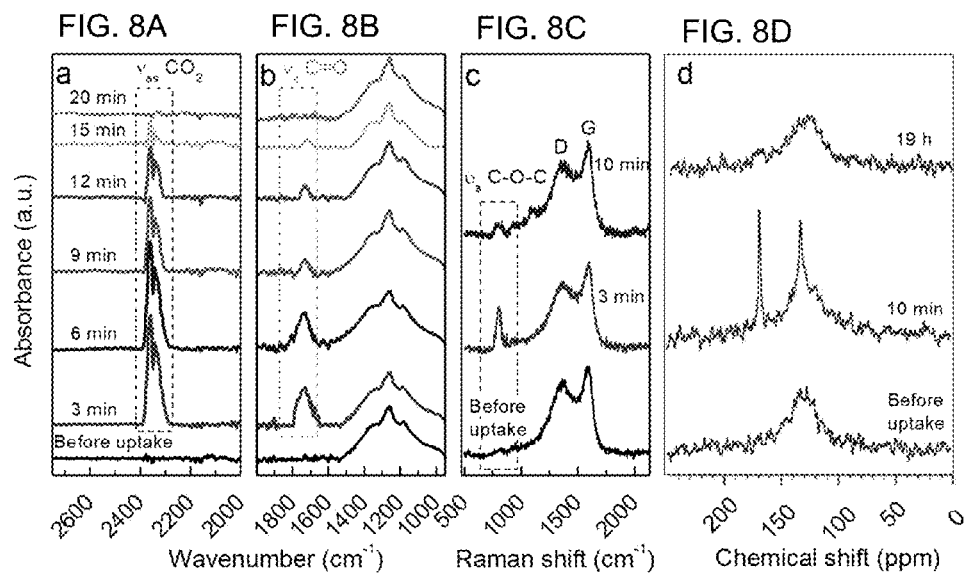
FIG. 8 shows spectral changes before and after sorption-desorption at 23° C. and the proposed polymerization mechanism. Attenuated total reflectance infrared spectroscopy (ATR-IR) (FIGS. 8A-B), Raman spectroscopy (FIG. 8C) and 50.3 MHz $^{13}C$ MAS NMR spectra (FIG. 8D) are shown before and after $CO_2$ sorption at 10 bar and room temperature. All spectra were recorded at the elapsed times indicated on the graphs after the SPC sorbent was returned to ambient pressure. In the NMR experiments, the rotor containing the SPC was tightly capped during the analyses. For the third NMR experiment (top), the same material was left under ambient conditions for 19 h before being repacked in the rotor to obtain the final spectrum. Each NMR spectrum took 80 min to record. Example 1 shows more details.
Figure 8:
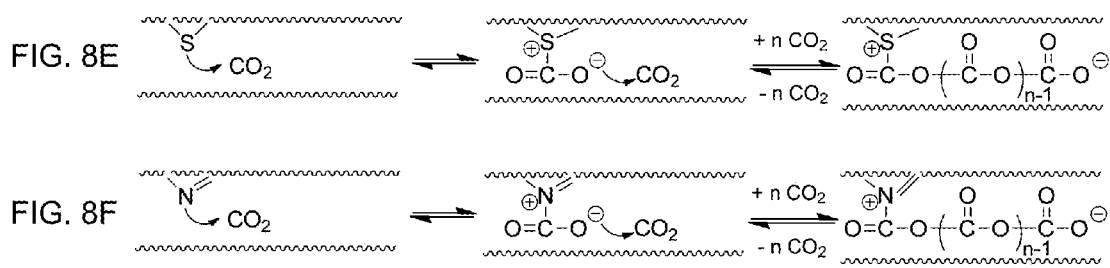
Figure 9:
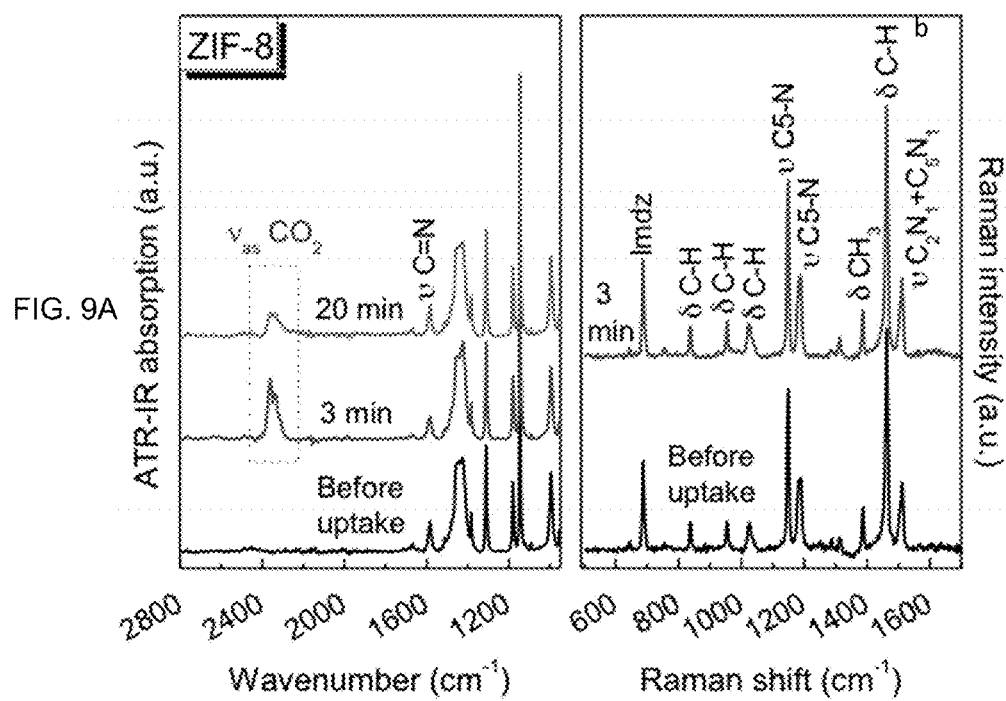
FIG. 9 shows ATR-IR (FIG. 9A) and Raman (FIG. 9B) spectra for the ZIF-8 before and after $CO_2$ sorption at 10 bar. All spectra were recorded 3 and 20 minutes after the ZIF-8 sorbent was returned to ambient pressure at room temperature.
Figure 10:
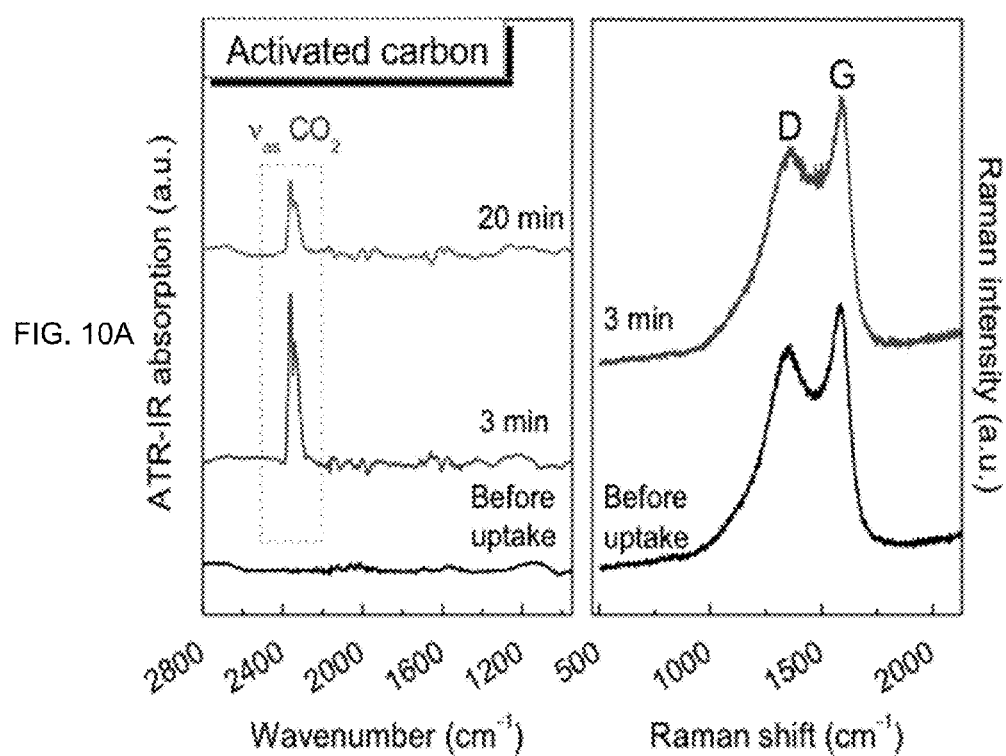
FIG. 10 shows ATR-IR (FIG. 10A) and Raman (FIG. 10B) spectra for the activated carbon before and after $CO_2$ sorption at 10 bar. Spectra were taken 3 min and 20 min after the activated carbon was returned to ambient pressure at room temperature.

FIGS. 8A-B show the ATR-IR spectra of the SPC before (black line) and after exposure to 10 bar of $CO_2$, followed by ambient conditions for the indicated times. The two regions that appear in the ATR-IR spectra (outlined by the dashed-line boxes) after the $CO_2$ sorption are of interest. The first IR peak, located at 2345 $cm^{-1}$, is assigned to the anti-symmetric $CO_2$ stretch, confirming that $CO_2$ was physisorbed and evolving from the SPC sorbent. The other IR band, centered at 1730 $cm^{-1}$, is attributed to the C=O symmetric stretch from the poly($CO_2$) on the SPC. Interestingly, this carbonyl peak is only observed with the porous heteroatom-doped carbon, such as the SPC and NPC. Other porous sorbents without nucleophilic species, such as ZIF-8 and activated carbon, only showed the physisorbed or evolving $CO_2$ peak (2345 $cm^{-1}$) (FIGS. 9-10). Once the $CO_2$-filled SPC returned to ambient pressure, the key IR peaks attenuated over time and disappeared after 20 min. Based on this data, the ATR-IR study confirmed the poly($CO_2$) formation. Raman spectroscopy was further used to probe individual chemical bond vibrations, as shown in FIG. 8C. The carbonaceous graphitic G-band and defect-derived diamonoid D-band were at 1590 and 1350 $cm^{-1}$. The peak at 798 $cm^{-1}$ can be attributed to the symmetric stretch of the C—O—C bonds, which was not observed for the other nucleophile-free porous materials, suggesting that the poly ($CO_2$), with the —(O—C(=O))n-moiety, was formed.

Without being bound by theory, it is envisioned that the monothiocarbonate and carbamate anions within the channels of the SPC and NPC, respectively, were the likely initiation points for the $CO_2$ polymerization since no poly ($CO_2$) was seen in activated carbon (FIG. 10). Furthermore, 13C NMR also confirms the presence of the poly($CO_2$) formation. The sorbent gives a broad signal characteristic of aromatic carbon (FIG. 8D, bottom).

After exposure to $CO_2$, a relatively sharp signal on top of the broad sorbent signal appears at 130.6 ppm, which can be assigned to the $CO_2$ that is evolving from the support. A sharp signal also appears at 166.5 ppm (FIG. 8D, middle) that is characteristic of the carbonyl resonance for poly ($CO_2$). Both of these signals are gone 19 h later (FIG. 8D, top). These assignments are further discussed in detail in Example 1.10.

Compared to secondary amine-based $CO_2$ sorbents where maximum capture efficiency is 0.5 mol $CO_2$ per mol N ($_2RNH_2 + CO_2 \rightarrow RNH_2 + -O_2CNHR$), the SPC and NPC demonstrate a unique mechanism during the $CO_2$ uptake process resulting in their remarkably higher $CO_2$ capacities versus S or N content (8.1 atomic % of S and 6.2 atomic % of N in the SPC and NPC, respectively, by XPS analysis).

FIGS. 8E and 8F show illustrations of the aforementioned $CO_2$-fixation by polymerization. Dimeric $CO_2$ uptake has been crystallographically observed in metal complexes, and polymeric $CO_2$ has been detected previously but only at extremely high pressures of ~15,000 bar. The spectroscopic determination here confirms poly($CO_2$) formation at much lower pressures than formerly observed.

A series of porous materials with and without the nucleophilic heteroatoms were tested to compare their $CO_2$ capture performance up to 30 bar at 30° C. (FIG. 10A). The SPC had the highest $CO_2$ capacity. The NPC, activated carbon, zeolite 5A and ZIF-8 had lower capacities. Although NPC had lower $CO_2$ capacity than SPC, its uptake performance could be improved by 21 wt % after $H_2$ reduction at 600° C., producing reduced-NPC (R-NPC) with secondary amine groups (FIG. 3A).

Even though the surface area of R-NPC (1450 $m^2$ g) is only slightly greater than that of the activated carbon (1430 $m^2$ g), the presence of the amine groups induces the formation of the poly(CO2) under pressure, promoting the $CO_2$ sorption efficiency of the R-NPC. The pore volume of R-NPC is 1.43 $cm^3$ g.

Figure 11:
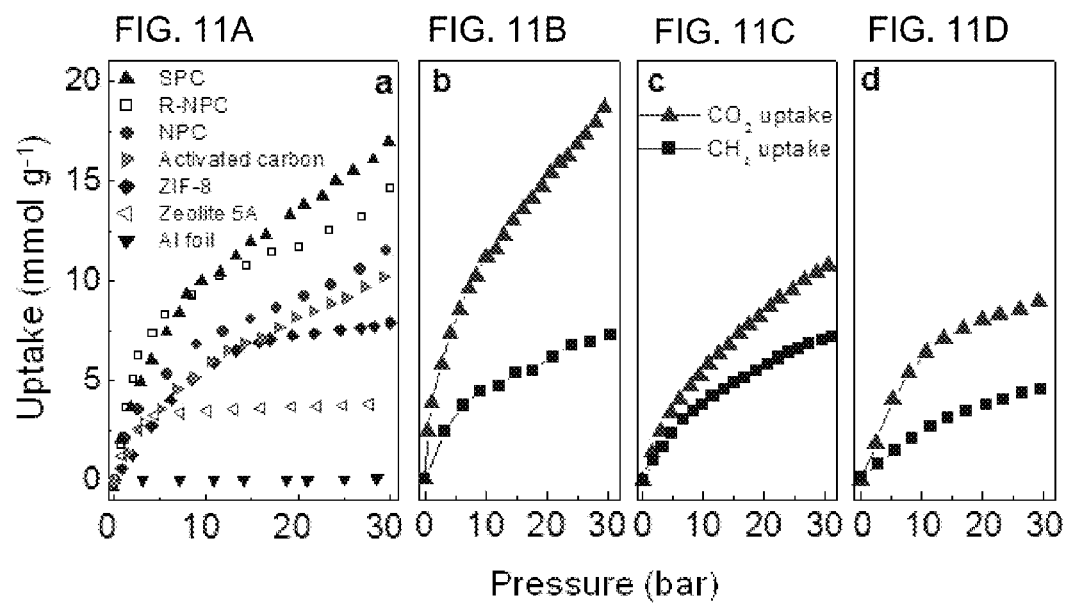
FIG. 11 shows volumetric gas uptake data.

Purification of natural gas from wells relies upon a highly $CO_2$-selective sorbent, especially in a $CH_4$-rich environment. Thus, $CH_4$ uptake experiments were carried out on three different types of porous materials, SPC, activated carbon and ZIF-8. FIGS. 11B-D compare $CO_2$ and $CH_4$ sorption over a pressure range from 0 to 30 bar at 23° C. In contrast to the $CO_2$ sorption, the $CH_4$ isotherms for these three sorbents reached equilibrium while the system pressure was approaching 30 bar. The order of the $CH_4$ uptake capacities was correlated to the surface area of the sorbents. Comparing these sorbents, the observed molecular ratio of sorbed $CO_2$ to $CH_4$ (nCO2/nCH4) for the SPC (2.6) was greater than that for the activated carbon (1.5) and ZIF-8 (1.9). In addition, the density of the SPC calculated using volumetric analysis is nearly 6-fold higher than in the ZIF-8 (2.21 vs. 0.35 $g/cm^3$) and 3-fold higher than the zeolite 5A (2.21 vs. 0.67 $g/cm^3$). The high $CO_2$ capacity and high density observed for SPC greatly increase the volume efficiency, which would reduce the volume of the sorption material for a given $CO_2$ uptake production rate.

Figure 12:
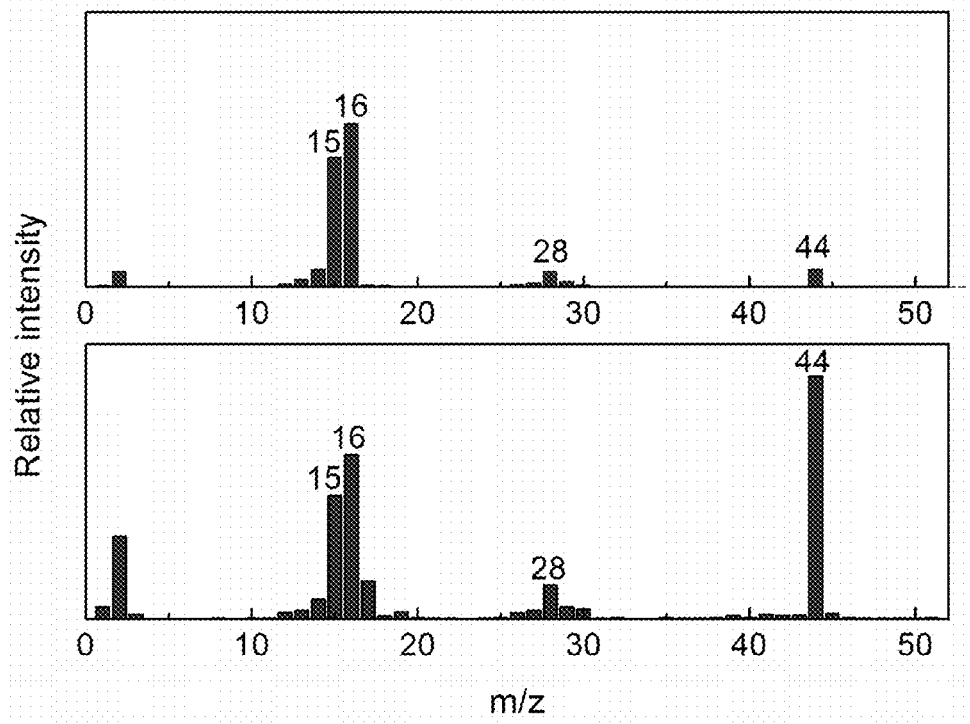
FIG. 12 shows various mass spectrometry (MS) data.

In order to mimic a gas well environment and further characterize the SPC's selectivity to $CO_2$, a premixed gas (85 mol % $CH_4$, 10 mol % $CO_2$, 3 mol % $C_2H_6$ and 2 mol % $C_3H_8$) was used with quadropole mass spectrometry (MS) detection. The MS inlet was connected to the gas uptake system so that it could monitor the gas effluent from the SPC throughout the sorption-desorption experiment. FIG. 12 shows the mass spectrum recorded during the sorption process. The peaks at 15 and 16 amu correspond to fragment and molecular ions from $CH_4$, while the peaks at 28 and 44 amu are from $CO_2$ in the premixed gas. Other minor peaks can be assigned to fragment ions from $C_2H_6$ and $C_3H_8$. Although the peak at 44 amu can also come from $C_3H_8$ ions, the contribution is negligible because of the lower $C_3H_8$ concentration in the mixed gas, and it is distinguishable by the fragmentation ratios in the MS [$C_3H_8$: m/z=29 (100), 44 (30); $CO_2$: m/z=44(100), 28(11)]. The observed intensity ratio of two peaks at 16 and 44 amu (116/144=9.1) indicates the abundance of $CH_4$ vs. $CO_2$ during the sorption and also reflects the relative amount of $CH_4$ and $CO_2$ in the premixed gas. Once the sorption reached equilibrium under 30 bar, the desorption process was induced by slowly venting into the MS system. The 116/144 ratio reduced to ~0.7. The SPC has been shown to have 2.6-fold higher $CO_2$ than $CH_4$ affinity at 30 bar when using pure $CO_2$ and $CH_4$ as feed gases (FIG. 11B).

If the binding energy of $CH_4$ and $CO_2$ were assumed to be similar, and the partial pressure of $CH_4$ vs. $CO_2$ in the premixed gas is considered (PCH4/PCO2=8.5), then it is envisioned that the number of sorbed $CH_4$ should be about 3.3 times more than that of the sorbed $CO_2$. It is also envisioned that $CO_2$-selective materials have selective sites and once the $CO_2$ occupies those sites, the selectivity significantly decreases and the materials behave as physisorbents with lower selectivities at larger pressures. On the contrary, here the SPC demonstrates much higher $CO_2$ selectivity than expected since the chemisorbed sulfur-initiated poly($CO_2$) chain displaces physisorbed gas.

Under the mechanism described here for $CO_2$ polymerization in the channels of inexpensive nucleophilic porous carbons, these new materials have continuous selectivity toward $CO_2$, limited only by the available pore space and pressure.

Example 1.3 Instrumentations

An automated Sieverts instrument (Setaram PCTPro) was adopted to measure gas ($CO_2$, $CH_4$ or premixed gas) sorption properties of materials. Typically, a ~70 mg of sorbent was packed into a ~1.3 mL of stainless steel sample cell. The sample was pretreated under vacuum (~3 mm Hg) at 130° C. for 6 h and the sample volume was further determined by helium before the uptake experiment. At each step of the measurement, testing gas was expanded from the reference reservoir into the sample cell until the system pressure reached equilibrium. A quadropole mass spectrometer (Setaram RGA200) was connected to the Sieverts instrument so that it could monitor the gas effluent from the sorbent throughout the entire sorption-desorption experiment. With the assistance of a hybrid turbomolecular drag pump, the background pressure of the MS can be controlled lower than 5×10-8 Torr. All material densities were determined using volumetric analysis on this same instrument.

XPS was performed using a PHI Quantera SXM Scanning X-ray Microprobe with a base pressure of $5 \times 10^{-9}$ Torr. Survey spectra were recorded in 0.5 eV step size and a pass energy of 140 eV. Elemental spectra were recorded in 0.1 eV step size and a pass energy of 26 eV. All spectra were standardized using C1s peak (284.5 eV) as a reference.

The ATR-IR experiment was conducted using a Fourier transform infrared spectrometer (Nicolet Nexus 670) equipped with an attenuated total reflectance system (Nicolet, Smart Golden Gate) and a MCT-A detector. Raman spectra were measured using a Renishaw in Via Raman Microscope with a 514 nm excitation argon laser.

Scanning electron microscope (SEM) images were taken at 15 KeV using a JEOL-6500F field emission microscope. High-resolution transmission electron microscope (TEM) images were obtained with a JEOL 2100F field emission gun TEM.

An automated BET surface analyzer (Quantachrome Autosorb-3b) was used for measurements of sorbents' surface areas and pore volumes based on $N_2$ adsorption-desorption. Typically, a ~100 mg of sample was loaded into a quartz tube and pretreated at 130° C. under vacuum (~5 mm Hg) in order to remove sorbates before the measurement.

MAS NMR spectra were recorded on a Bruker Avance III 4.7 T spectrometer with a standard MAS probe for 4 mm outer diameter rotors.

Example 1.4 Volumetric $CO_2$ Sorption Experiments (NIST)

$CO_2$ sorption measurements were carried out on computer-controlled custom-built volumetric sorption equipment previously described in detail (J. Phys. Chem. C 111, 16131-16137 (2007)) with an estimated reproducibility within 0.5% and isotherm data error bar of less than 2% compared to other commercial instruments. An amount of ~79 mg of sample was used for the experiments. Sample degassing, prior to the $CO_2$ sorption experiment, was done at 130° C. under vacuum for 12 h.

Example 1.5 Gravimetric $CO_2$ Sorption Experiments $CO_2$ sorption measurements were performed on a high pressure thermal gravimetric equipment (Model: TGA-HP50) from TA Instruments. An amount of ~15 mg of sample was used for the experiments. Sample degassing, prior to $CO_2$ sorption experiment, was done at 130° C. under vacuum for 12 h.

Example 1.6 Synthesis of S-Containing Porous Carbon (SPC)

Poly[(2-hydroxymethyl)thiophene] (PTh) (Sigma-Aldrich) was prepared using FeCl3 Microporous Mesoporous Mater. 158, 318-323 (2012). In a typical synthesis, 2-thiophenemethanol (1.5 g, 13.1 mmol) in CH3CN (10 mL) was slowly added under vigorous stirring to a slurry of $FeCl_3$ (14.5 g, 89.4 mmol) in $CH_3CN$ (50 mL). The mixture was stirred at room temperature for 24 h. The polymer (PTh) was separated by filtration over a sintered glass funnel, washed with distilled water (~1 L) and then with acetone (~200 mL). The polymer was dried at 100° C. for 12 h to afford (1.21 g, 96% yield) of the desired compound.

The PTh was activated by grinding PTh (500 mg) with KOH (1 g, 17.8 mmol) with a mortar and pestle and then heated under Ar at 600° C. in a tube furnace for 1 h. The Ar flow rate was 500 sccm. After cooling, the activated sample was thoroughly washed 3× with 1.2 M HCl (1 L) and then with distilled water until the filtrate was pH 7. The SPC sample was dried in an oven at 100 C. to afford 240 mg of the black solid SPC. The BET surface area and pore volume were 2500 m²/g and 1.01 cm³/g, respectively.

Example 1.7 Synthesis of N-Containing Porous Carbon (NPC)

Commercial polyacrylonitrile (PAN, 500 mg, average Mw 150,000, Sigma-Aldrich) powder and KOH (1500 mg, 26.8 mmol) were ground to a homogeneous mixture in a mortar. The mixture was subsequently carbonized by heating to 600° C. under Ar (500 sccm) in a tube furnace for 1 h. The carbonized material was washed 3 times with 1.2 M HCl (1 L) and then with distilled water until the filtrate was pH 7. Finally, the carbon sample was dried in an oven at 100° C. to afford 340 mg of the solid black NPC.

To produce R-NPC, the activated material (270 mg) was further reduced by 10% $H_2$ ($H_2$:Ar=50:450 sccm) at 600° C. for 1 h to provide 255 mg of the final material. The BET surface area and pore volume were 1450 m² g and 1.43 cm³ g, respectively.

Example 1.8 Conversion of Excess Uptake to Absolute Uptake

Figure 6:
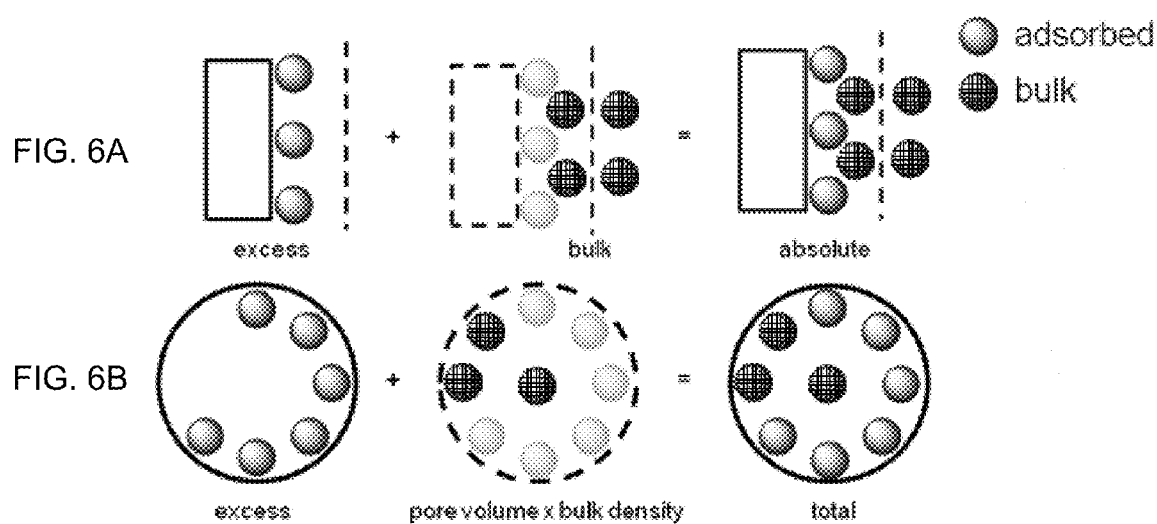
FIG. 6 shows pictorial descriptions of excess and absolute $CO_2$ uptake.
Figure 7:
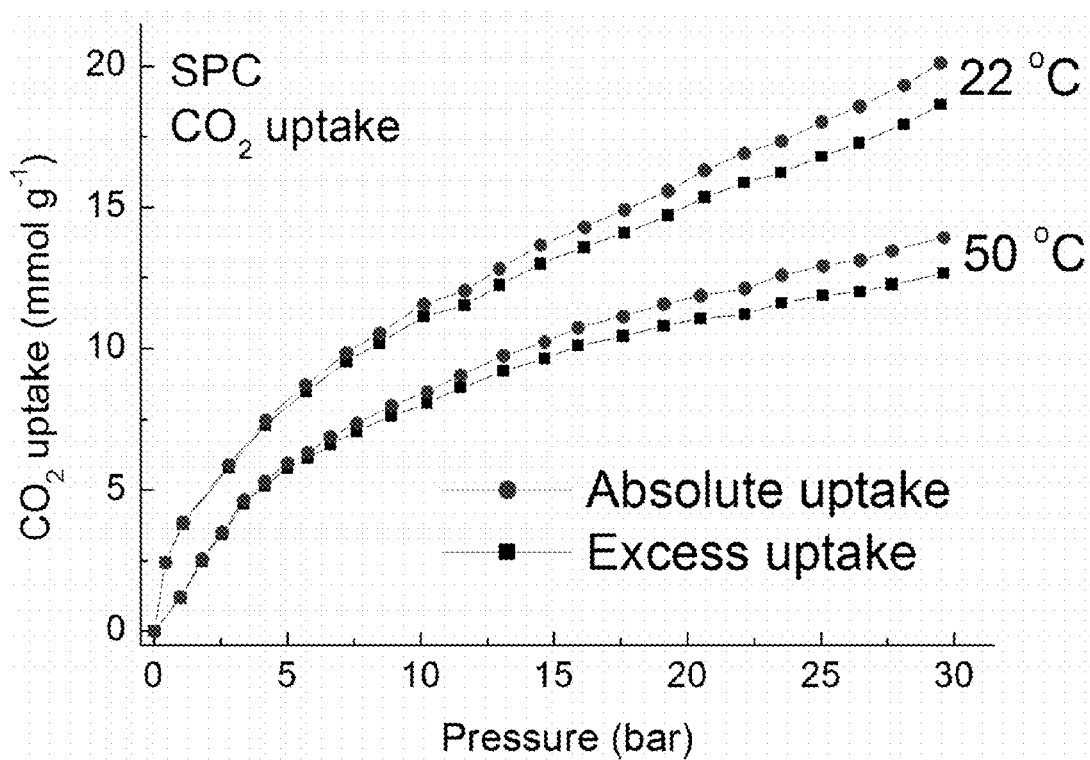
FIG. 7 shows $CO_2$ uptake on the SPC. Comparison of absolute uptake and excess uptake at 22° C. and 50° C. exemplifies the small differences over this pressure and temperature range.

Total uptake includes all gas molecules in the adsorbed state, which is the sum of the experimentally measured excess uptake and the bulk gas molecules within the pore volume (FIG. 6). For microporous materials with negligible external surface area, the total uptake is often used as an approximation for absolute uptake and could be represented in the following equation:

$$N_{total} \approx N_{abs} = N_{ex.} + V_p \rho bulk(P,T)$$

In the above equation, Vp is the pore volume of porous material and ρ bulk is the density of gas in the bulk phase at given pressure and temperature. In the case of SPC, the pore volume was determined to be 1.01 cm³ g by $N_2$ adsorption isotherm at 77 K (BET analysis). The $CO_2$ density changes from 0.00180 to 0.06537 g/cm⁻³ in the pressure range between 1 and 30 bar at 22° C. and 0.00164 to 0.05603 g/cm³ at 50 C.

Example 1.9 Determination of the Heat of $CO_2$ Sorption (Q)

The Clausius-Clapeyron equation (Adsorption 175, 133-137 (1995)) was used to determine the heat of $CO_2$ sorption.

$$\left(\frac{\partial \ln P}{\partial T}\right)_\theta = \frac{Q}{RT^2}$$

In the above equation, θ is the fraction of the adsorbed sites at a pressure P and temperature T, and R is the universal constant. The equation can be further derived as the following expression for transitions between a gas and a condense phase:

$$\ln P_2 - \ln P_1 = \frac{Q}{R}\left(\frac{1}{T_1} - \frac{1}{T_2}\right)$$

Table 1 below compares the heat of $CO_2$ sorption to values in the literature.

TABLE 1

Heat of $CO_2$ sorption determined in Example 1 versus literature values.

| | $Q_{CO2}$ (kJ mol⁻¹) | Comparison with reference |
|---|---|---|
| SPC | 57.8 | 59.0[1] |
| Activated carbon | 28.4 | 28.9[2] |
| Zeolite 5A | 31.2 | 33.7[3] |
| ZIF-8 | 25.6 | 27.0[4] |

Ref. [1]*Carbon* 50, 5543-5553 (2012).
Ref. [2]*J. Natural Gas Chem.* 15, 223-229 (2006).
Ref. [3]*Handbook of Zeolite Science and Technology*, Marcel Dekker, Inc. New York (2003).
Ref. [4]*AIChE J.* 59, 2195-2206 (2013).

Example 1.10 Evaluation of the 13C NMR Assignments

The three NMR spectra in FIG. 8D were obtained under identical conditions: 12 kHz MAS, 2.5-μs 90° 13C pulse, 41-ms FID, 10-s relaxation delay; 480 scans; and 50 Hz of line broadening applied to the FID.

Numerous MAS NMR investigations of $CO_2$ have reported a signal at 125±1 ppm, regardless of the physical environment for the $CO_2$ (e.g., free gas, physisorbed on various materials, in a metal organic framework, in a clathrate, dissolved in a glass, etc.) Accordingly, attributing the signal at 130.6 ppm to $CO_2$ physisorbed on the sorbent seems reasonable, although the reason for the additional deshielding may not be apparent. It is envisioned that this 5-ppm difference does not result from the use of different chemical shift references, as the various reports indicate that either the signal from $Si(CH3)_4$ (TMS) serves as the chemical shift reference (0 ppm) or that the signal from a solid such as adamantane or glycine (this work) relative to TMS at 0 ppm serves as the chemical shift reference. Applicants note that the sorbent is somewhat conductive in that it has a noticeable effect on the tuning and matching of the 13C and 1H channels of the NMR probe (relative to the tuning and matching for glycine). However, spinning is unaffected. Without being bound by theory, it is envisioned that the conductive nature of the sorbent results in the 5-ppm deshielding effect observed for physisorbed $CO_2$.

A chemical shift of 166.5 ppm is rational for poly($CO_2$) in light of various reports of bicarbonate and carbonate species giving signals from 162 to 170 ppm relative to TMS or to $[(CH_3)3Si]4Si$, which is 3.5 ppm relative to TMS at 0 ppm. The carbonyl chemical shift of $CH_3O$—CO—O—CO—$OCH_3$ is extremely sensitive to its environment (the reported shift is 147.9 ppm as a neat liquid at 37° C. and 157 ppm in $CDCl_3$, both relative to TMS). Applicants are not aware of any reports of chemical shift data for poly($CO_2$) and are hereby reporting the first such example of that chemical shift at 166.5 ppm when entrapped in this carbon matrix.

Example 2. $CO_2$ Absorption Capacities of Different Carbon Materials

In this example, the $CO_2$ uptake capacities of SPC, R-NPC, rice protein, ZIF-8 and Zeolite 5A were compared. The $CO_2$ uptake measurements were conducted at 30° C. and 30 bar.

Figure 13:
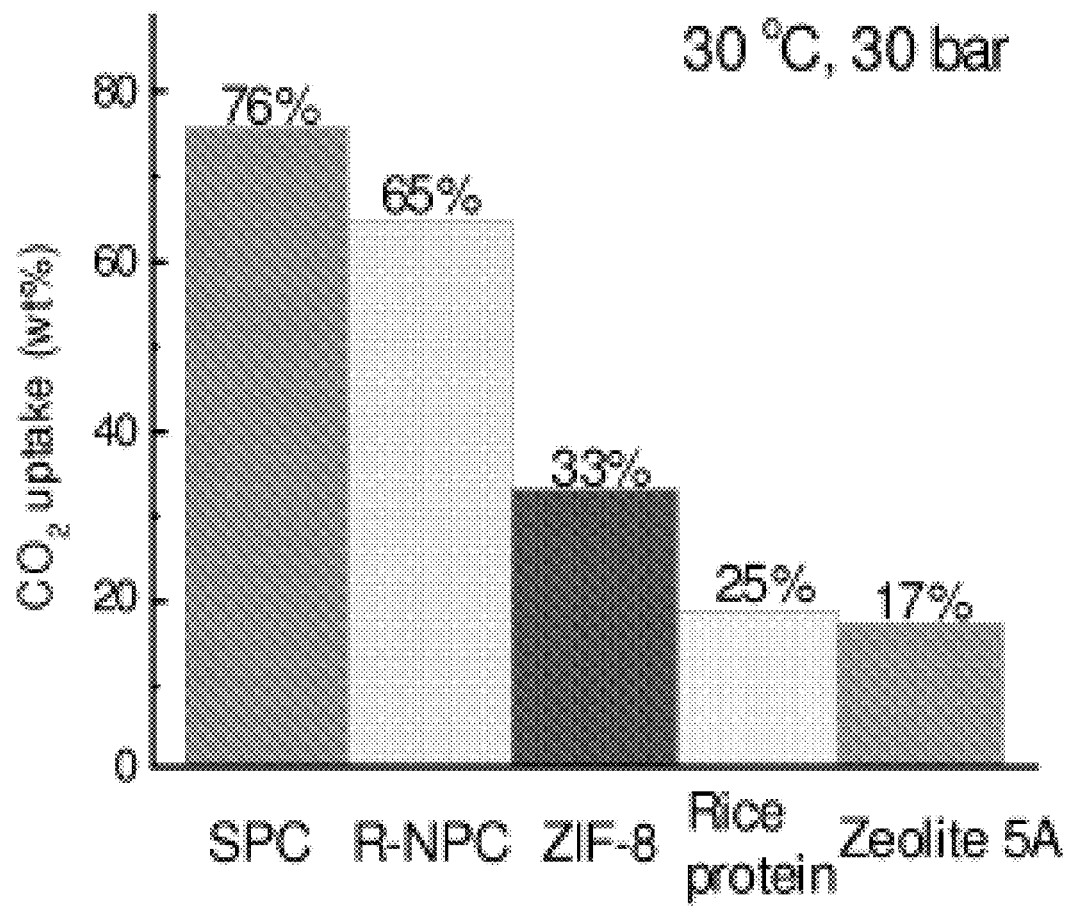
FIG. 13 shows comparative data relating to the $CO_2$ uptake capacities of various carbon sources.

As shown in FIG. 13, the $CO_2$ uptake capacities of SPC and R-NPC were significantly higher than the $CO_2$ uptake capacities of ZIF-8, rice protein, and Zeolite 5A.

Example 3. Asphalt-Derived Porous Carbons for $CO_2$ Capture

In this Example, Applicants report the preparation and $CO_2$ uptake capacity of microporous carbon materials synthesized from asphalt. Carbonization of asphalt with potassium hydroxide (KOH) at high temperatures (>873 K) yields asphalt-derived porous carbons (A-PC) with Brunauer-Emmett-Teller (BET) surface areas of up to 2800 mg and $CO_2$ uptake capacities of up to 25 mmol/g at 30 bar and 298 K. Further nitrogen doping of the A-PCs yields active N-doped A-PCs (also referred to as A-NPCs) containing up to 9.3 wt % nitrogen. The A-NPCs have enhanced BET surface areas of up to 2900 $m^2g^{-1}$ and $CO_2$ uptake capacities of up to 1.2 g at 30 bar and 298 K. Asphalt derived porous carbon with pre-treatment at 400° C. had measured BET surface areas of 4200 $m^2/g$ and $CO_2$ uptake capacities of up to 1.3 g at 30 bar and 298 K. To the best of Applicants' knowledge, such results represent the highest reported $CO_2$ uptake capacities among the family of activated porous carbon materials. Thus, the porous carbon materials derived from asphalt demonstrate the required properties for capturing $CO_2$ at a well-head during the extraction of natural gas under high pressure.

Example 3.1. Synthesis and Characterization of Asphalt-Derived Porous Carbon Materials Asphalt-derived porous carbons (A-PCs) were prepared by carbonization of a molded mixture of asphalt and potassium hydroxide (KOH) at higher temperatures under inert atmosphere (Ar). The treatment of asphalt with KOH was conducted at various temperatures (200-800° C.) and asphalt/KOH weight ratios (varied from 1/1 to 1/5). In addition, the reaction conditions were adjusted and tuned by the $CO_2$ uptake performance of the final porous carbon materials.

Figure 15:
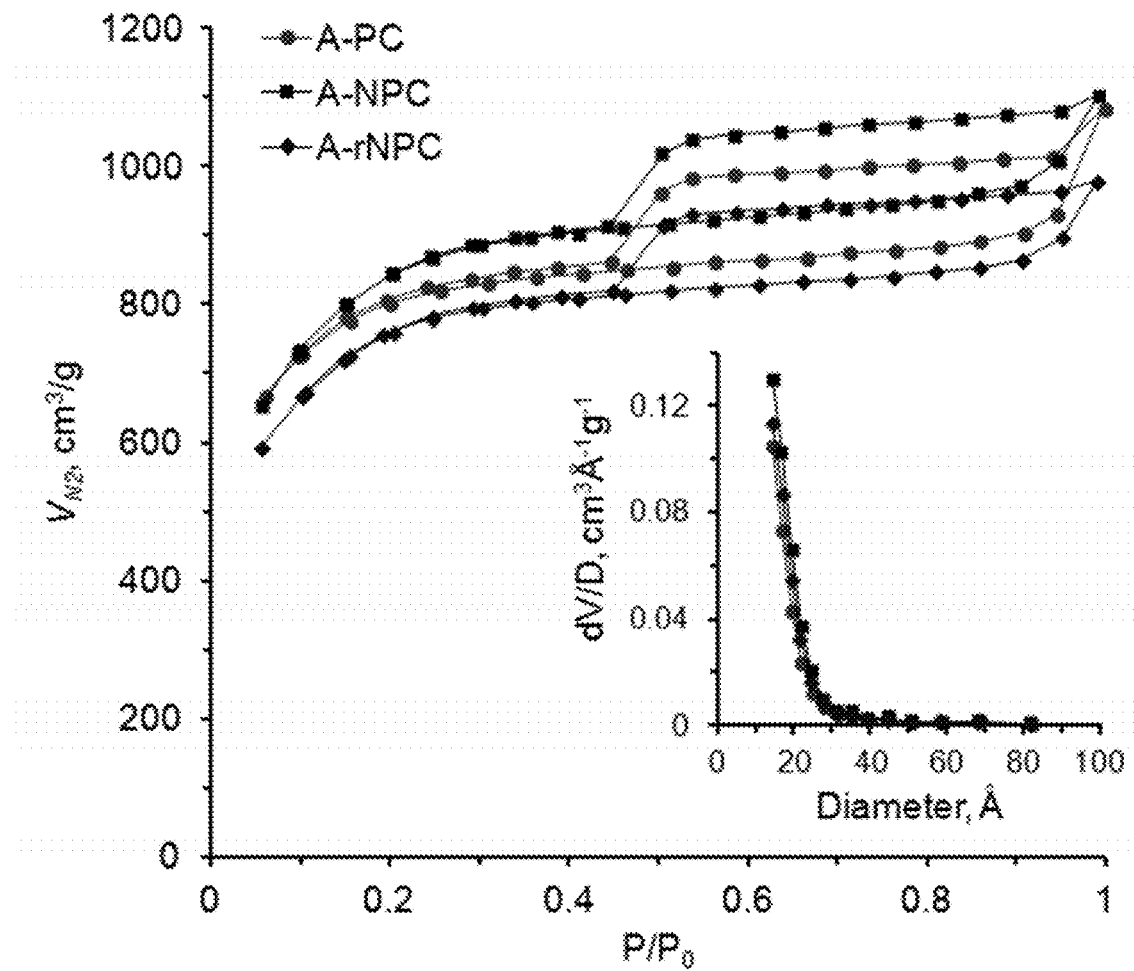
FIG. 15 shows nitrogen sorption isotherms for A-PC, A-NPC and A-rNPC.

In a more specific example, A-PC was synthesized at 700° C. at an asphalt:KOH weight ratio of 1:4. As shown in FIG. 14, the produced A-PC has a steep nitrogen uptake at low pressures (0-0.3 $P/P_o$), indicative of the large amount of microporous structures with uniform distribution of pore sizes ~1.3 nm (see FIG. 15 inset). The BET surface area (2779 $m^2/g$) and the pore volume (1.17 $cm^3/g$) were calculated from the nitrogen isotherms (see Table 2). X-ray photoelectron spectroscopy (XPS) of the A-PC showed C 1s and O 1s signals with ~10 wt % of oxygen content, which are assigned to C—O and C=O functional groups (data not shown).

Scanning electron microscopy (SEM) images of the A-PCs show porous materials with uniform distribution of the micropores (FIG. 14A). Uniform distribution of the micropores are further indicated by the transmission electron microscopy (TEM) images (FIG. 14B) that show pore diameters of about 1.5 nm, which is very close to the number extracted from nitrogen absorption isotherms.

Treatment of A-PCs with NH3 at elevated temperatures resulted in N-doped porous carbon materials (A-NPC) (FIG. 16A). The nitrogen content and the surface area increased considerably after treatment of A-PCs with NH3 at higher temperatures, as shown in Tables 2 and 3. This leads to the formation of A-NPCs with a nitrogen concentration of up to 9.3 wt %.

TABLE 2

Properties and $CO_2$ uptake capacities of various porous carbons.
Properties and $CO_2$ uptake capacities of various porous carbons.

| Samples | $S_{BET}$ $(m^2/g)^a$ | Pore volume $(cm^3/g)^a$ | Density $(g/cm^3)$ | $CO_2$ uptake capacity at 30 bar $(g/g)^b$ |
|---|---|---|---|---|
| A-PC | 2779 | 1.17 | 2 | 0.96 |
| A-NPC | 2858 | 1.20 | 2 | 1.10 |
| A-rNPC | 2583 | 1.09 | 2 | 1.19 |
| SPC | 2500 | 1.01 | 2.21 | 0.74 |
| NPC | 1490 | 1.40 | 1.8 | 0.60 |
| rNPC | 1450 | 1.43 | 1.8 | 0.67 |

$^a$Estimated from $N_2$ absorption isotherms at 77 K, where samples were dried at 200° C. for 20 h prior to the measurements.
$^b CO_2$ uptake capacity at 23° C.

TABLE 3

Elemental composition and $CO_2$ uptake capacities of activated porous carbons.
Elemental composition and $CO_2$ uptake capacities of activated porous carbons.

| Samples | C % | O % | N % | XPS Pyridinic N % | Pyrrolic N % | Graphitic N % | $CO_2$ uptake capacity at 30 bar (g/g)[a] |
|---|---|---|---|---|---|---|---|
| A-NPC(500) | 91.1 | 6.1 | 2.7 | 29.7 | 63.3 | 7.0 | 1.02 |
| A-NPC(600) | 90.6 | 6.4 | 3.0 | 33.1 | 52.6 | 14.3 | 1.04 |
| A-NPC(700) | 91.1 | 4.2 | 4.7 | 53.2 | 41.4 | 5.4 | 1.06 |
| A-NPC(800) | 81.0 | 9.7 | 9.3 | 52.3 | 45.4 | 2.3 | 0.93 |
| A-rNPC | 88.0 | 7.5 | 4.5 | 55.1 | 40.3 | 4.6 | 1.19 |

[a]$CO_2$ uptake capacity at 23° C.

The surface N-bonding configurations reveal three main nitrogen functional groups in the surface of the carbon framework. As shown in FIG. 14A, the N 1s spectra at variable doping temperatures deconvoluted into three peaks with binding energies of about 399, 400.7±4, and about 401.7. These binding energies are in the range of typical binding energies corresponding to pyridinic N, pyrollic N and graphitic N, respectively. The new peak at the binding energy of about 396 was observed at 800° C., which was assigned to the N—Si binding energy. Without being bound by theory, it is envisioned that, at high pyrolysis temperatures, $NH_3$-doping of silica from the quartz reaction tube starts to interfere with the doping process.

Further $H_2$ treatment of A-NPCs at 700° C. resulted in formation of reduced A-NPCs (A-rNPC). The elemental composition and the surface area of the A-rNPCs were investigated using XPS (see FIG. 14B and Table 3). The XPS spectrum of the produced A-rNPCs (FIG. 14B) is similar to the XPS spectrum of A-NPCs (FIG. 14A). A schematic representation of the synthetic route for the production of A-rNPCs is shown in FIG. 16A.

Applicants also observed that, as reaction temperatures increased, the relative trend of the pyrrolic nitrogens in A-NPCs increased. However, the opposite was observed for pyridinic nitrogens. These results indicate that pyrolysis temperature during $NH_3$ treatment plays a significant factor in determining the $CO_2$ uptake performance of A-NPCs.

Figure 17:
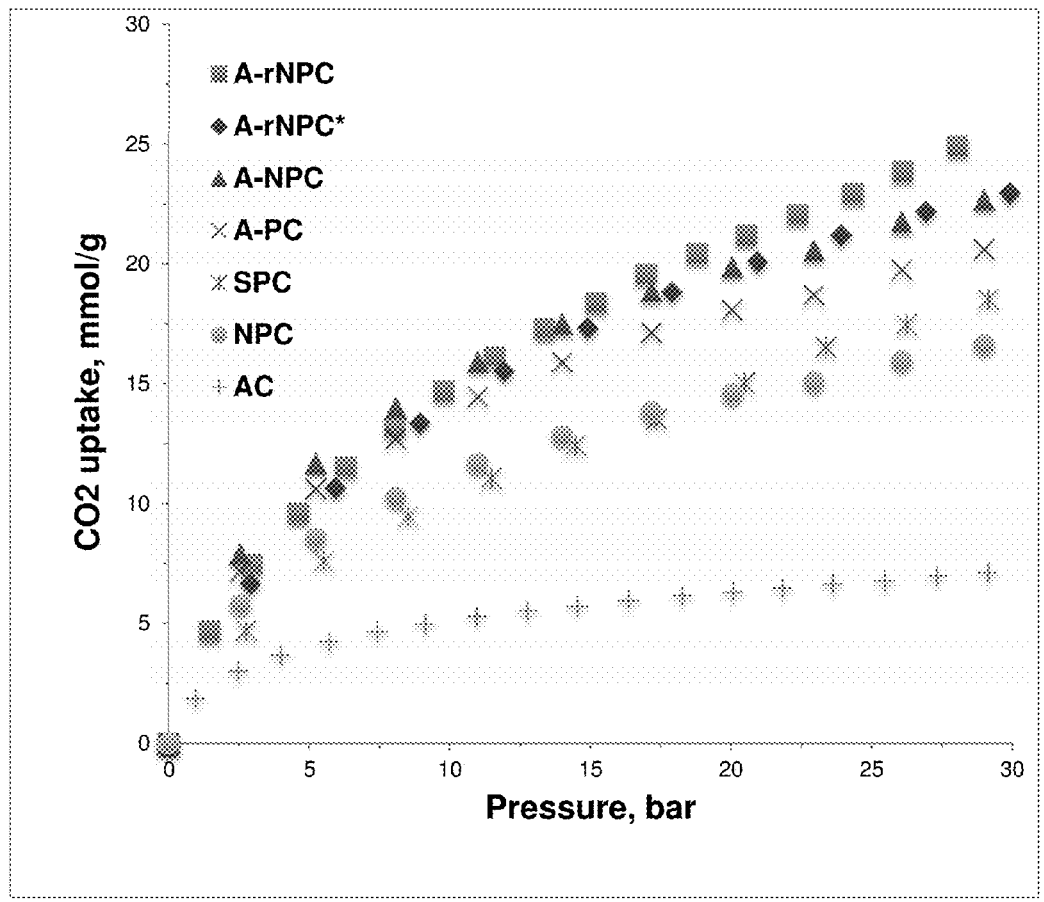
FIG. 17 shows a comparison of room temperature volumetric $CO_2$ uptake of A-PC, A-NPC and A-rNPC with the other porous carbon sorbents and the starting asphalt.

Example 3.2. $CO_2$ Uptake Capacity of the Asphalt Derived Porous Carbon Materials The $CO_2$ uptake capacities of A-PC, A-NPC, and A-rNPC were compared to the $CO_2$ uptake capacities of prior porous carbon materials, including nitrogen containing nucleophilic porous carbons derived from poly(acrylonitrile) (NPCs), sulfur containing porous carbons derived from poly[(2-hydroxymethyl)thiophene (SPCs), commercial activated carbon, and asphalt (the NPCs and SPCs were described previously in PCT/US2014/044315 and Nat Commun., 2014 Jun. 3, 5:3961, doi: 10.1038/ncomms4961). The $CO_2$ uptake capacities were measured by a volumetric method at room temperature over the pressure range of 0-30 bar. The results are shown in FIG. 17.

Applicants also observed that volumetric $CO_2$ uptake by A-PC, A-NPC and A-rNPC do not show any hysteresis (data not shown). Such observations suggest that the asphalt-derived porous carbon materials uptake $CO_2$ in a reversible manner. The $CO_2$ uptake capacities at a pressure of 30 bar are summarized in Tables 2 and 3.

A-rNPC has the highest $CO_2$ uptake performance at 30 bar, although the highest surface is obtained for A-NPC. As Applicants increased the N-doping temperature (from 500° to 800° C.), pyrollic nitrogen starts to decrease in intensity, which is linearly proportional to the $CO_2$ uptake performance of the A-NPCs (see Table 3). Thus, without being bound by theory, Applicants envision that pyrrolic nitrogens play a more significant role in $CO_2$ uptake performance than the bulk nitrogen content of the porous carbon material.

Figures 18, 18A:
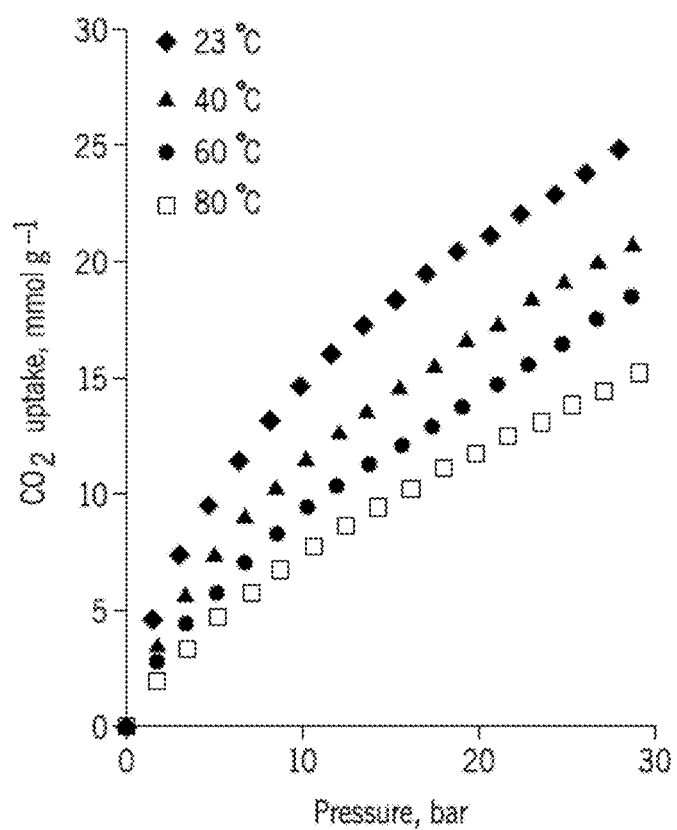
FIG. 18 shows data relating to the volumetric uptake of $CO_2$ on A-rNPC as a function of temperature at pressures that range from about 0-30 bar (FIG. 18A) and about 0-1 bar (FIG. 18B).
Figure 18B:
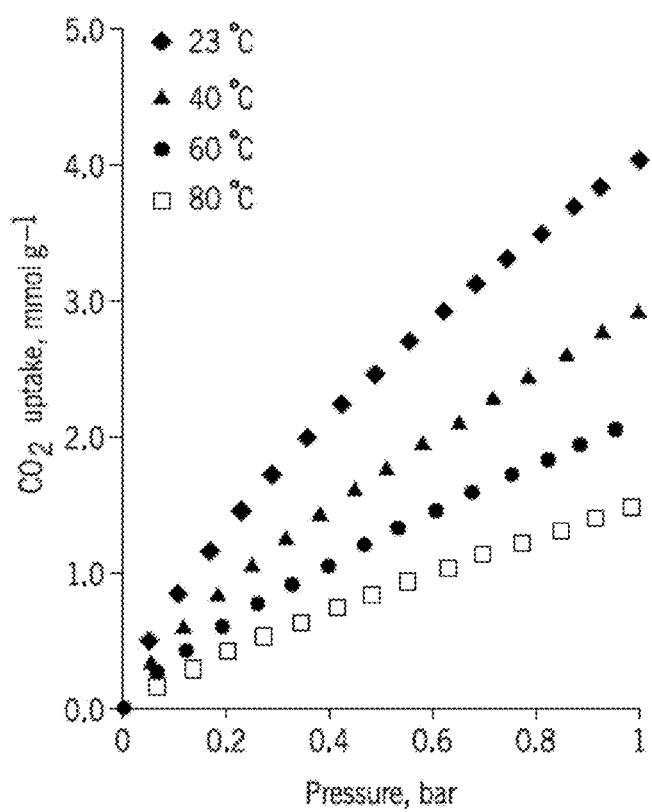

FIG. 18 shows the high and low pressure $CO_2$ uptake capacity of A-rNPC as temperature increases. As in other solid physisorbents such as activated carbons, zeolites and MOFs, the $CO_2$ uptake capacity decreases with increasing temperature. However, when compared with commercial activated carbon and SPC, the decrease in $CO_2$ uptake at higher temperature is lower. This suggests the higher and uniform microporosity of A-rNPCs, or the efficacy of poly ($CO_2$) formation.

Figure 19:
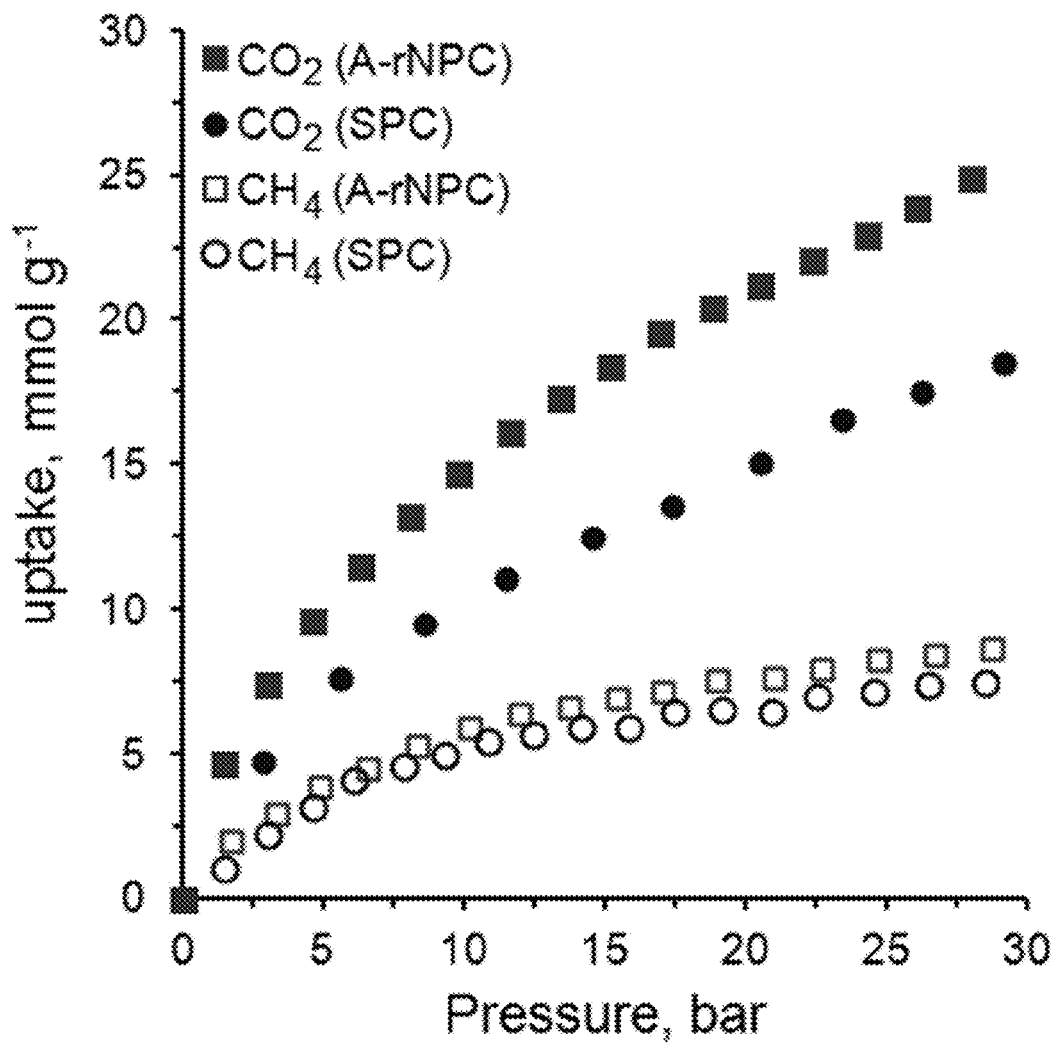
FIG. 19 shows data relating to the volumetric $CO_2$ and $CH_4$ uptake of A-rNPC (squares) and A-SPC (circles) at 23° C.

Another key property of the activated carbon materials is the $CO_2/CH4$ selectivity. In order to evaluate the $CO_2/CH_4$ selectivity of A-PC, A-NPC and A-rNPCs, Applicants compared $CH_4$ uptake performances with SPC, activated carbon, and ZIF-8 sorbents over the 0-30 bar pressure range at 23° C. FIG. 19 shows the comparison of the $CO_2$ and $CH_4$ sorption capacities of A-rNPC and SPC. A-rNPCs have higher $CH_4$ (8.6 mmol/g) uptake relative to SPC (7.7 mmol/g) at 30 bar, which is in agreement with the higher surface area for A-rNPC (2583 $m^2/g$) than the SPC (2500 $m^2/g$).

The molar ratios of sorbed $CO_2$ and $CH_4$ (nCO2/nCH4) were estimated as the ratios of the amount of absorbed gases at 30 bar. The measured $nCO_2/nCH_4$ for A-rNPC was found to be about 3.5. This value was compared to values for SPC (2.6), activated carbon (1.5) and ZIF-8 (1.9).

In addition, the isosteric heat of absorption of $CO_2$ and $CH_4$ on the surfaces of A-PC, A-NPC and A-rNPC were calculated using low pressure $CO_2$ sorption isotherms at 23° C. and 80° C. The measured value was found to be about 27 kJ/mol.

Example 3.3. $CO_2$ Uptake Capacity of Asphalt Derived Porous Carbon with Pre-Treatment Similar to example 3.1, asphalt-derived porous carbons were prepared by carbonization of a molded mixture of asphalt and potassium hydroxide (KOH) at higher temperatures under inert atmosphere (Ar). The treatment of asphalt with KOH was conducted at various temperatures (200-800° C.) and asphalt/KOH weight ratios (varied from 1/1 to 1/5). An additional pre-treatment step of heating the asphalt prior to mixing with KOH for carbonization was done to remove volatile oils found within the asphalt source (FIG. 31). In this specific example, untreated Gilsonite (uGil) was heated specifically at 400° C., then mixed with KOH, and subsequently reacted at temperatures 600° C. and greater to tune the $CO_2$ uptake performance of the final porous carbon materials. Table 4 summarized the high surface area and even higher $CO_2$ uptake capacity achievable with pre-treatment and increasing reaction temperature.

Figure 20:
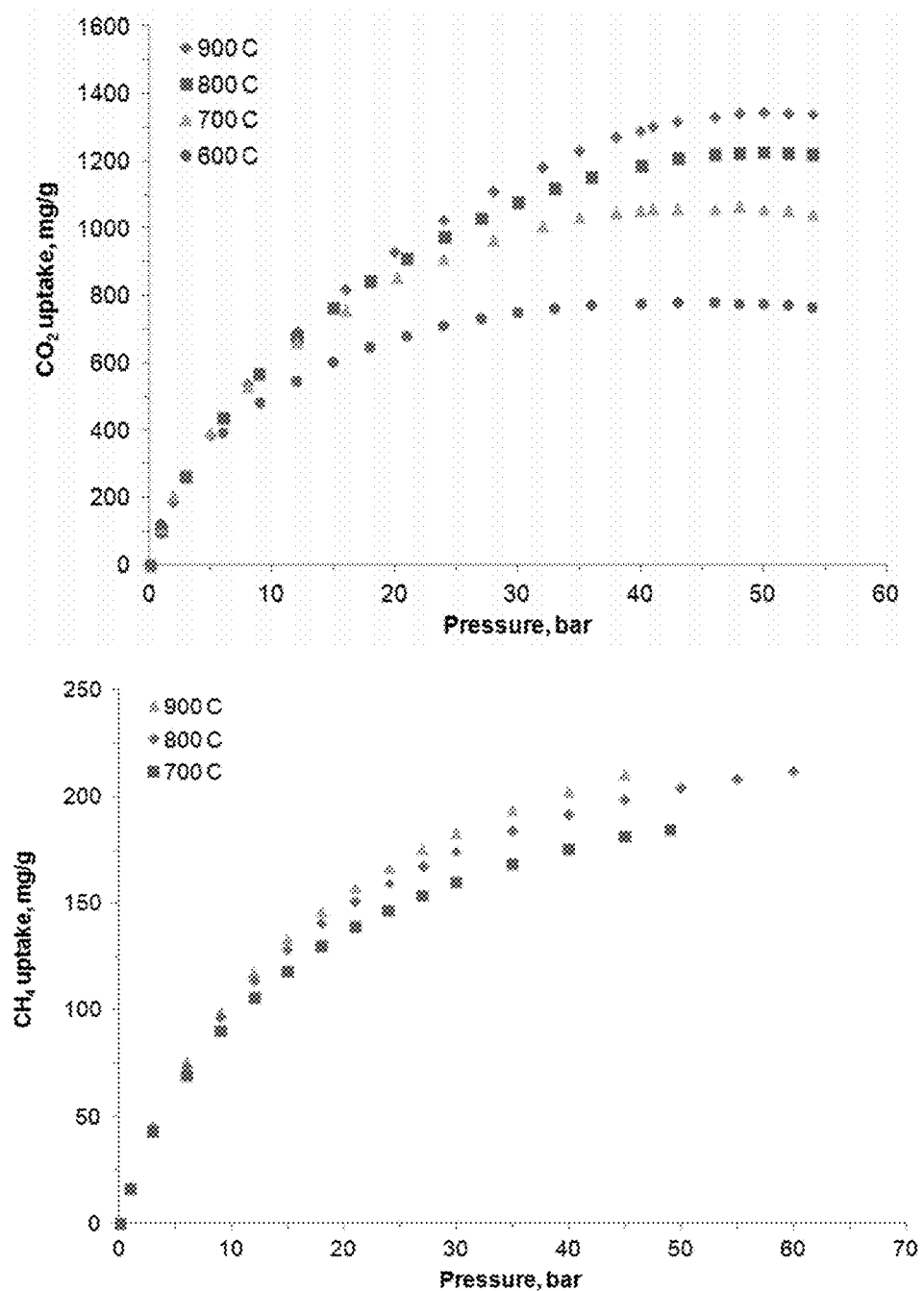
FIG. 20 shows the gravimetric measurement of $CO_2$ and $CH_4$ uptake of uGil-600, 700, 800, and 900 at 25° C. The uGil-T sorbents exhibit high $CO_2$ capacity (up to 1.50 g $CO_2$/g adsorbent at 54 bar) under high pressure environment, which is 9 times higher than Zeolite 5A, and 4 times higher than ZIF-8 at the same conditions.

FIG. 20 shows the gravimetric $CO_2$ uptake and $CH_4$ uptake of various porous carbon samples made from Gilsonite and measured under high pressure. The molar ratios of sorbed $CO_2$ and $CH_4$ (nCO2/nCH4) were estimated as the ratios of the amount of absorbed gases at 30 bar. The measured nCO2/nCH4 for uGil-800 and uGil-900 were found to be approximately 8 (results not shown). This value can be compared to values for A-rNPC (3.5), SPC (2.6), activated carbon (1.5) and ZIF-8 (1.9). Such $CO_2$ uptake capacities (i.e., up to 30 mmol/g) are the highest reported $CO_2$ uptake capacities among the activated carbons. Such $CO_2$ uptake capacities are also comparable to the highest $CO_2$ uptake capacities of synthetic metal-organic frameworks (MOFs).

TABLE 4

Properties and $CO_2$ uptake performances of activated porous carbons made from Untreated Gilsonite.

| Samples | $S_{BET}$ (m²/g)$^a$ | Total pore volume (cm³/g)$^b$ | $D_{pore}$ (nm)$^c$ | XPS C % | XPS O % | $CO_2$ uptake capacity at 30 bar$^d$ mmol/g | wt % |
|---|---|---|---|---|---|---|---|
| uGil-600 | 2300 | 1.31 | 2.13 | 84.9 | 15.1 | 18.6 | 82 |
| uGil-700 | 3800 | 2.11 | 2.21 | 88.7 | 11.3 | 23.8 | 105 |
| uGil-800 | 3900 | 2.22 | 2.25 | 91.5 | 8.5 | 25.7 | 113 |
| uGil-900 | 4200 | 2.41 | 2.30 | 92.1 | 7.9 | 29.1 | 128 |

$^a$Surface area estimated from $N_2$ absorption isotherms at 77 K; samples dried at 240° C. for 20 h prior to the measurements.
$^b$Total (micro- and meso-) pore volume obtained at $P/P_0$ = 0.994.
$^c$Average pore diameter ($D_{pore}$).
$^d$$CO_2$ uptake at 23° C.

Example 4. Asphalt-Derived Porous Carbons for $CO_2$ and $H_2S$ Capture

This Example pertains to the further production and characterization of A-NPCs, A-SPCs, A-rNPCs, and A-NSPCs. In addition, this Example pertains to the use of the aforementioned carbon materials for the capture of both $CO_2$ and $H_2S$.

Example 4.1. Synthesis and Characterization of Asphalt-Derived Porous Carbon Materials Asphalt carbon sources were ground with KOH in a mortar. The weight ratio of KOH to the asphalt carbon source was from about 1:3 to about 1:4. The homogeneous powder was heated at 500-800° C. under Ar atmosphere for 1 hour. This was followed by filtration and washing with 10 wt % $HCl_{(aq)}$ and copious amounts of DI water until the extracts were neutral. The filtered sample was then dried at 110° C. until a constant weight was obtained. The above steps produced A-PC.

A-NPC was prepared by annealing the A-PC at 700° C. for 1 hour under an $NH_3$-containing atmosphere. A-rNPC was prepared by further reduction of A-NPC with 10 wt % $H_2$ at 700° C. for 1 h. A-SPC was prepared by exposing the A-PC to a sulfur source and annealing the sulfur impregnated A-PC at 650° C. for 1 h. A-NSPC was prepared by annealing the produced A-SPC for 1 hour under an $NH_3$-containing atmosphere to yield A-NSPC.

Next, the produced porous carbon materials were characterized and tested for uptake of $CO_2$ and $H_2S$. The results are summarized in Table 5.

TABLE 5

The properties and gas uptake capacities of various asphalt-derived porous carbon materials. Asphalt-Versatrol HT Gilstonite, a naturally occurring asphalt from MI SWACO, was used as a control. The $H_2S$ uptake capacities of the porous carbon materials were measured as a function of the amount of sulfur retained on the porous carbon material.

| Sample | Textural Properties SBET (m2/g) | Chemical Composition (atomic %) | | | | $H_2S$ Uptake Capacity (g/g) | $CO_2$ Uptake Capacity at 30 bar (g/g) |
|---|---|---|---|---|---|---|---|
| | | N | C | O | S | | |
| Asphalt* | 0.6 | — | — | — | — | — | 0.05 |
| A-PC | 2,613 | 0.5 | 91.4 | 8.1 | — | 1.06 | 0.92 |
| A-NPC | 2,300 | 5.7 | 91.0 | 3.3 | — | 1.50 | 1.01 |
| A-rNPC | 2,200 | 3.6 | 92.7 | 3.7 | — | 2.05 | 1.12 |
| A-SPC | 2,497 | — | 90.3 | 7.1 | 2.7 | — | 1.16 |
| A-NSPC | 2,510 | 1.6 | 86.7 | 11.0 | 0.7 | — | 1.32 |

In order to characterize the $H_2S$ uptake capacities of the porous carbon materials, the porous carbon materials were first dried at 120° C. for 1 hour under vacuum (0.05 Torr). Next, the porous carbon material was treated with $H_2S$ under an air flow for 1 hour. The amount of sulfur retained on the porous carbon material was measured by thermogravimetric analysis (TGA).

After $H_2S$ uptake and air oxidation to S, A-rNPC was further characterized by TEM EDS elemental mapping. As shown in FIG. 21, sulfur is uniformly distributed within the pores of A-rNPCs. In addition, the TGA curve of the A-rNPCs after $H_2S$ uptake and conversion to sulfur is shown in FIG. 21.

The $H_2S$ uptake of A-rNPC was also measured under different conditions, including inert or oxidative conditions. The results are summarized in FIG. 23. The results show that A-rNPC can capture $H_2S$ effectively in the presence of $O_2$ from air. When $CO_2$ was present, A-rNPC also showed $H_2S$ capture behavior. The air conditions can mimic $H_2S$ capture by porous carbon materials during natural gas flow from a wellhead, injection of a slug of air to convert the sorbed $H_2S$ to S, and the continuation of $H_2S$ capture from the natural gas source.

Without being bound by theory, it is envisioned that, as a result of the basic functional groups on the surface of A-NPCs and A-rNPCs, and as a result of the pH values of A-NPCs (pH=7.2) and A-rNPCs (pH=7.5), the porous carbon materials of the present disclosure can capture H2S by an acid-base reaction, where an amine group on the porous carbon abstracts a proton from H2S to yield the ammonium salts and hydrogen monosulfide anions according to the following scheme:

In this case, the equilibrium constant ($k_{eq}$) is ~1000 based on the pKa values of the starting materials ($H_2S$) and products (ammonium species). As a result of the reaction of HS ions with $O_2$ from air introduced in the carbon support, the captured $H_2S$ produces sulfur products such as S, $SO_2$ and $H_2SO4$. The catalytic oxidation of $H_2S$ on A-NPC, A-rNPC and A-PC can proceed at room temperature by air oxidation.

Figure 22:
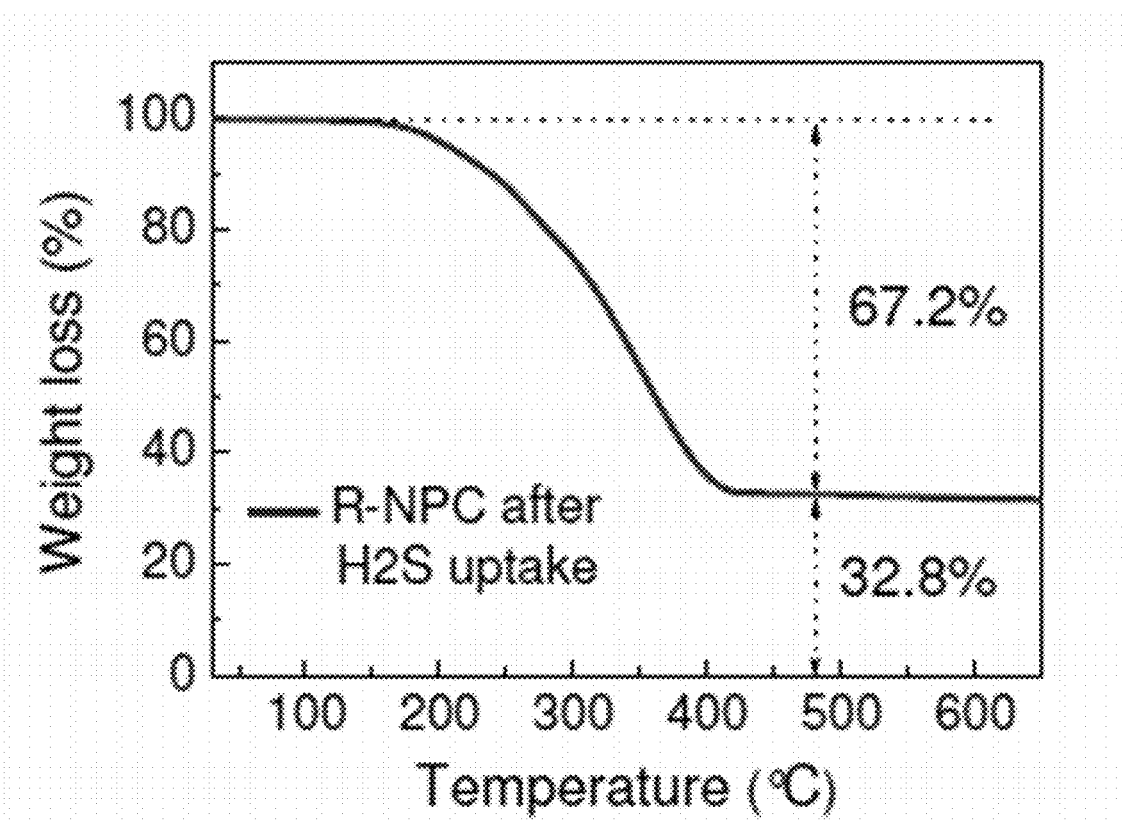
FIG. 22 shows a thermogravimetric analysis (TGA) curve of A-rNPCs after $H_2S$ uptake with exposure to air.
Figure 23:
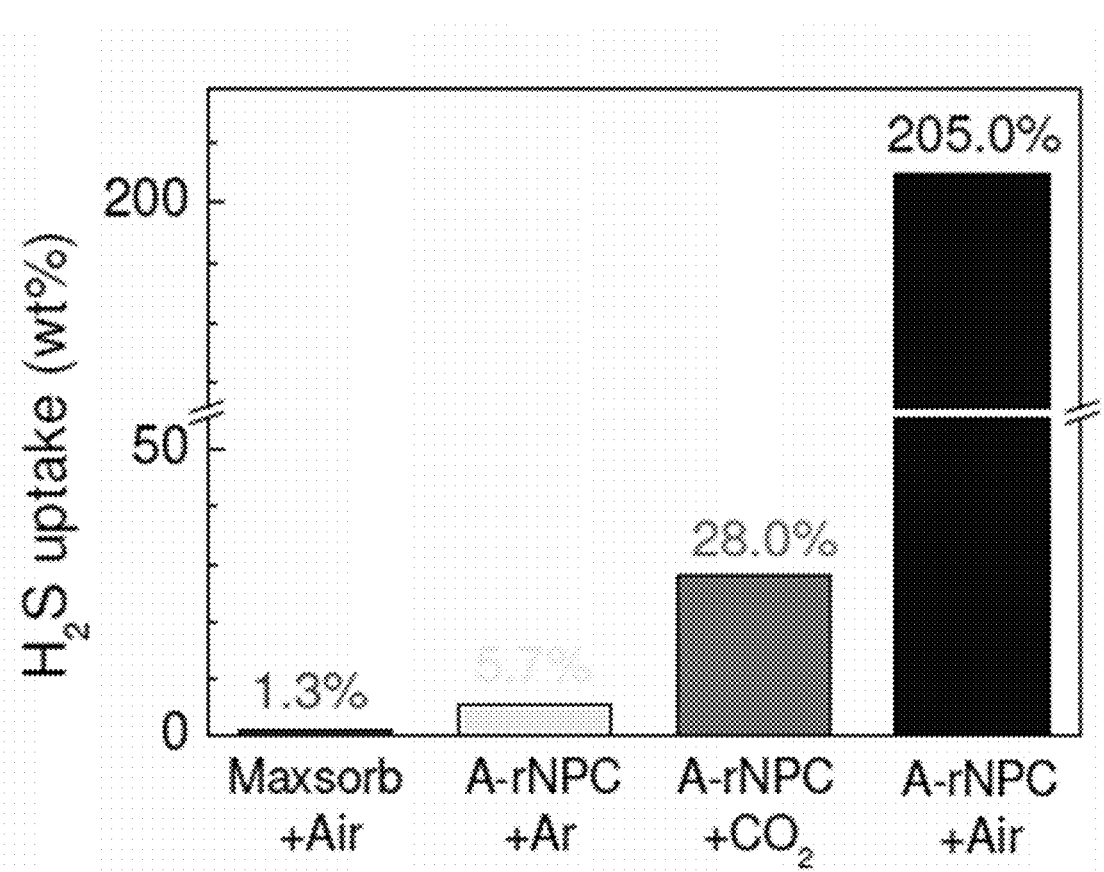
FIG. 23 shows a summary of the $H_2S$ uptake capacity of A-rNPC under different conditions, and its comparison to the $H_2S$ uptake capacity of Maxsorb®, a commercial high surface area carbonized material.

Applicants also observed that nitrogen doping doubles the $H_2S$ capturing capacity of the porous carbon materials (FIGS. 22-23 and Table 5). Without being bound by theory, it is envisioned that the extent of oxidation appears to be driven by the distribution of the catalytic centers, such as nitrogen-containing basic functional groups. Additionally, Applicants observed that the oxidative capturing of $H_2S$ by A-PCs can form sulfur-impregnated A-PCs (A-SPCs) upon heating at 650° C. (FIG. 16B).

Figure 24:
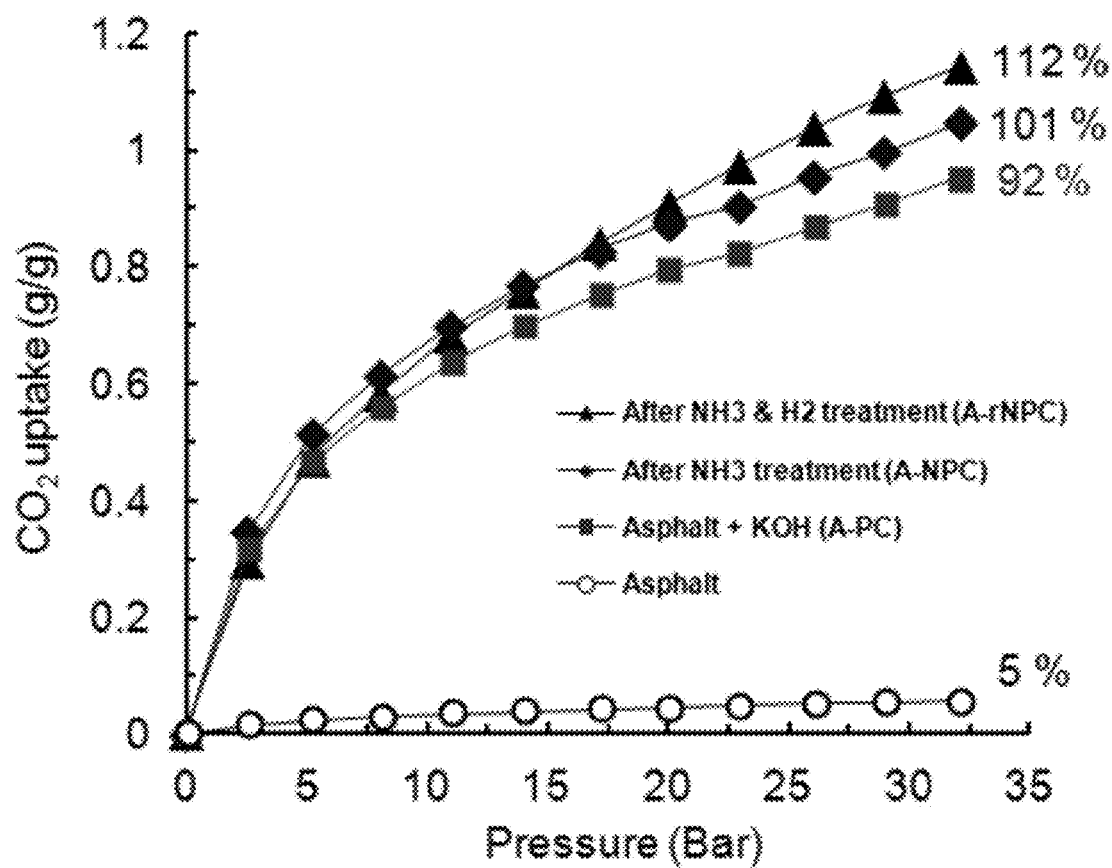
FIG. 24 shows comparative data relating to the $CO_2$ uptake capacities of A-rNPCs and A-NPCs.

The $CO_2$ uptake capacities of the porous carbon materials were also evaluated. As shown in FIG. 24, the $CO_2$ uptake capacities of A-NPCs and A-rNPCs were evaluated from 0 bar to 30 bar at 23° C. A-rNPC exhibits high $CO_2$ uptake capacity (1.12 g $CO_2$/g ArNPC) under a higher pressure environment, which is 5 times higher than Zeolite 5A, and 3 times higher than ZIF-8 under the same conditions. Such $CO_2$ uptake capacities also exceed about 72 wt % of the $CO_2$ uptake capacities observed on nitrogen-containing porous carbon (NPC) that were reported in Applicants' pervious patent application (PCT/US2014/044315).

Figure 25:
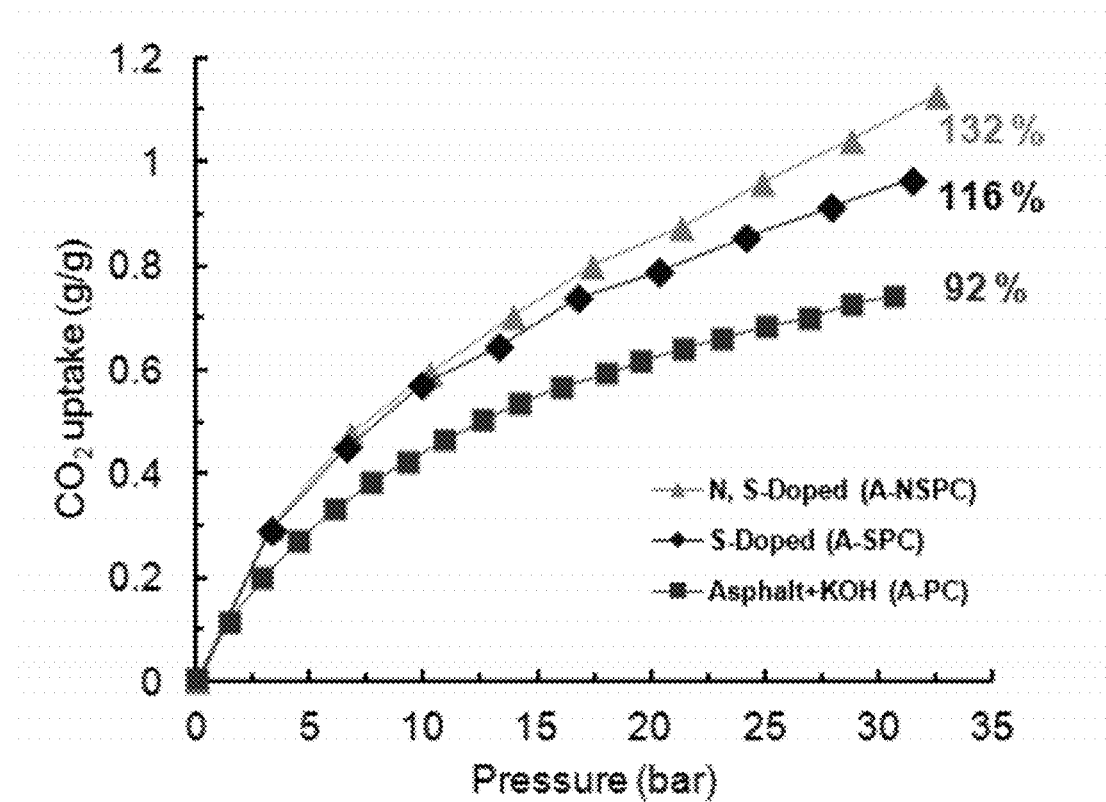
FIG. 25 shows comparative data relating to the $CO_2$ uptake capacities of A-NSPCs and A-SPCs.

As shown in FIG. 25, the $CO_2$ uptake capacities of A-SPCs and A-NSPC were also evaluated from 0 to 30 bar at 23° C. The A-NSPCs had been made according to the scheme illustrated in FIG. 16B, where it already completed its life as an $H_2S$ capture material, with air oxidation to a sulfur-rich carbon, then thermalization to form A-SPC, or further exposure to NH3 to form the A-NSPC. These latter two materials are shown in FIG. 25 to be used for reversible capture of $CO_2$. This underscores the utility life of these porous carbon materials—first for irreversible capture of $H_2S$ as sulfur in over 200 wt % uptake, and then conversion to A-SPC or A-NSPC for reversible capture of $CO_2$ in over 100 wt % uptake. A-SPCs exhibited high $CO_2$ uptake capacities (in excess of 1.10 g $CO_2$/g A-SPCs) under pressure environment, which is 5 times higher in uptake of $CO_2$ than Zeolite 5A, and 3 times higher in uptake of $CO_2$ than ZIF-8 under the same conditions. Such $CO_2$ uptake capacities also exceed about 89 wt % of the $CO_2$ uptake capacities observed on sulfur-containing porous carbons (SPC) reported in Applicants' pervious patent application (PCT/US2014/044315).

Example 5. Synthesis of Porous Carbon Materials

In this Example, Applicants provide exemplary schemes for the synthesis of porous carbon materials.

Example 5.1. Scheme A

Carbon sources suitable for use in the present disclosure are mixed with a vulcanization agent and heated to 180° C. for 12 hours in accordance with the following scheme:

Carbon source+vulcanization agent→porous carbon material

The weight ratio of the vulcanization agent to the carbon source varied from 5 wt % to 200 wt % relative to the carbon source. The vulcanized carbon source obtained was then treated with KOH, as described in Example 2.1.

Example 5.2. Scheme B

Carbon sources suitable for use in the present disclosure are mixed with a vulcanization agent and elemental sulfur and heated to about 180° C. for 12 h in accordance with the following scheme:

Carbon source+vulcanization agent+elemental sulfur→porous carbon material

The weight ratio of the vulcanization agent to the carbon source varied from 5 wt % to 200 wt % relative to the carbon source. The obtained vulcanized carbon source was then treated with KOH as described in Example 2.1.

Example 5.3. Scheme C

Carbon sources suitable for use in the present disclosure are mixed with a vulcanization agent, elemental sulfur, and KOH in accordance with the following scheme:

Carbon source+vulcanization agent+KOH→porous carbon material

The homogeneous powder is then heated at 600–800° C. under Ar atmosphere for 1 hour. This is followed by filtration with 10 wt % $HCl_{(aq)}$ and copious amounts of DI water. The weight ratio of the vulcanization agent was chosen from 5 wt % to 200 wt % additive relative to the carbon source. The weight ratio of KOH to the carbon source varied from 1 to 3.

Example 5.4. Scheme D

Carbon sources suitable for use in the present disclosure are mixed with a vulcanization agent, elemental sulfur, and KOH in accordance with the following scheme:

Carbon source+vulcanization agent+elemental sulfur+KOH→porous carbon material

The homogeneous powder is then heated at 600-800° C. under Ar atmosphere for 1 h. This is followed by filtration with 10 wt % $HCl_{(aq)}$ and copious amounts of DI water. The weight ratio of the elemental sulfur to the carbon source varied from 0.2 to 1. The weight ratio of the vulcanization agent to the carbon source varied from 5 wt % to 200 wt % relative to the carbon source. The weight ratio of KOH to the carbon source was chosen from 1 to 3.

In summary, Applicants have demonstrated in Examples 1-3 the first successful synthesis of microporous active carbons with uniform distribution of pores sizes from asphalt. Applicants subsequently activated the asphalt derived porous carbon materials with nitrogen functional groups. By changing the reaction conditions, the porous carbon materials can possess variable surface areas and nitrogen contents. The $CO_2$ and $H_2S$ uptake capacities of the asphalt-derived porous carbon materials are higher than other porous carbon materials. Additionally, many of the porous carbon materials derived from asphalt exhibit greater $CO_2$:$CH_4$ selectivity than other porous carbon materials. Furthermore, as summarized in Table 6, the carbon sources of the present disclosure are much more affordable than the carbon sources utilized to make other porous carbon materials.

TABLE 6

A comparison of the costs of various carbon sources.

| Carbon Source | Cost |
| --- | --- |
| 2-thiophene methanol (to make traditional SPC) | $150/100 g (Aldrich) |
| Polyacrylonitrile (to make traditional NPC) | $180/100 g (Aldrich) |
| Whey Protein | $11/lb |
| Rice Protein | $9/lb |
| Coal | $70-150/ton |
| Asphalt | $70-750/ton |

Example 5.5 Scheme E

Carbon sources suitable for use in the present disclosure are initially heated at 400° C. This allows for the removal of volatile oils that are present in the carbon source (FIG. 31). This is termed the pre-treatment step in the synthesis of porous carbon. The pre-treated carbon source is thoroughly mixed with KOH in accordance with the following scheme:

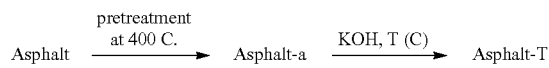

The homogeneous powder is then heated at 600~900° C. under Ar atmosphere for 1 hour. This is followed by filtration with 10 wt % $HCl_{(aq)}$ and copious amounts of DI water. The weight ratio of KOH to the carbon source was chosen from 1 to 4.

Example 6. Synthesis of Porous Carbon Materials from Biomass

In some embodiments, additional low cost raw materials may be used to prepare the porous carbon materials of the invention. For example, the porous carbon materials of the present disclosure may be derived from at least one of biochars hydrochars, charcoals, wood waste, activated carbon, and combinations thereof. The embodiments (e.g., B-PC and B-NPC materials) may be produced in a one-step synthesis method which is simple, inexpensive and easy to scale up. In some embodiments, the porous carbon materials of the present disclosure can be easily prepared from low-cost or negative-cost biomass by pyrolysis in the presence of little or no oxygen at temperatures of 200-900° C. In some embodiments, the biomass includes agricultural crops, crops residues, plantations, grass, wood, animal litter, dairy manure, solid waste, and combinations thereof. In some embodiments, the biomass utilized to make the porous carbon materials of the present disclosure is abundant (in fact, people have to pay money to get rid of biomass waste).

In some embodiments, hydrochar, charcoal and other carbon-containing materials can be utilized for the manufacture of the porous carbon materials of the present disclosure. Hydrochar is similar to biochar and it is produced by hydrothermal carbonization of biomass under pressure in the presence of water at high temperature (typically 150-300° C.). Charcoal is also similar to biochar, although it is often used for fuel and energy generation.

Therefore, the porous carbon materials of the present disclosure can be prepared by simple and economical synthesis procedures from abundant and inexpensive precursors to make solids for the capture of $CO_2$ and $H_2S$. Moreover, the porous carbon materials of the present disclosure are environmentally attractive. For example, trees and plants, when alive, capture $CO_2$ and convert it to oxygen and carbon. Here, Applicants show that trees and plants, when dead, can continue to trap $CO_2$. And since the porous carbon materials of the present disclosure (e.g., B-PC and B-NPC) are reusable many times, the $CO_2$ capture efficacy of a "dead" tree or plant can exceed that of the living tree or plant. Moreover, the porous carbon materials of the present disclosure (e.g., B-PC and B-NPC) can be manufactured on industrial scales.

In some embodiments, the porous carbons of the present disclosure can be made by the following steps:

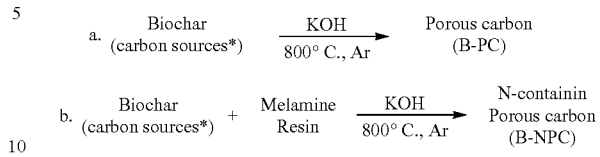

Carbon sources can include, without limitation, biochar (e.g., biochar from mesquite, applewood, corncobs and corn stover, straw from wheat, bagasse, lignin, urban tree cutting, bull, dairy, hazelnut, oak, pine, food, paper, cool terra, waste, etc); charcoal (e.g., charcoal from wood, saw dust, other wood waste, etc); activated carbon from various sources, and combinations thereof. Melamine resin can also be replaced by melamine. Sulfur-containing organics, such as those used in crosslinking rubber, can be used to make the sulfur analogs, B-SPC, which can likewise capture $CO_2$ and $H_2S$.

Synthesis of porous carbon materials, B-PC and B-NPC. (a) Synthesis of biochar derived porous carbon (B-PC). The carbon sources listed above were mixed with KOH in a mortar. The weight ratio of KOH to carbon sources was chosen from 2 to 6 and the carbonization temperature was chosen in the range of 600° C. to 900° C. The product was filtered and washed with DI water until the effluent was neutral, followed by drying at 110° C. in the oven for 12 h. (b) Synthesis of biochar derived nitrogen-containing porous carbon (B-NPC). The carbon sources and melamine resin were mixed with KOH in a mortar. The ratio of KOH to carbon sources was chosen from 2 to 6, the ratio of melamine to carbon source was chosen from 0 to 1, and the carbonization temperature was chosen from 600° C. to 900° C. The product was purified and dried in the same way as B-PC.

FIG. 26. (a) SEM image of B-NPC and, (b) TEM image of B-NPC, (c) BET isotherm curve of B-NPC, indicating B-NPC is microporous material with surface area of 2988 $m^2/g$, (d) DFT size distribution of B-NPC and the pore size is from 0.5-5 nm.

TABLE 7

Physical and chemical properties and $CO_2$ uptake and $H_2S$ uptake of biochar derived porous carbon. The weight ratio of KOH to biochar is 5 and the carbonization temperature is 800° C. (Biochar was Mesquite biochar pyrolyzed at 450° C.

| Sample | Textural properties $S_{BET}$ ($m^2/g$) | Chemical composition (atomic %) N | C | O | $H_2S$ uptake Capacity (g/g) | $CO_2$ uptake capacity at 30 bar (g/g) |
|---|---|---|---|---|---|---|
| Biochar | 9.9 | 1.6 | 83.5 | 14.9 | — | 0.14 |
| B-PC | 2,988 | — | 93.0 | 7.0 | — | 1.13 |
| B-NPC | 2,908 | 0.6 | 91.4 | 9.0 | 0.41 | 1.14 |

TABLE 8

Physical properties and $CO_2$ uptake of different biochar derived porous carbons.
(Biochar was Mesquite biochar pyrolyzed at 450° C.)

| Sample | Weight of reactants (g) | | | Textural properties $S_{BET}$ (m²/g) | Yield (wt %) | $CO_2$ uptake capacity at 30 bar (g/g) |
|---|---|---|---|---|---|---|
| | Biochar | Melamine resin | KOH | | | |
| B-PC (1) | 0.50 | 0 | 2.50 | 2988 | 40 | 1.13 |
| B-PC (2) | 0.50 | 0 | 3.00 | 2755 | 28 | 1.15 |
| B-NPC (1) | 0.50 | 0.25 | 2.50 | 2908 | 45 | 1.14 |
| B-NPC (2) | 0.50 | 0.25 | 3.00 | 3133 | 41 | 1.20 |
| B-NPC (3) | 0.50 | 0.25 | 3.50 | 2273 | 20 | 1.05 |
| C-NPC | 0.50* | 0.25 | 2.50 | 3469 | 28 | 1.26 |

*Activated charcoal from Sigma Aldrich (CAS C3345, Lot # 051M0151M xxxx) is used as precursor.

Figure 27:
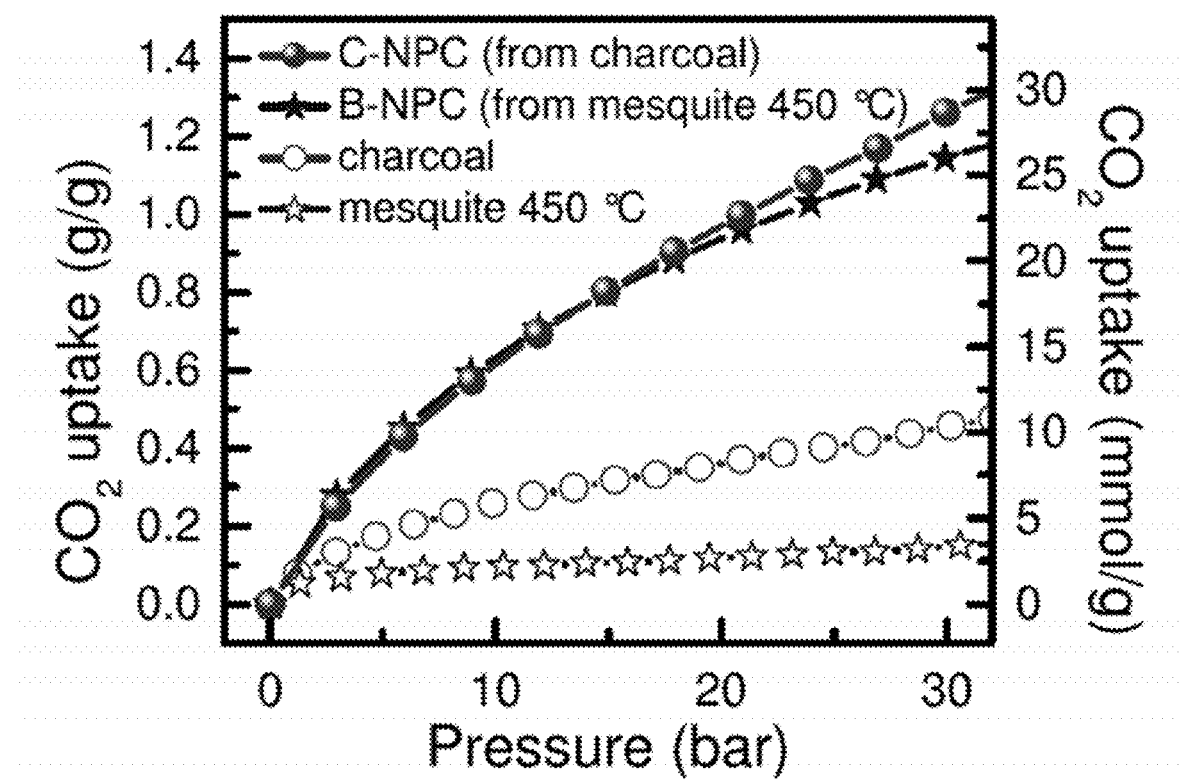
FIG. 27 shows $CO_2$ uptake performances of different sorbents, B-NPC and C-NPC (charcoal derived N-containing porous carbon) at 25° C.

FIG. 27. $CO_2$ uptake performances of different sorbents, B-NPC and C-NPC (charcoal derived N-containing porous carbon) at 25° C. B-NPC derived from mesquite exhibits high $CO_2$ capacity (1.14 g/g) at 30 bar, which is 5 times higher than Zeolite 5A, 3 times higher than ZIF-8 under the same conditions. C-NPC derived from charcoal exhibits high $CO_2$ capacity (1.26 g/g) at 30 bar, which is 5.7 times higher than Zeolite 5A, 3.4 times higher than ZIF-8 at the same conditions. Both of them show much better $CO_2$ uptake amount than their own precursor. B-PC shows similar or better $CO_2$ uptake amount compared with asphalt derived porous carbon or polymer (polyacrylonitrile or poly[(2-hydroxymethyl)thiophene]) derived porous carbon (NPC or SPC) as reported in prior applications.

Figure 28:
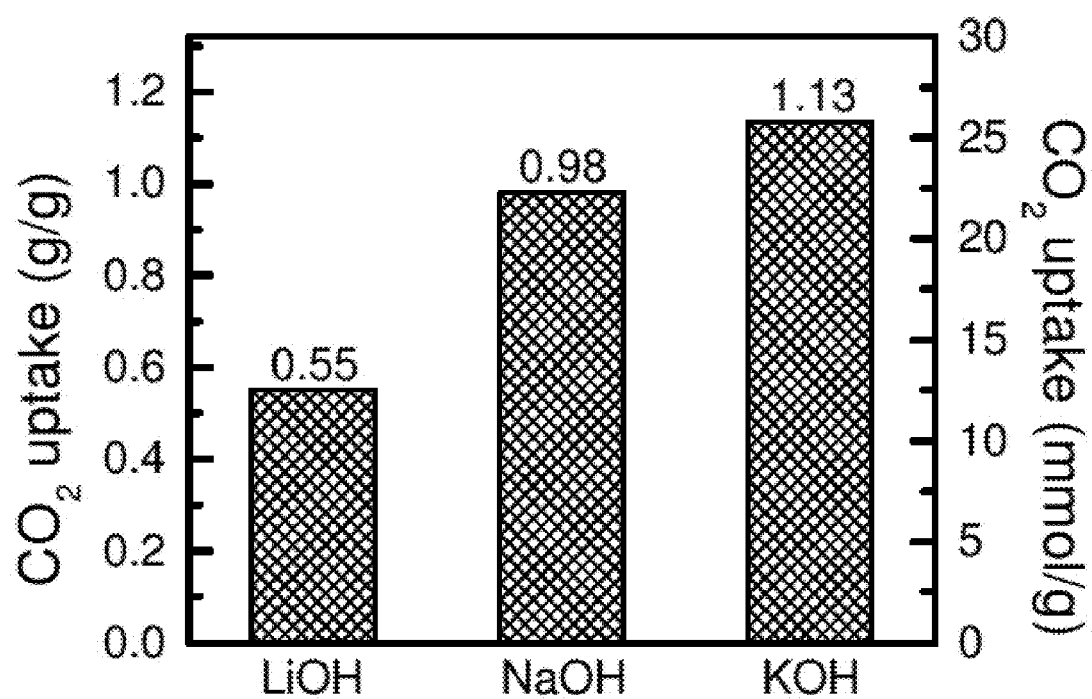
FIG. 28 shows $CO_2$ uptake performances of different B-PC prepared by different bases.

FIG. 28. $CO_2$ uptake performances of different B-PC prepared by different bases. KOH treated B-PC exhibits 1.13 g/g $CO_2$ uptake at 30 bar, which is better than NaOH or LiOH treated B-PC, which is 0.98 g/g or 0.55 g/g, respectively.

Figure 29:
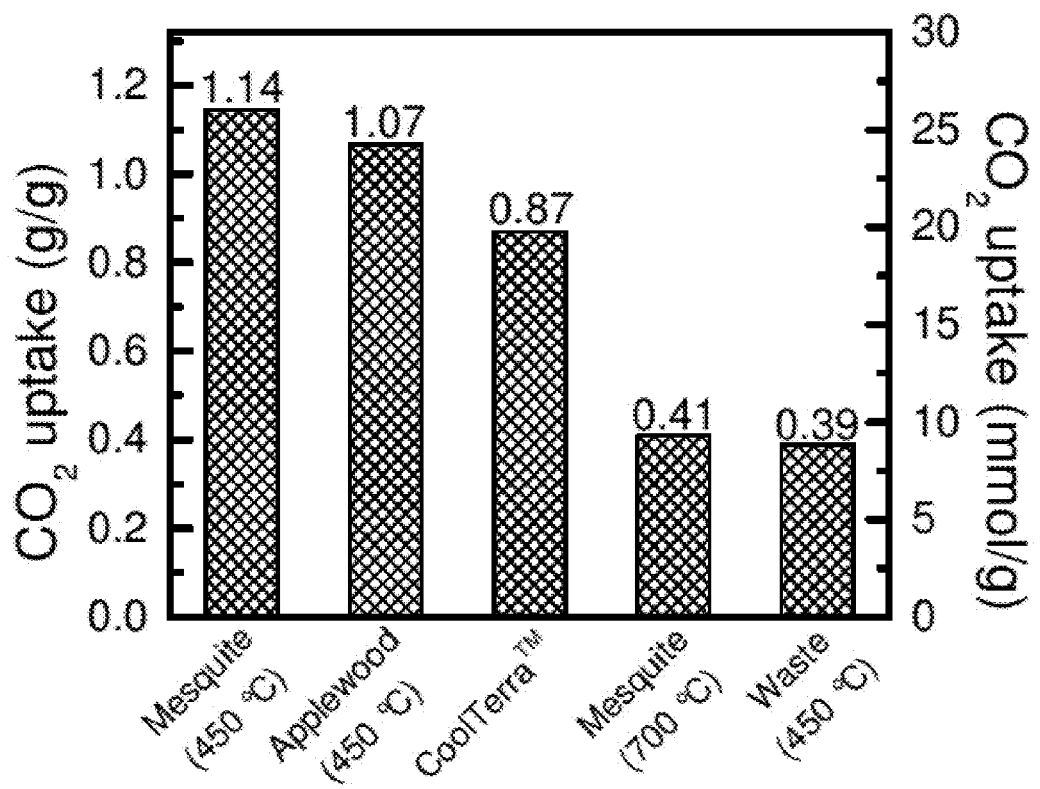
FIG. 29 shows $CO_2$ uptake performances of different B-NPC prepared from different precursors using KOH as base.

FIG. 29. $CO_2$ uptake performances of different B-NPC prepared from different precursors using KOH as base. The $CO_2$ uptake amounts of B-PC from mesquite (450° C.), applewood (450° C.), CoolTerra™, mesquite (700° C.), and waste (450° C.) are 1.14 g/g, 1.07 g/g, 0.87 g/g, 0.41 g/g, and 0.39 g/g, respectively.

Figure 30:
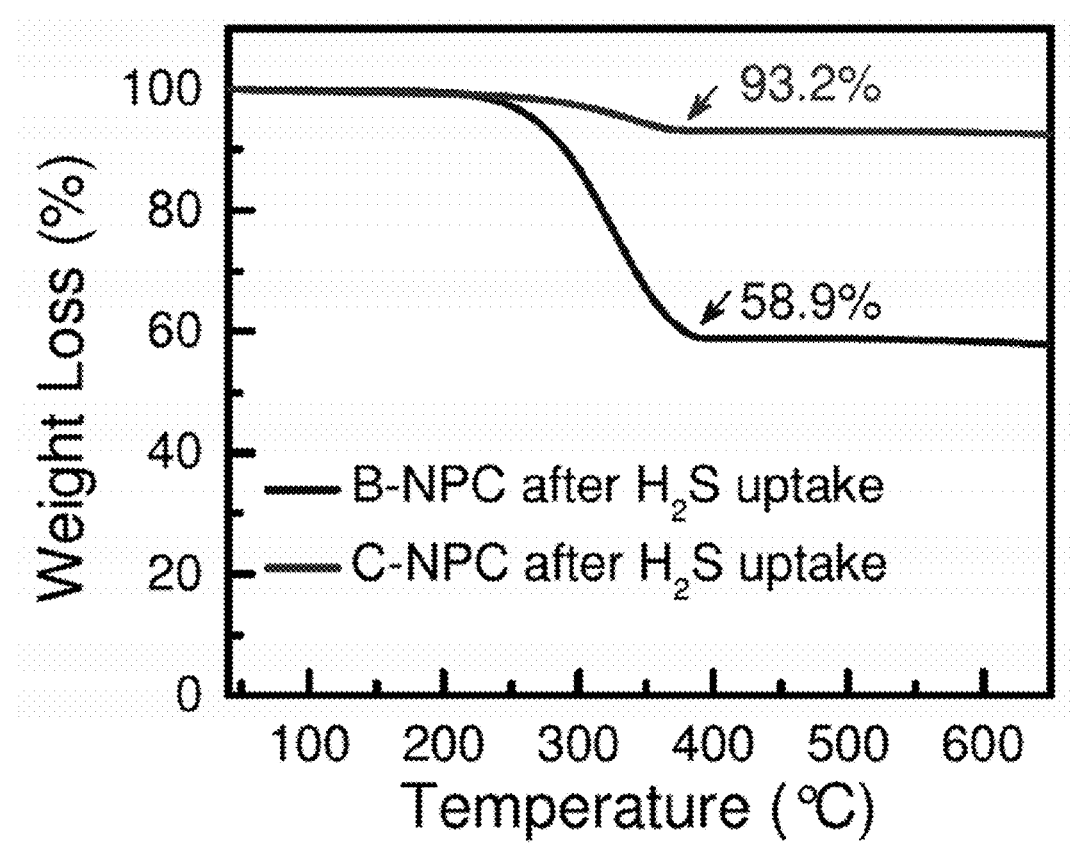
FIG. 30 shows the thermogravimetric analysis (TGA) curves of B-NPC and C-NPC after $H_2S$ capture.

FIG. 30. Thermogravimetric analysis (TGA) curves of B-NPC and C-NPC after H2S capture. The weight loss of sulfur rich B-NPC and C-NPC is 41% and 6.8%, respectively. By calculation, the $H_2S$ capture capacity of B-NPC and C-NPC is 0.74 g/g and 0.07 g/g.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. Although the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed:

1. A method of capturing $CO_2$, the method comprising:
    associating a $CO_2$ containing environment with a high surface area, porous carbon material that includes a plurality of moieties embedded within the pores of the porous carbon materials,
        wherein the plurality of moieties are selected from the group consisting of nitrogen-containing moieties, sulfur-containing moieties, and combinations thereof;
        wherein the environment is selected from the group consisting of industrial gas streams, natural gas streams, natural gas wells, industrial gas wells, oil and gas fields, and combinations thereof, wherein the environment is pressurized to a total pressure between about 2.5 bar to about 100 bar;
        wherein the majority of the pores in the porous carbon material have a diameter of about 3 nm or less,
        wherein the density of the porous carbon material is between about 0.3 g/cm³ to about 4 g/cm³, and
        wherein the $CO_2$ sorption absolute capacity of the porous carbon material is between about 50 wt % and about 200 wt %; and
    selectively capturing $CO_2$ over hydrocarbon species in the environment within the pores of the porous carbon material.

2. The method of claim 1, wherein the selectively capturing comprises:
    sorption of $CO_2$ to the porous carbon material between about 2.5 bar and about 100 bar total pressure;
    wherein the sorption of the $CO_2$ occurs without heating the porous carbon material or the environment; and
    wherein the plurality of moieties facilitate selectively capturing $CO_2$ by facilitating formation of a matrix of $CO_2$ within the pores of the porous carbon material.

3. The method of claim 1, further comprising releasing the $CO_2$ from the porous carbon material after it has been captured;
    wherein the release of the $CO_2$ occurs at total pressures ranging from about 0.01 bar to about atmospheric pressure; and
    wherein the release of the $CO_2$ occurs without heating the porous carbon material or the environment.

4. The method of claim 1, wherein the release of the $CO_2$ is enhanced by the addition of heat to the porous carbon material or to the environment.

5. The method of claim 1, wherein the porous carbon material is produced from a high fixed carbon content precursor selected from a group consisting of biochar, hydrochar, coal, lignite, biomass, organic substances containing heteroatoms such as nitrogen or sulfur, and combinations thereof;

optionally wherein the precursor is heated at temperatures greater than 600° C., and wherein $CO_2$ selectivity and $CO_2$ capacity of the porous carbon material is enhanced by functionalization of the porous carbon material surface during such heating; or optionally wherein the precursor is activated at a temperature between about 650° C. and about 1000° C. and in the presence of an amount of activating agent, to create and maintain micropores within the porous carbon material.

6. The method of claim 1, wherein the porous carbon material comprises an asphalt-derived porous carbon.

7. The method of claim 1, wherein the plurality of moieties within the pores are covalently linked to the pores.

8. A method of capturing $CO_2$, the method comprising:

associating a $CO_2$ containing environment with a high surface area, porous carbon material that comprises a plurality of moieties embedded within the pores of the porous carbon materials, wherein the plurality of moieties are selected from the group consisting of nitrogen-containing moieties, sulfur-containing moieties, and combinations thereof;

selectively capturing $CO_2$ over hydrocarbon species within the pores of the porous carbon material;

releasing the $CO_2$ from the porous carbon material after it has been captured; and reusing the porous carbon material for $CO_2$ capture subsequent to the releasing step, wherein the environment has a total pressure between about 2.5 to about 100 bar, and wherein the majority of the pores in the porous carbon material have a diameter of about 3 nm or less.

9. The method of claim 8, wherein the environment is selected from the group consisting of industrial gas streams, natural gas streams, natural gas wells, industrial gas wells, oil and gas fields, and combinations thereof.

10. The method of claim 8, wherein the plurality of moieties facilitate selectively capturing $CO_2$ by facilitating formation of a matrix of $CO_2$ within the pores of the porous carbon material.

11. The method of claim 8, wherein the porous carbon material has a $CO_2$ uptake of between about 0.92 g/g to about 1.50 g/g, at a $CO_2$ partial pressure of about 30 bar.

12. The method of claim 8, wherein the porous carbon material selectively captures $CO_2$ over $CH_4$, such that the molecular ratio between $CO_2$ and $CH_4$ is between about 2 and about 10.

13. The method of claim 8, wherein the porous carbon material is produced from a high fixed carbon content precursor selected from a group consisting of biochar, hydrochar, coal, lignite, biomass, organic substances containing heteroatoms such as nitrogen or sulfur, and combinations thereof;

optionally wherein the precursor is heated at temperatures greater than 600° C., and wherein $CO_2$ selectivity and $CO_2$ capacity of the porous carbon material is enhanced by functionalization of the porous carbon material surface during such heating; or optionally wherein the precursor is activated at a temperature between about 650° C. and about 1000° C. and in the presence of an amount of activating agent, to create and maintain micropores within the porous carbon material.

14. The method of claim 8, wherein the porous carbon material comprises an asphalt-derived porous carbon.

15. The method of claim 8, wherein the plurality of moieties within the pores are covalently linked to the pores.

* * * * *